(12) United States Patent
Sasaki et al.

(10) Patent No.: US 8,289,649 B2
(45) Date of Patent: Oct. 16, 2012

(54) MAGNETIC HEAD FOR PERPENDICULAR MAGNETIC RECORDING WITH SHIELD AROUND MAIN MAGNETIC POLE

(75) Inventors: Yoshitaka Sasaki, Santa Clara, CA (US); Kazuki Sato, Milpitas, CA (US); Hiroyuki Ito, Milpitas, CA (US); Takehiro Horinaka, Milpitas, CA (US); Kazumasa Yasuda, Sunnyvale, CA (US)

(73) Assignee: Headway Technologies, Inc., Milpitas, CA (US)

( * ) Notice: Subject to any disclaimer, the term of this patent is extended or adjusted under 35 U.S.C. 154(b) by 128 days.

(21) Appl. No.: 12/960,954

(22) Filed: Dec. 6, 2010

(65) Prior Publication Data
US 2012/0140358 A1    Jun. 7, 2012

Related U.S. Application Data

(63) Continuation-in-part of application No. 12/886,005, filed on Sep. 20, 2010.

(51) Int. Cl.
*G11B 5/127*    (2006.01)
(52) U.S. Cl. ................... 360/125.13; 29/603.07
(58) Field of Classification Search ....... 360/125.02–125.13, 125.3; 29/603.07, 29/603.14
See application file for complete search history.

(56) References Cited

U.S. PATENT DOCUMENTS

| | | | |
|---|---|---|---|
| 6,954,340 B2 | 10/2005 | Shukh et al. | |
| 7,450,349 B2 * | 11/2008 | Nishida et al. | 360/319 |
| 7,576,951 B2 * | 8/2009 | Allen et al. | 360/125.13 |
| 7,796,361 B2 * | 9/2010 | Sasaki et al. | 360/125.13 |
| 7,804,666 B2 * | 9/2010 | Guan et al. | 360/319 |
| 7,872,835 B2 * | 1/2011 | Guan | 360/319 |
| 7,940,495 B2 * | 5/2011 | Sasaki et al. | 360/125.27 |
| 7,952,831 B2 * | 5/2011 | Kim et al. | 360/119.03 |
| 8,035,930 B2 * | 10/2011 | Takano et al. | 360/319 |
| 8,094,419 B2 * | 1/2012 | Guan | 360/319 |
| 8,120,874 B2 * | 2/2012 | Hsiao et al. | 360/119.04 |
| 8,149,537 B2 * | 4/2012 | Nazarov | 360/125.3 |
| 8,166,632 B1 * | 5/2012 | Zhang et al. | 29/603.16 |
| 2006/0198049 A1 * | 9/2006 | Sasaki et al. | 360/126 |
| 2007/0177301 A1 | 8/2007 | Han et al. | |
| 2008/0239567 A1 | 10/2008 | Sasaki et al. | |

OTHER PUBLICATIONS

U.S. Appl. No. 12/886,005, filed Sep. 20, 2010 in the name of Yoshitaka Sasaki et al.

* cited by examiner

*Primary Examiner* — Angel A. Castro
(74) *Attorney, Agent, or Firm* — Oliff & Berridge, PLC

(57) ABSTRACT

A magnetic head includes a main magnetic pole, a shield having an end face located in a medium facing surface to wrap around an end face of the main magnetic pole, and a gap part provided between the main magnetic pole and the shield. The shield includes a bottom shield, two side shields, and a top shield. The gap part includes first and second gap layers. In a manufacturing method of the magnetic head, a mold is formed on the top surface of the bottom shield, the mold having a shape determined by photolithography and being intended to be removed later. Next, the two side shields are formed on the top surface of the bottom shield by performing plating without forming a seed layer. Next, the mold is removed and then the first gap layer, the main magnetic pole, the second gap layer, and the top shield are formed in succession.

13 Claims, 26 Drawing Sheets

MAGNETIC HEAD FOR PERPENDICULAR MAGNETIC RECORDING WITH SHIELD AROUND MAIN MAGNETIC POLE

BACKGROUND OF THE INVENTION

1. Field of the Invention

The present invention relates to a magnetic head for perpendicular magnetic recording that is used for writing data on a recording medium by means of a perpendicular magnetic recording system, and more specifically, to a magnetic head for perpendicular magnetic recording that has a shield provided around a main magnetic pole, and a method of manufacturing the same.

2. Description of the Related Art

The recording systems of magnetic read/write apparatuses include a longitudinal magnetic recording system wherein signals are magnetized in a direction along the plane of the recording medium (the longitudinal direction) and a perpendicular magnetic recording system wherein signals are magnetized in a direction perpendicular to the plane of the recording medium. It is known that the perpendicular magnetic recording system is harder to be affected by thermal fluctuation of the recording medium and capable of providing higher linear recording density, compared with the longitudinal magnetic recording system.

Typically, magnetic heads for perpendicular magnetic recording have such a structure that a read head having a magnetoresistive element (hereinafter, also referred to an MR element) for reading and a write head having an induction-type electromagnetic transducer for writing are stacked on a substrate, as is the case with magnetic heads for longitudinal magnetic recording. The write head includes a main magnetic pole that produces a magnetic field in a direction perpendicular to the plane of the recording medium. The main magnetic pole includes, for example, a track width defining portion having an end located in a medium facing surface that faces the recording medium, and a wide portion that is connected to the other end of the track width defining portion and is greater in width than the track width defining portion. The track width defining portion has a nearly uniform width. To achieve higher recording density, it is required that the write heads of the perpendicular magnetic recording system be smaller in track width and improved in write characteristics such as an overwrite property which is a parameter indicating an overwriting capability.

A magnetic head for use in a magnetic disk drive such as a hard disk drive is typically provided in a slider. The slider has the medium facing surface mentioned above. The medium facing surface has an air inflow end and an air outflow end. The slider is designed to slightly fly over the surface of the recording medium by means of an airflow that comes from the air inflow end into the space between the medium facing surface and the recording medium. The magnetic head is typically disposed near the air outflow end of the medium facing surface of the slider. In a magnetic disk drive, positioning of the magnetic head is performed by a rotary actuator, for example. In this case, the magnetic head moves over the recording medium along a circular orbit about the center of rotation of the rotary actuator. In such a magnetic disk drive, a tilt of the magnetic head with respect to the tangent of the circular track, which is called a skew, occurs according to the position of the magnetic head across the tracks.

In a magnetic disk drive of the perpendicular magnetic recording system, in particular, which exhibits a better capability of writing on a recording medium compared with the longitudinal magnetic recording system, the skew mentioned above can cause the phenomenon that signals already written on one or more tracks that are adjacent to a track targeted for writing are erased or attenuated during writing of a signal on the track targeted for writing (such a phenomenon will hereinafter be referred to as adjacent track erase). To increase the recording density, it is required to prevent the occurrence of adjacent track erase.

One of known techniques for preventing the occurrence of adjacent track erase resulting from the skew is to form the main magnetic pole such that its end face located in the medium facing surface has a width that decreases with decreasing distance to the top surface of the substrate, as described in U.S. Patent Application Publication No. 2007/0177301 A1 and U.S. Pat. No. 6,954,340 B2, for example.

Another effective technique for preventing the occurrence of adjacent track erase resulting from the skew is to provide two side shields on opposite sides of the main magnetic pole in the track width direction, as described in U.S. Patent Application Publication No. 2007/0177301 A1. It is also effective to provide a shield having an end face that is located in the medium facing surface and wraps around the end face of the main magnetic pole (such a shield will hereinafter be referred to as a wrap-around shield), as described in U.S. Pat. No. 6,954,340 B2. The wrap-around shield includes a bottom shield that is located on the air-inflow-end side relative to the main magnetic pole, a top shield that is located on the air-outflow-end side relative to the main magnetic pole, and two side shields that are located on opposite sides of the main magnetic pole in the track width direction. These techniques allow taking in a magnetic flux that is generated from the end face of the main magnetic pole and expands in the track width direction. This makes it possible to prevent the occurrence of adjacent track erase.

Now, methods for forming a main magnetic pole and two side shields will be considered. There are two broad categories of methods for forming a main magnetic pole and two side shields: one is to form the main magnetic pole first and form the two side shields thereafter; the other is to form the two side shields first and form the main magnetic pole thereafter.

An example of the method where the main magnetic pole is formed first and the two side shields are formed thereafter is as follows. First, the main magnetic pole and a nonmagnetic layer for accommodating the main magnetic pole are formed. Then, part of the nonmagnetic layer is etched to form two grooves for accommodating the two side shields. The two side shields are then formed by, for example, plating, such that they are accommodated in the two grooves. Where plating is employed to form the two side shields, seed layers are formed before plating is performed. This method will hereinafter be referred to as a first method.

An example of the method where the two side shields are formed first and the main magnetic pole is formed thereafter is described in U.S. Patent Application Publication No. 2007/0177301 A1. According to the method, a shield layer to later become the two side shields is formed first by, for example, plating. Then, part of the shield layer is etched to form a trench penetrating the shield layer. The shield layer thereby becomes the two side shields. Next, the main magnetic pole is formed to be accommodated in the trench. This method will hereinafter be referred to as a second method.

The following problem arises with the first method if the two side shields are formed by plating. In this case, the seed layers are formed to extend along the respective bottoms and wall faces of the two grooves. Plating films grow from the surfaces of the respective seed layers. Each of the plating films includes a portion grown from the portion of the seed layer extending along the bottom of the groove and a portion grown from the portions of the seed layer extending along the wall faces of the groove. These two portions meet each other to form a seam therebetween. The seam is a large grain boundary. Impurities are apt to segregate on the seam. The seam is therefore prone to be inferior in magnetic properties to other areas of each of the plating films, and thus can result in a magnetic defect. In the area near of the position of the magnetic defect in each of the plating films or side shields, magnetic flux is unstable and the direction of magnetization tends to be pinned. As a result, a large magnetic field can be generated locally in the side shields, which can result in the occurrence of adjacent track erase.

Additionally, if the first method is employed, an etching residue resulting from a reaction product produced during etching or resulting from a material etched may remain on the bottom of each of the grooves formed by etching. If the seed layer is formed on the etching residue, the seed layer will have a projection at the position of the etching residue. In the area of each of the plating films or side shields near the projection of the seed layer, magnetic flux is unstable and the direction of magnetization tends to be pinned, as with the magnetic defect caused by the seam. Therefore, it may be said that the area of each of the plating films near the projection of the seed layer can also result in a magnetic defect. The magnetic defect can locally generate a large magnetic field in the side shields, which can result in the occurrence of adjacent track erase.

In the first method, the two grooves for accommodating the two side shields are formed by etching. The shapes of the two side shields are thereby determined. Typically, patterning of a layer by using etching requires a larger number of process steps and more time than in the case of patterning of a layer by using only photolithography. The first method therefore has the problem of high cost in manufacturing magnetic heads because of the need for a large number of process steps and much time to determine the shapes of the two side shields.

In the second method, the shapes of the two side shields are determined by etching. This means that the second method also requires a large number of process steps and much time to determine the shapes of the two side shields, and therefore has the problem of high cost in manufacturing magnetic heads.

On the other hand, the following problem arises if the main magnetic pole is shaped such that its end face located in the medium facing surface decreases in width with decreasing distance to the top surface of the substrate. If the main magnetic pole of such a shape is formed by a conventional method of forming a main magnetic pole, major part of the side surface of the main magnetic pole along the entire perimeter of the main magnetic pole is formed into a tilt surface tilted with respect to a direction perpendicular to the top surface of the substrate. The main magnetic pole of this shape is smaller in cross-sectional area perpendicular to the direction in which magnetic flux flows, compared with a case where the entire side surface of the main magnetic pole is perpendicular to the top surface of the substrate. The main magnetic pole of the foregoing shape cannot allow much magnetic flux to pass, especially through a part near the boundary between the track width defining portion and the wide portion. This results in degradation of write characteristics such as overwrite property.

An effective technique for solving this problem is, as disclosed in U.S. Patent Application Publication No. 2008/0239567 A1, to form the main magnetic pole into the following shape. The main magnetic pole formed by the technique disclosed therein has first and second side surfaces that are opposite to each other and located in a first region extending from the medium facing surface to a position at a predetermined distance from the medium facing surface, and third and fourth side surfaces that are located in a second region other than the first region. The main magnetic pole further has a fifth side surface located in the boundary between the first and second regions and connecting the first side surface to the third side surface, and a sixth side surface located in the boundary between the first and second regions and connecting the second side surface to the fourth side surface. The distance between the first side surface and the second side surface in the track width direction decreases with decreasing distance to the top surface of the substrate. In the boundary between the first region and the second region, the distance between the third side surface and the fourth side surface in the track width direction as seen at the position closest to the top surface of the substrate is greater than the distance between the first side surface and the second side surface in the track width direction as seen at the position closest to the top surface of the substrate. Each of the fifth and sixth side surfaces has a width that increases with decreasing distance to the top surface of the substrate. This technique allows the main magnetic pole to have a large cross-sectional area perpendicular to the direction of flow of the magnetic flux in the vicinity of the boundary between the track width defining portion and the wide portion, thereby allowing much magnetic flux to pass. As a result, it is possible to improve write characteristics such as overwrite property.

If a magnetic head with a wrap-around shield and a main magnetic pole of the foregoing shape is to be formed by the conventional manufacturing method, a large number of process steps and much time are required to determine the shapes of the two side shields and the main magnetic pole. This results in higher costs in manufacturing the magnetic head.

OBJECT AND SUMMARY OF THE INVENTION

It is a first object of the present invention to provide a manufacturing method for a magnetic head for perpendicular magnetic recording with a shield provided around a main magnetic pole, the manufacturing method being capable of preventing the generation of a magnetic defect in two side shields that the shield includes, and allowing the shapes of the two side shields to be determined easily.

It is a second object of the present invention to provide a magnetic head for perpendicular magnetic recording and a manufacturing method for the same, the magnetic head including a main magnetic pole that is capable of achieving both the prevention of adjacent track erase and the improvement of write characteristics, and a shield provided around the main magnetic pole, the magnetic head being capable of preventing the generation of a magnetic defect in two side shields that the shield includes, and allowing the shapes of the main magnetic pole and the two side shields to be determined easily.

It is a third object of the present invention to provide a magnetic head for perpendicular magnetic recording with a shield provided around a main magnetic pole and a manufacturing method for the same, the magnetic head being capable of preventing the generation of a magnetic defect in two side shields that the shield includes, allowing the shapes of the two side shields to be determined easily, and being capable of preventing leakage of magnetic flux from the main magnetic pole to the two side shields.

A magnetic head for perpendicular magnetic recording that is manufactured by a manufacturing method of the present invention includes: a medium facing surface that faces a recording medium; a coil that produces a magnetic field corresponding to data to be written on the recording medium; a main magnetic pole that has an end face located in the medium facing surface, allows a magnetic flux corresponding to the magnetic field produced by the coil to pass, and produces a write magnetic field for writing the data on the recording medium by means of a perpendicular magnetic recording system; a shield made of a magnetic material and having an end face that is located in the medium facing surface to wrap around the end face of the main magnetic pole; and a gap part made of a nonmagnetic material and provided between the main magnetic pole and the shield.

The shield includes a bottom shield, first and second side shields, and a top shield. The bottom shield has an end face and a top surface, the end face being located in the medium facing surface at a position backward of the end face of the main magnetic pole along a direction of travel of the recording medium. The first and second side shields have two end faces that are located in the medium facing surface at positions on opposite sides of the end face of the main magnetic pole in a track width direction. The top shield has an end face that is located in the medium facing surface at a position forward of the end face of the main magnetic pole along the direction of travel of the recording medium. The gap part includes a first gap layer disposed between the main magnetic pole and the bottom shield and between the main magnetic pole and the first and second side shields, and a second gap layer disposed between the main magnetic pole and the top shield.

The method of manufacturing the magnetic head for perpendicular magnetic recording of the present invention includes the steps of: forming the bottom shield; forming a mold on the top surface of the bottom shield excluding regions thereof where the first and second side shields are to be formed later, the mold having a shape determined by photolithography and being intended to be removed later; forming the first and second side shields on the top surface of the bottom shield after the formation of the mold, by performing plating without forming a seed layer; removing the mold after the formation of the first and second side shields; forming the first gap layer after the removal of the mold; forming the main magnetic pole after the formation of the first gap layer; forming the second gap layer after the formation of the main magnetic pole; forming the top shield after the formation of the second gap layer; and forming the coil.

In the method of manufacturing the magnetic head of the present invention, the main magnetic pole may have a top surface that is farther from the top surface of the bottom shield, a bottom end opposite to the top surface of the main magnetic pole, and first to sixth side surfaces. A width of the end face of the main magnetic pole in the track width direction decreases with decreasing distance to the bottom end of the main magnetic pole. The first and second side surfaces are opposite to each other and located in a first region that extends from the medium facing surface to a position at a distance of 50 to 500 nm from the medium facing surface. The third and fourth side surfaces are located in a second region that is other than the first region. The fifth side surface is located in a boundary between the first and second regions, and connects the first side surface to the third side surface. The sixth side surface is located in the boundary between the first and second regions, and connects the second side surface to the fourth side surface.

The distance between the first side surface and the second side surface in the track width direction decreases with decreasing distance to the bottom end of the main magnetic pole. In the boundary between the first region and the second region, the distance between the third side surface and the fourth side surface in the track width direction as seen at a position closest to the bottom end of the main magnetic pole is greater than the distance between the first side surface and the second side surface in the track width direction as seen at the position closest to the bottom end of the main magnetic pole. Each of the fifth and sixth side surfaces has a width that increases with decreasing distance to the bottom end of the main magnetic pole. The first side shield has two wall faces that are opposed to the first and third side surfaces of the main magnetic pole, respectively. The second side shield has two wall faces that are opposed to the second and fourth side surfaces of the main magnetic pole, respectively.

In the method of manufacturing the magnetic head of the present invention, the step of forming the bottom shield may include the step of forming a first layer and the step of forming a second layer on and around the first layer. In the step of forming the first and second side shields, the first and second side shields may be formed by performing plating with the second layer used as a seed layer. In such a case, the method of manufacturing the magnetic head may further include an etching step of removing a part of the second layer other than that lying on the first layer by etching, the etching step being performed between the step of removing the mold and the step of forming the first gap layer. In the etching step, a part of each of the first and second side shields may be etched to form one of the wall faces of the first side shield that is to be opposed to the third side surface of the main magnetic pole and one of the wall faces of the second side shield that is to be opposed to the fourth side surface of the main magnetic pole.

In the method of manufacturing the magnetic head of the present invention, the step of forming the mold may include the steps of: forming a first resist layer on the regions of the top surface of the bottom shield where the first and second side shields are to be formed later, by patterning a photoresist layer made of a positive photoresist by photolithography; forming a separating film to cover the first resist layer; forming a second resist layer on the separating film by patterning a photoresist layer made of a negative photoresist by photolithography, the second resist layer being intended to become the mold later; and removing the first resist layer and the separating film so that the second resist layer remains on the top surface of the bottom shield to become the mold.

In the method of manufacturing the magnetic head of the present invention, the step of forming the main magnetic pole may include the steps of: forming a magnetic layer that is to become the main magnetic pole later; forming a nonmagnetic layer made of a nonmagnetic material such that the nonmagnetic layer covers the first and second side shields, the first gap layer, and the magnetic layer; and polishing the nonmagnetic layer until the first and second side shields and the magnetic layer are exposed.

Where the step of forming the main magnetic pole includes the foregoing plurality of steps, the nonmagnetic layer unpolished may have a top surface including a projecting portion that lies above the first and second side shields and the magnetic layer, and a peripheral portion that lies on the periphery of each of the first and second side shields and is lower in level than the projecting portion. In this case, the step of forming the main magnetic pole may further include the steps of: forming a polishing stopper layer on the nonmagnetic layer unpolished; and forming, on the polishing stopper layer, a layer to be polished that is to undergo polishing later. The step of polishing the nonmagnetic layer may polish the layer to be polished, the polishing stopper layer, and the nonmagnetic layer until a part of the polishing stopper layer that lies above the peripheral portion of the top surface of the nonmagnetic layer is exposed.

The nonmagnetic layer after the polishing may have first and second portions that are located away from the medium facing surface and interposed between the main magnetic pole and the first and second side shields.

The main magnetic pole may have a top surface that is farther from the top surface of the bottom shield, a bottom end opposite to the top surface of the main magnetic pole, and first and second side parts. The first side shield may have a first sidewall that is opposed to the first side part of the main magnetic pole. The second side shield may have a second sidewall that is opposed to the second side part of the main magnetic pole. The first side part may bend to form a first corner at a first position that is at a predetermined distance from the medium facing surface. The second side part may bend to form a second corner at a second position that is at the predetermined distance from the medium facing surface. At the first position, a distance between the first side part and the first sidewall in the track width direction may start to gradually increase with increasing distance from the medium facing surface. At the second position, a distance between the second side part and the second sidewall in the track width direction may start to gradually increase with increasing distance from the medium facing surface. The first portion of the nonmagnetic layer may be located farther from the medium facing surface than is the first position and interposed between the first side part and the first sidewall. The second portion of the nonmagnetic layer may be located farther from the medium facing surface than is the second position and interposed between the second side part and the second sidewall.

In the method of manufacturing the magnetic head of the present invention, the main magnetic pole may have a top surface including a first portion and a second portion, the first portion having a first edge located in the medium facing surface and a second edge opposite to the first edge, the second portion being located farther from the medium facing surface than is the first portion and being connected to the first portion at the second edge. The distance from the top surface of the bottom shield to an arbitrary point on the first portion decreases with decreasing distance from the arbitrary point to the medium facing surface. In such a case, the step of forming the main magnetic pole may include the steps of: forming a magnetic layer that is to become the main magnetic pole later; and etching a part of the magnetic layer so that the first portion of the top surface of the main magnetic pole is formed.

A first and a second magnetic head for perpendicular magnetic recording of the present invention each include: a medium facing surface that faces a recording medium; a coil that produces a magnetic field corresponding to data to be written on the recording medium; a main magnetic pole that has an end face located in the medium facing surface, allows a magnetic flux corresponding to the magnetic field produced by the coil to pass, and produces a write magnetic field for writing the data on the recording medium by means of a perpendicular magnetic recording system; a shield made of a magnetic material and having an end face that is located in the medium facing surface to wrap around the end face of the main magnetic pole; and a gap part made of a nonmagnetic material and provided between the main magnetic pole and the shield.

The shield includes a bottom shield, first and second side shields, and a top shield. The bottom shield has an end face and a top surface, the end face being located in the medium facing surface at a position backward of the end face of the main magnetic pole along a direction of travel of the recording medium. The first and second side shields have two end faces that are located in the medium facing surface at positions on opposite sides of the end face of the main magnetic pole in the track width direction. The top shield has an end face that is located in the medium facing surface at a position forward of the end face of the main magnetic pole along the direction of travel of the recording medium. The gap part includes a first gap layer disposed between the main magnetic pole and the bottom shield and between the main magnetic pole and the first and second side shields, and a second gap layer disposed between the main magnetic pole and the top shield.

In the first magnetic head for perpendicular magnetic recording of the present invention, the main magnetic pole has a top surface that is farther from the top surface of the bottom shield, a bottom end that is opposite to the top surface of the main magnetic pole, and first to sixth side surfaces. A width of the end face of the main magnetic pole in the track width direction decreases with decreasing distance to the bottom end of the main magnetic pole. The first and second side surfaces are opposite to each other and located in a first region that extends from the medium facing surface to a position at a distance of 50 to 500 nm from the medium facing surface. The third and fourth side surfaces are located in a second region that is other than the first region. The fifth side surface is located in a boundary between the first and second regions, and connects the first side surface to the third side surface. The sixth side surface is located in the boundary between the first and second regions, and connects the second side surface to the fourth side surface.

The distance between the first side surface and the second side surface in the track width direction decreases with decreasing distance to the bottom end of the main magnetic pole. In the boundary between the first region and the second region, the distance between the third side surface and the fourth side surface in the track width direction as seen at a position closest to the bottom end of the main magnetic pole is greater than the distance between the first side surface and the second side surface in the track width direction as seen at the position closest to the bottom end of the main magnetic pole. Each of the fifth and sixth side surfaces has a width that increases with decreasing distance to the bottom end of the main magnetic pole. The first side shield has two wall faces that are opposed to the first and third side surfaces of the main magnetic pole, respectively. The second side shield has two wall faces that are opposed to the second and fourth side surfaces of the main magnetic pole, respectively.

In the first magnetic head for perpendicular magnetic recording of the present invention, the top surface of the main magnetic pole includes a first portion and a second portion, the first portion having a first edge located in the medium facing surface and a second edge opposite to the first edge, the second portion being located farther from the medium facing surface than is the first portion and being connected to the first portion at the second edge. The distance from the top surface of the bottom shield to an arbitrary point on the first portion decreases with decreasing distance from the arbitrary point to the medium facing surface.

In the second magnetic head for perpendicular magnetic recording of the present invention, the main magnetic pole has a top surface that is farther from the top surface of the bottom shield, a bottom end opposite to the top surface of the main magnetic pole, and first and second side parts. The first side shield has a first sidewall that is opposed to the first side part of the main magnetic pole. The second side shield has a second sidewall that is opposed to the second side part of the main magnetic pole. The first side part bends to form a first corner at a first position that is at a predetermined distance from the medium facing surface. The second side part bends to form a second corner at a second position that is at the predetermined distance from the medium facing surface. At the first position, a distance between the first side part and the first sidewall in the track width direction may start to gradually increase with increasing distance from the medium facing surface. At the second position, a distance between the second side part and the second sidewall in the track width direction may start to gradually increase with increasing distance from the medium facing surface.

The second magnetic head for perpendicular magnetic recording of the present invention may further include a nonmagnetic layer made of a nonmagnetic material. The nonmagnetic layer may have a first portion that is located farther from the medium facing surface than is the first position and interposed between the first side part and the first sidewall, and a second portion that is located farther from the medium facing surface than is the second position and interposed between the second side part and the second sidewall.

According to the method of manufacturing a magnetic head for perpendicular magnetic recording of the present invention, a mold is formed on the top surface of the bottom shield excluding the regions thereof where the first and second side shields are to be formed later, the mold having a shape determined by photolithography and being intended to be removed later. The first and second side shields are thereafter formed on the top surface of the bottom shield by performing plating without forming a seed layer. According to the present invention, since the first and second side shields are formed on the non-etched top surface of the bottom shield, it is possible to prevent the generation of a magnetic defect in the first and second side shields. Furthermore, according to the present invention, the mold whose shape is determined by photolithography is used to determine the shapes of the first and second side shields. This allows the shapes of the first and second side shields to be determined easily.

In the first magnetic head of the present invention, the main magnetic pole has the top surface farther from the top surface of the bottom shield, the bottom end opposite the top surface of the main magnetic pole, and the first to sixth side surfaces defined as in the foregoing. The first side shield has two wall faces that are opposed to the first and third side surfaces of the main magnetic pole, respectively. The second side shield has two wall faces that are opposed to the second and fourth side surfaces of the main magnetic pole, respectively. The first magnetic head of the invention can be formed by the method of manufacturing a magnetic head of the invention as follows. In the method, after the formation of the mold, the first and second side shields are formed on the top surface of the bottom shield by performing plating without forming a seed layer. Then, the first gap layer and the main magnetic pole are formed. Accordingly, the present invention provides a magnetic head for perpendicular magnetic recording that includes a main magnetic pole capable of achieving both the prevention of adjacent track erase and the improvement of write characteristics, and a shield provided around the main magnetic pole. The magnetic head is capable of preventing the generation of a magnetic defect in the two side shields of the shield, and allows the shapes of the main magnetic pole and the two side shields to be determined easily.

The first magnetic head of the invention can be formed especially by one aspect of the method of manufacturing a magnetic head of the invention as follows. In the aspect of the manufacturing method, the step of forming the bottom shield includes the step of forming a first layer and the step of forming a second layer on and around the first layer. In the step of forming the first and second side shields, the first and second side shields are formed by performing plating with the second layer used as a seed layer. The aspect further includes an etching step of removing a part of the second layer other than that lying on the first layer by etching, the etching step being performed between the step of removing the mold and the step of forming the first gap layer. In the etching step, a part of each of the first and second side shields is etched to form the wall face of the first side shield that is to be opposed to the third side surface of the main magnetic pole and the wall face of the second side shield that is to be opposed to the fourth side surface of the main magnetic pole. According to the aspect of the method of manufacturing a magnetic head, it is possible to provide a magnetic head for perpendicular magnetic recording that includes a main magnetic pole capable of achieving both the prevention of adjacent track erase and the improvement of write characteristics, and a shield provided around the main magnetic pole. The magnetic head is capable of preventing the generation of a magnetic defect in the two side shields of the shield, and allows the shapes of the main magnetic pole and the two side shields to be determined easily.

In the second magnetic head of the present invention, the first side part of the first side shield bends to form the first corner at the first position, and the second side part of the second side shield bends to form the second corner at the second position. At the first position, the distance between the first side part and the first sidewall in the track width direction starts to gradually increase with increasing distance from the medium facing surface. At the second position, the distance between the second side part and the second sidewall in the track width direction starts to gradually increase with increasing distance from the medium facing surface. This configuration allows preventing leakage of magnetic flux from the main magnetic pole to the first and second side shields, and consequently allows the improvement of the magnetic head in write characteristics. The second magnetic head of the present invention can be formed by the method of manufacturing a magnetic head of the invention as follows. In the method, after the formation of the mold, the first and second side shields are formed on the top surface of the bottom shield by performing plating without forming a seed layer. Then, the first gap layer and the main magnetic pole are formed. Accordingly, the present invention provides a magnetic head for perpendicular magnetic recording that includes a main magnetic pole and a shield provided around the main magnetic pole, the magnetic head being capable of preventing the generation of a magnetic defect in the two side shields of the shield, allowing the shapes of the main magnetic pole and the two side shields to be determined easily, and being capable of preventing leakage of magnetic flux from the main magnetic pole to the two side shields.

Other objects, features and advantages of the present invention will become fully apparent from the following description.

DETAILED DESCRIPTION OF THE PREFERRED EMBODIMENT

Figure 1:
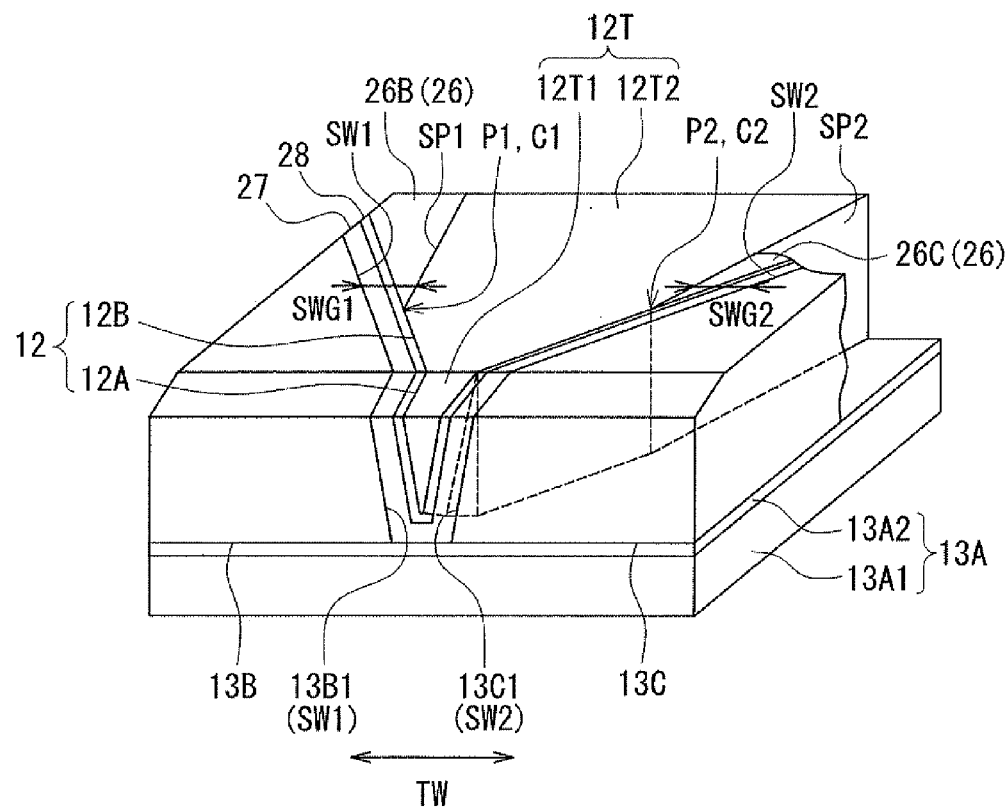
FIG. 1 is a perspective view of a main magnetic pole, two side shields, and a bottom shield of a magnetic head according to an embodiment of the invention in an area near the medium facing surface.
Figure 2:
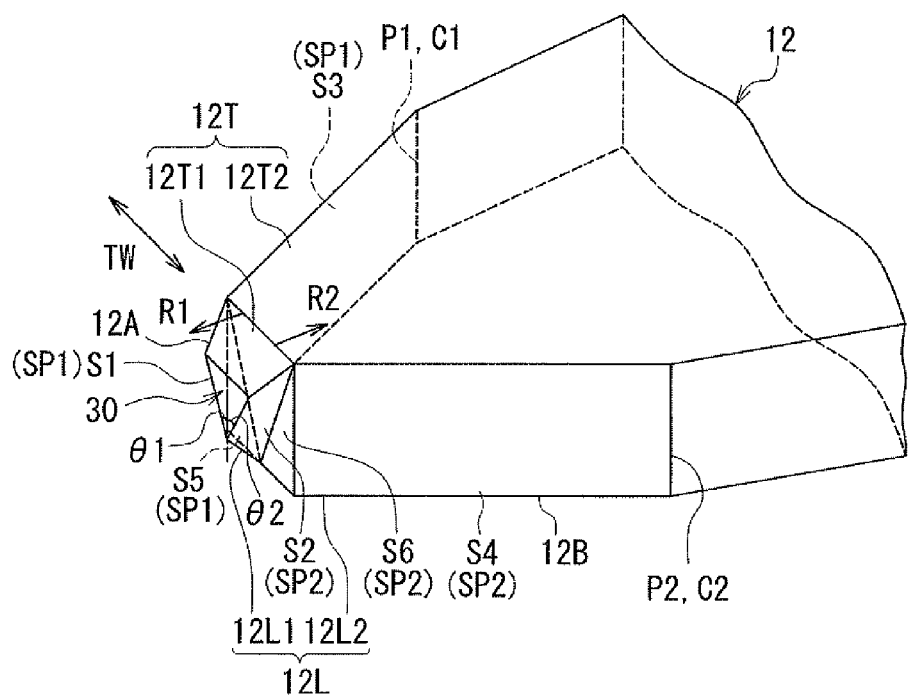
FIG. 2 is a perspective view of the main magnetic pole of the embodiment of the invention in the area near the medium facing surface.
Figure 3:
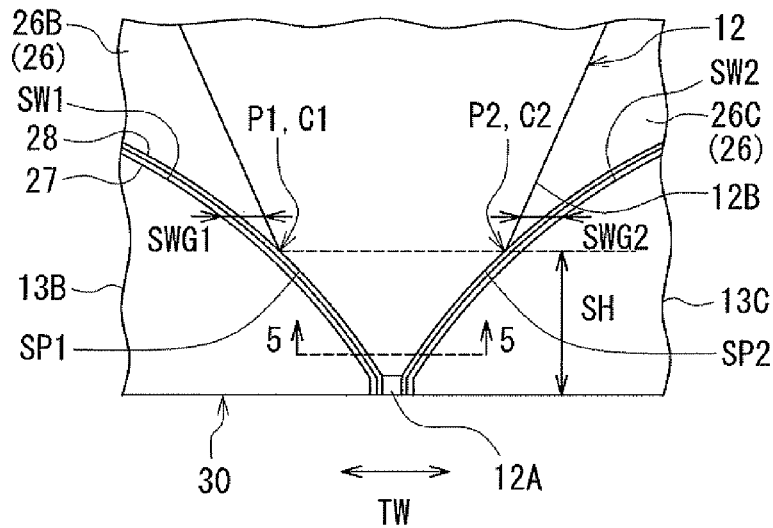
FIG. 3 is a plan view of the main magnetic pole and the two side shields of the embodiment of the invention in the area near the medium facing surface.
Figure 4:
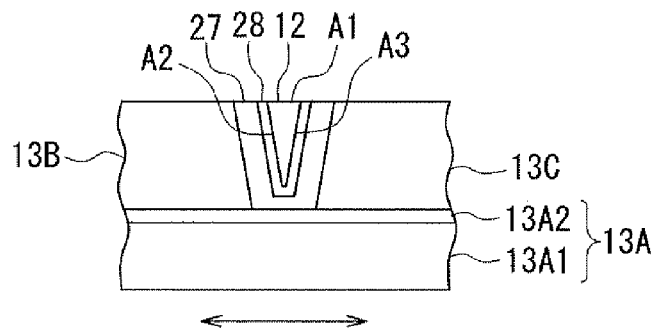
FIG. 4 is a front view showing respective end faces of the main magnetic pole and the two side shields located in the medium facing surface of the embodiment of the invention.
Figure 5:
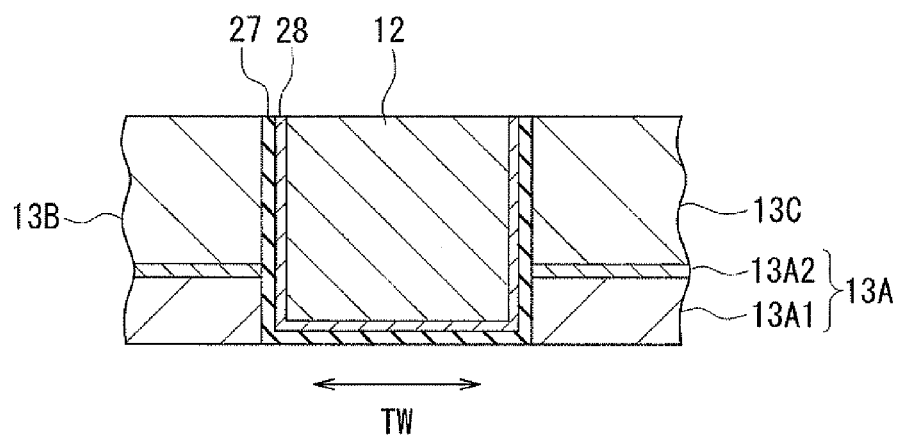
FIG. 5 is a cross-sectional view showing cross sections of the main magnetic pole and the two side shields in the position indicated by line 5-5 of FIG. 3.
Figure 6:
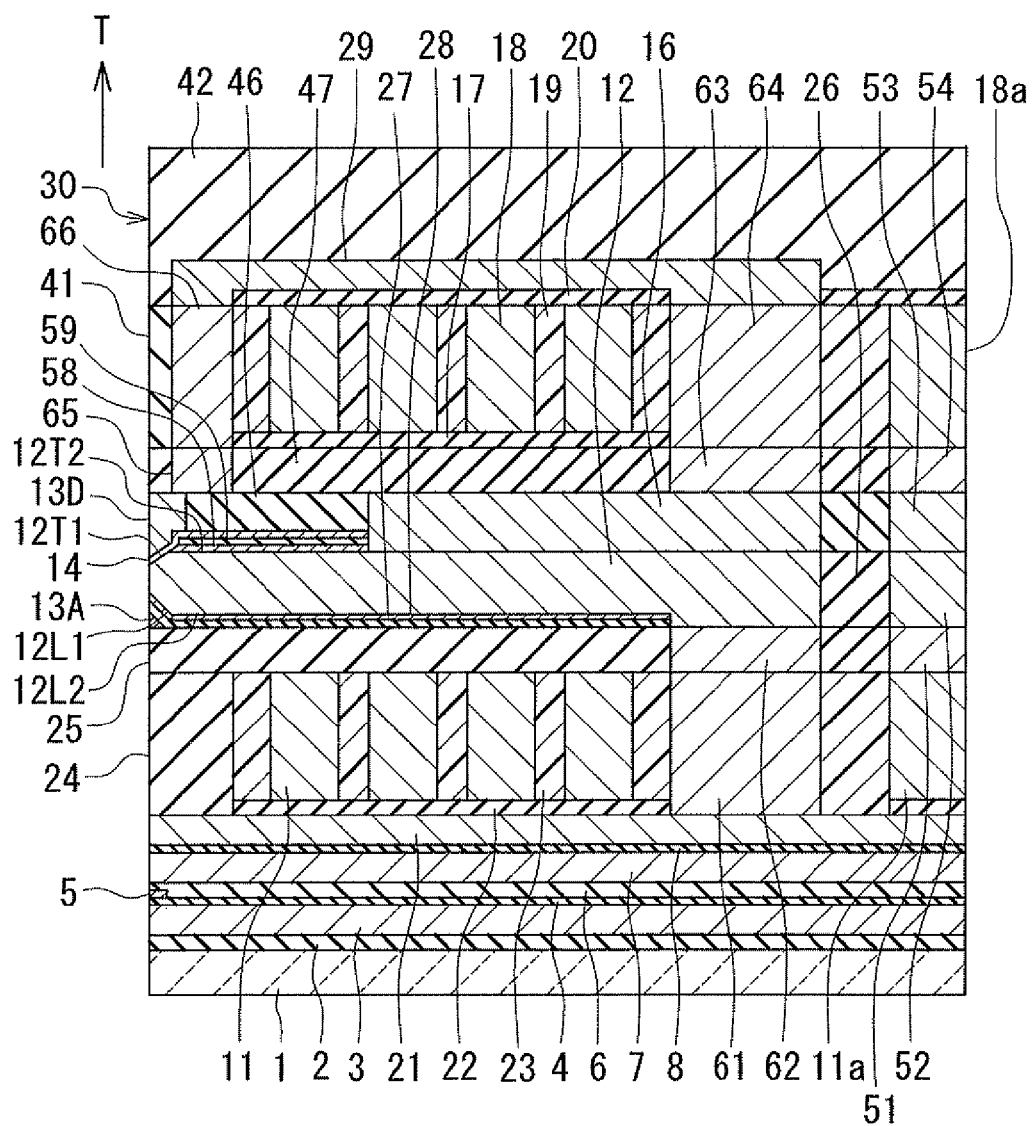
FIG. 6 is a cross-sectional view showing the configuration of the magnetic head according to the embodiment of the invention.
Figure 7:
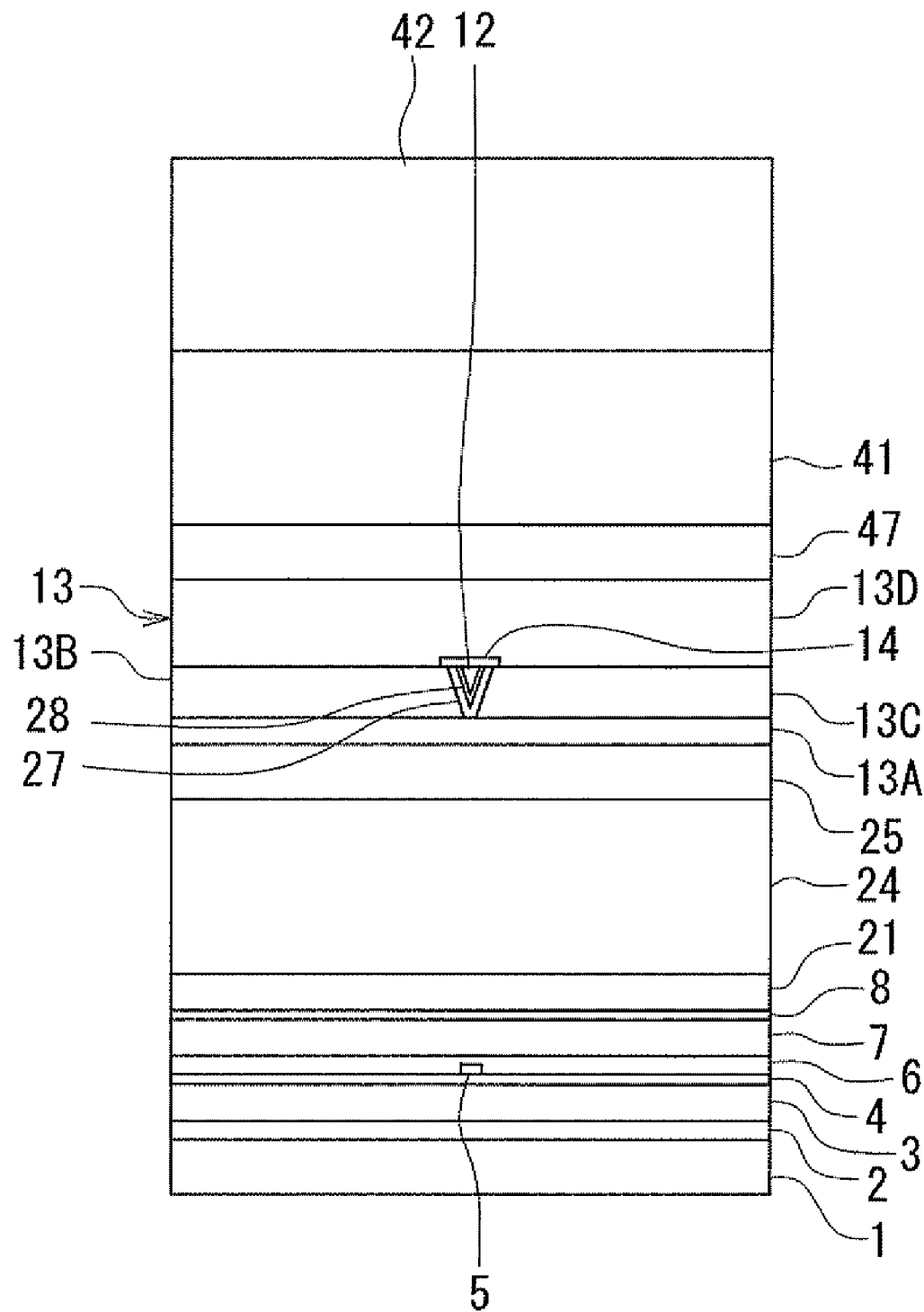
FIG. 7 is a front view showing the medium facing surface of the magnetic head according to the embodiment of the invention.

An embodiment of the present invention will now be described in detail with reference to the drawings. First, reference is made to FIG. 1 to FIG. 7 to describe the configuration of a magnetic head according to the embodiment of the invention. The magnetic head according to the embodiment is one for use in perpendicular magnetic recording. FIG. 1 is a perspective view of a main magnetic pole, two side shields, and a bottom shield of the magnetic head according to the embodiment in an area near the medium facing surface. FIG. 2 is a perspective view of the main magnetic pole of the embodiment in the area near the medium facing surface. FIG. 3 is a plan view of the main magnetic pole and the two side shields of the embodiment in the area near the medium facing surface. FIG. 4 is a front view showing respective end faces of the main magnetic pole and the two side shields located in the medium facing surface of the embodiment. FIG. 5 is a cross-sectional view showing cross sections of the main magnetic pole and the two side shields in the position indicated by line 5-5 of FIG. 3. FIG. 6 is a cross-sectional view showing the configuration of the magnetic head according to the embodiment. FIG. 7 is a front view showing the medium facing surface of the magnetic head according to the embodiment. The arrows with the symbol TW in FIG. 1 to FIG. 5 indicate the track width direction. FIG. 6 shows a cross section perpendicular to the medium facing surface and the top surface of the substrate. The arrow with the symbol T in FIG. 6 indicates the direction of travel of a recording medium.

As shown in FIG. 6 and FIG. 7, the magnetic head according to the embodiment includes: a substrate 1 made of a ceramic material such as aluminum oxide-titanium carbide ($Al_2O_3$—TiC); an insulating layer 2 made of an insulating material such as alumina ($Al_2O_3$) and disposed on the substrate 1; a bottom read shield layer 3 made of a magnetic material and disposed on the insulating layer 2; a bottom read shield gap film 4 which is an insulating film disposed on the bottom read shield layer 3; a magnetoresistive (MR) element 5 as a read element disposed on the bottom read shield gap film 4; a top read shield gap film 6 which is an insulating film disposed on the MR element 5; and a top read shield layer 7 made of a magnetic material and disposed on the top read shield gap film 6.

An end of the MR element 5 is located in a medium facing surface 30 that faces the recording medium. The MR element 5 may be an element formed of a magneto-sensitive film that exhibits a magnetoresistive effect, such as an anisotropic magnetoresistive (AMR) element, a giant magnetoresistive (GMR) element, or a tunneling magnetoresistive (TMR) element. The GMR element may be of a current-in-plane (CIP) type wherein a current to be used for detecting magnetic signals is fed in a direction nearly parallel to the planes of layers constituting the GMR element, or may be of a current-perpendicular-to-plane (CPP) type wherein a current to be used for detecting magnetic signals is fed in a direction nearly perpendicular to the planes of the layers constituting the GMR element.

The parts from the bottom read shield layer 3 to the top read shield layer 7 constitute a read head. The magnetic head further includes a nonmagnetic layer 8 made of a nonmagnetic material and disposed on the top read shield layer 7, and a write head disposed on the nonmagnetic layer 8. The nonmagnetic layer 8 is made of alumina, for example. The write head includes a first coil 11, a second coil 18, a main magnetic pole 12, a shield 13, and a gap part.

Each of the first coil 11 and the second coil 18 is planar spiral-shaped. The first coil 11 and the second coil 18 are connected in series or in parallel. In FIG. 6, the reference symbol 11a indicates a connecting part of the first coil 11 connected to the second coil 18, and the reference symbol 18a indicates a connecting part of the second coil 18 connected to the first coil 11. The magnetic head further includes connecting layers 51, 52, 53, and 54 that are each made of a conductive material and are stacked in this order on the connecting part 11a. The connecting part 18a is disposed on the connecting layer 54.

The first coil 11 and the second coil 18 produce magnetic fields corresponding to data to be written on the recording medium. The main magnetic pole 12 has an end face located in the medium facing surface 30. The main magnetic pole 12 allows magnetic fluxes corresponding to the magnetic fields produced by the coils 11 and 18 to pass, and produces a write magnetic field for writing the data on the recording medium by means of the perpendicular magnetic recording system.

The shield 13 has an end face that is located in the medium facing surface 30 to wrap around the end face of the main magnetic pole 12. The shield 13 is made of a magnetic material. Examples of materials that can be used for the shield 13 include CoFeN, CoNiFe, NiFe, and CoFe.

The magnetic head further includes: a first return yoke layer 21 disposed backward of the main magnetic pole 12 and the shield 13 along the direction T of travel of the recording medium; a second return yoke layer 29 disposed forward of the main magnetic pole 12 and the shield 13 along the direction T of travel of the recording medium; and a top yoke layer 16 disposed on a part of the main magnetic pole 12 away from the medium facing surface 30. The first and second return yoke layers 21 and 29 and the top yoke layer 16 are each made of a magnetic material. Examples of materials that can be used for these layers include CoFeN, CoNiFe, NiFe, and CoFe.

The magnetic head further includes coupling layers 61 and 62 that magnetically couple the main magnetic pole 12 and the first return yoke layer 21 to each other, coupling layers 63 and 64 that magnetically couple the top yoke layer 16 and the second return yoke layer 29 to each other, and coupling layers 65 and 66 that magnetically couple the shield 13 and the second return yoke layer 29 to each other. The coupling layers 61 to 66 are each made of a magnetic material. Examples of materials that can be used for these layers include CoFeN, CoNiFe, NiFe, and CoFe.

The first return yoke layer 21 is disposed on the nonmagnetic layer 8. The first return yoke layer 21 has an end face that is located in the medium facing surface 30 at a position backward of the end face of the main magnetic pole 12 and the end face of the shield 13 along the direction T of travel of the recording medium. The magnetic head further includes a not-shown insulating layer made of an insulating material and disposed around the first return yoke layer 21 on the nonmagnetic layer 8, and an insulating layer 22 made of an insulating material and disposed on a part of the top surface of the first return yoke layer 21. The insulating layer disposed around the first return yoke layer 21 and the insulating layer 22 are each made of alumina, for example. The first coil 11 is disposed on the insulating layer 22.

The coupling layer 61 is disposed on a part of the first return yoke layer 21 away from the medium facing surface 30. The coil 11 is wound around the coupling layer 61.

The magnetic head further includes an insulating layer 23 made of an insulating material and disposed around the coil 11 and the coupling layer 61 and in the space between every adjacent turns of the coil 11, and an insulating layer 24 disposed around the insulating layer 23 and the coupling layer 61. The top surfaces of the coil 11, the coupling layer 61 and the insulating layers 23 and 24 are even with each other. The insulating layer 23 is made of a photoresist, for example. The insulating layer 24 is made of alumina, for example. The coil 11 is made of a conductive material such as copper. The coupling layer 62 is disposed on the coupling layer 61. The connecting layer 51 is disposed on the connecting part 11a of the coil 11.

The magnetic head further includes an insulating layer 25 made of an insulating material and disposed around the connecting layer 51 and the coupling layer 62 on the top surfaces of the coil 11 and the insulating layers 23 and 24. The top surfaces of the connecting layer 51, the coupling layer 62 and the insulating layer 25 are even with each other. The insulating layer 25 is made of alumina, for example.

The shield 13 includes a bottom shield 13A, a first side shield 13B, a second side shield 13C, and a top shield 13D that are magnetically coupled to each other. The first and second side shields 13B and 13C are disposed on opposite sides of the main magnetic pole 12 in the track width direction TW. The bottom shield 13A is located backward of the first and second side shields 13B and 13C along the direction T of travel of the recording medium. The top shield 13D is located forward of the first and second side shields 13B and 13C along the direction T of travel of the recording medium.

The bottom shield 13A has an end face that is located in the medium facing surface 30 at a position backward of the end face of the main magnetic pole 12 along the direction T of travel of the recording medium, and a top surface that is farther from the top surface of the substrate 1. The first and second side shields 13B and 13C have two end faces that are located in the medium facing surface 30 at positions on opposite sides of the end face of the main magnetic pole 12 in the track width direction TW. The top shield 13D has an end face that is located in the medium facing surface 30 at a position forward of the end face of the main magnetic pole 12 along the direction T of travel of the recording medium. As shown in FIG. 2, the main magnetic pole 12 has: a top surface 12T that is farther from the top surface of the bottom shield 13A; a bottom end 12L opposite to the top surface 12T of the main magnetic pole 12; a first side part SP1; and a second side part SP2. The first side shield 13B has a first sidewall SW1 that is opposed to the first side part SP1 of the main magnetic pole 12. The second side shield 13C has a second sidewall SW2 that is opposed to the second side part SP2 of the main magnetic pole 12.

The gap part is made of a nonmagnetic material and disposed between the main magnetic pole 12 and the shield 13. The gap part includes a first gap layer 27 disposed between the main magnetic pole 12 and the bottom shield 13A and between the main magnetic pole 12 and the side shields 13B and 13C, and a second gap layer 14 disposed between the main magnetic pole 12 and the top shield 13D.

The bottom shield 13A is disposed on the insulating layer 25. The first and second side shields 13B and 13C are disposed on the bottom shield 13A and are in contact with the top surface of the bottom shield 13A. The first gap layer 27 is arranged to extend along the sidewalks SW1 and SW2 of the first and second side shields 13B and 13C, the top surface of the bottom shield 13A, and the top surface of the insulating layer 25. The first gap layer 27 is made of a nonmagnetic material. The nonmagnetic material used to form the first gap layer 27 may be an insulating material or a nonmagnetic metal material. Alumina is an example of insulating materials that can be used to form the first gap layer 27. Ru is an example of nonmagnetic metal materials that can be used to form the first gap layer 27. The first gap layer 27 has a thickness in the range of 40 to 100 nm, for example.

The magnetic head further includes a seed layer 28 arranged to extend along the surface of the first gap layer 27. The seed layer 28 is made of a metal material. The metal material used to form the seed layer 28 may be a nonmagnetic metal material or a magnetic metal material. Ru is an example of nonmagnetic metal materials that can be used to form the seed layer 28. NiFe, CoNiFe, and CoFe are examples of magnetic metal materials that can be used to form the seed layer 28. The seed layer 28 is used an electrode and a seed layer when forming the main magnetic pole 12 by plating. The seed layer 28 has a thickness in the range of 40 to 60 nm, for example. The first gap layer 27 and the seed layer 28 have openings for exposing the top surface of the connecting layer 51 and openings for exposing the top surface of the coupling layer 62. The connecting layer 52 is disposed on the connecting layer 51.

The main magnetic pole 12 is disposed over the bottom shield 13A and the insulating layer 25 such that the first gap layer 27 and the seed layer 28 are interposed between the main magnetic pole 12 and the top surfaces of the bottom shield 13A and the insulating layer 25. As shown in FIG. 1 and FIG. 4, the first gap layer 27 and the seed layer 28 are also interposed between the main magnetic pole 12 and the first and second side shields 13B and 13C.

The bottom end 12L of the main magnetic pole 12 is in contact with the top surface of the coupling layer 62. The main magnetic pole 12 is made of a magnetic metal material. Examples of materials that can be used for the main magnetic pole 12 include NiFe, CoNiFe, and CoFe.

The bottom end 12L of the main magnetic pole 12 includes a first portion 12L1 and a second portion 12L2. The first portion 12L1 has a first edge located in the medium facing surface 30 and a second edge opposite to the first edge. The second portion 12L2 is located farther from the medium facing surface 30 than is the first portion 12L1, and is connected to the first portion 12L1 at the second edge. The distance from the top surface of the substrate 1 to an arbitrary point on at least part of the first portion 12L1 increases with decreasing distance from the arbitrary point to the medium facing surface 30. FIG. 2 shows an example where the distance from the top surface of the substrate 1 to an arbitrary point on the entire first portion 12L1 increases with decreasing distance from the arbitrary point to the medium facing surface 30. The first portion 12L1 may be an edge formed by two surfaces meeting each other as shown in FIG. 2, or may be a surface that connects two surfaces to each other. The second portion 12L2 is a surface extending in a direction substantially perpendicular to the medium facing surface 30. The first portion 12L1 faces the bottom shield 13A with the first gap layer 27 and the seed layer 28 therebetween. A part of the bottom shield 13A that faces at least part of the first portion 12L1 increases in thickness (dimension in a direction perpendicular to the top surface of the substrate 1) with decreasing distance to the medium facing surface 30.

The top surface 12T of the main magnetic pole 12 includes a first portion 12T1 and a second portion 12T2. The first portion 12T1 has a first edge located in the medium facing surface 30, and a second edge opposite to the first edge. The second portion 12T2 is located farther from the medium facing surface 30 than is the first portion 12T1, and is connected to the first portion 12T1 at the second edge. The distance from the top surface of the substrate 1 to an arbitrary point on the first portion 12T1 decreases with decreasing distance from the arbitrary point to the medium facing surface 30. The second portion 12T2 extends in a direction substantially perpendicular to the medium facing surface 30.

The magnetic head further includes a nonmagnetic layer 26 made of a nonmagnetic material and disposed around the main magnetic pole 12, the bottom shield 13A, the side shields 13B and 13C, and the connecting layer 52. In the embodiment, the nonmagnetic layer 26 is made of a nonmagnetic insulating material such as alumina, in particular.

The magnetic head further includes a nonmagnetic metal layer 58 made of a nonmagnetic metal material and disposed on a part of the second portion 12T2 of the top surface 12T of the main magnetic pole 12, and an insulating layer 59 made of an insulating material and disposed on the top surface of the nonmagnetic metal layer 58. The nonmagnetic metal layer 58 is made of Ru, NiCr, or NiCu, for example. The insulating layer 59 is made of alumina, for example.

The second gap layer 14 is disposed to cover the first portion 12T1 of the top surface 12T of the main magnetic pole 12, and also the nonmagnetic metal layer 58 and the insulating layer 59. The second gap layer 14 is made of a nonmagnetic material. Examples of materials that can be used for the second gap layer 14 include nonmagnetic insulating materials such as alumina, and nonmagnetic conductive materials such as Ru, NiCu, Ta, W, NiB, and NiP.

The top shield 13D is disposed over the side shields 13B and 13C and the second gap layer 14, and is in contact with the top surfaces of the side shields 13B and 13C and the second gap layer 14. In the medium facing surface 30, part of the end face of the top shield 13D is located at a predetermined distance from the end face of the main magnetic pole 12, the distance being created by the thickness of the second gap layer 14. The thickness of the second gap layer 14 preferably falls within the range of 5 to 60 nm, such as within the range of 30 to 60 nm. The end face of the main magnetic pole 12 has a side that is adjacent to the second gap layer 14, and the side defines the track width.

The top yoke layer 16 is disposed on a part of the main magnetic pole 12 away from the medium facing surface 30. The connecting layer 53 is disposed on the connecting layer 52. The magnetic head further includes a nonmagnetic layer 46 disposed around the top shield 13D, the top yoke layer 16 and the connecting layer 53. The nonmagnetic layer 46 is made of an inorganic insulating material, for example. The inorganic insulating material may be alumina or silicon oxide, for example. The top surfaces of the top shield 13D, the top yoke layer 16, the connecting layer 53 and the nonmagnetic layer 46 are even with each other.

The coupling layer 65 is disposed on the top shield 13D, and is in contact with the top surface of the top shield 13D. The coupling layer 65 has an end face that is closer to the medium facing surface 30, the end face being located at a distance from the medium facing surface 30. The coupling layer 63 is disposed on the top yoke layer 16. The connecting layer 54 is disposed on the connecting layer 53.

The magnetic head further includes a nonmagnetic layer 47 disposed around the connecting layer 54 and the coupling layers 63 and 65. Part of the nonmagnetic layer 47 covers the end face of the coupling layer 65 that is closer to the medium facing surface 30. The nonmagnetic layer 47 is made of an inorganic insulating material, for example. The inorganic insulating material may be alumina or silicon oxide, for example. The top surfaces of the connecting layer 54, the coupling layers 63 and 65 and the nonmagnetic layer 47 are even with each other.

The magnetic head further includes an insulating layer 17 made of an insulating material and disposed on part of the top surface of the nonmagnetic layer 47. The insulating layer 17 is made of alumina, for example. The second coil 18 is disposed on the insulating layer 17.

The coupling layer 66 is disposed on the coupling layer 65. The coupling layer 66 has an end face that is closer to the medium facing surface 30, the end face being located at a distance from the medium facing surface 30. The coupling layer 64 is disposed on the coupling layer 63. The second coil 18 is wound around the coupling layer 64. The connecting part 18a of the second coil 18 is disposed on the connecting layer 54.

The magnetic head further includes an insulating layer 19 made of an insulating material and disposed around the coil 18 and the coupling layer 64 and in the space between every adjacent turns of the coil 18, and an insulating layer 41 made of an insulating material and disposed around the insulating layer 19 and the coupling layers 64 and 66. Part of the insulating layer 41 covers the end face of the coupling layer 66 that is closer to the medium facing surface 30. The top surfaces of the coil 18, the coupling layers 64 and 66 and the insulating layers 19 and 41 are even with each other. The magnetic head further includes an insulating layer 20 disposed to cover the coil 18 and the insulating layer 19. The insulating layer 19 is made of a photoresist, for example. The insulating layers 20 and 41 are made of alumina, for example. The coil 18 is made of a conductive material such as copper.

The second return yoke layer 29 is disposed to couple the coupling layer 66 to the coupling layer 64. The second return yoke layer 29 has an end face that is closer to the medium facing surface 30, the end face being located at a distance from the medium facing surface 30.

The magnetic head further includes a protection layer 42 made of a nonmagnetic material and disposed to cover the second return yoke layer 29. The protection layer 42 is made of, for example, an inorganic insulating material such as alumina.

As has been described, the magnetic head according to the embodiment includes the medium facing surface 30 that faces the recording medium, and the read head and the write head. The read head and the write head are stacked on the substrate 1. The read head is disposed backward along the direction T of travel of the recording medium (in other words, disposed closer to the air inflow end of the slider), while the write head is disposed forward along the direction T of travel of the recording medium (in other words, disposed closer to the air outflow end of the slider).

The read head includes: the MR element 5 as the read element; the bottom read shield layer 3 and the top read shield layer 7 for shielding the MR element 5, having their respective portions that are located near the medium facing surface 30 and opposed to each other with the MR element 5 therebetween the bottom read shield gap film 4 disposed between the MR element 5 and the bottom read shield layer 3; and the top read shield gap film 6 disposed between the MR element 5 and the top read shield layer 7.

The write head includes the first coil 11, the second coil 18, the main magnetic pole 12, the shield 13, the gap part, the top yoke layer 16, the first return yoke layer 21, and the second return yoke layer 29.

The first return yoke layer 21 is connected via the coupling layers 61 and 62 to a part of the main magnetic pole 12 away from the medium facing surface 30. The second return yoke layer 29 is connected via the top yoke layer 16 and the coupling layers 63 and 64 to a part of the main magnetic pole 12 away from the medium facing surface 30. A part of the first coil 11 passes through a space that is surrounded by the main magnetic pole 12, the first return yoke layer 21, and the coupling layers 61 and 62. A part of the second coil 18 passes through a space that is surrounded by the main magnetic pole 12, the top yoke layer 16, the second return yoke layer 29, and the coupling layers 63, 64, 65, and 66.

The shield 13 includes: the first and second side shields 13B and 13C disposed on opposite sides of the main magnetic pole 12 in the track width direction TW; the bottom shield 13A disposed backward of the first and second side shields 13B and 13B along the direction T of travel of the recording medium; and the top shield 13D disposed forward of the first and second side shields 13B and 13B along the direction T of travel of the recording medium. The first and second side shields 13B and 13C are located at positions that are in the vicinity of the medium facing surface 30 and symmetric with respect to the center of the main magnetic pole 12 in the track width direction TW.

The bottom shield 13A has the end face that is located in the medium facing surface 30 at the position backward of the end face of the main magnetic pole 12 along the direction T of travel of the recording medium, and the top surface that is farther from the top surface of the substrate 1. As shown in FIG. 1, the bottom shield 13A includes a first layer 13A1, and a second layer 13A2 lying on the first layer 13A1. The first and second side shields 13B and 13C have the two end faces that are located in the medium facing surface 30 at the positions on opposite sides of the end face of the main magnetic pole 12 in the track width direction TW. The top shield 13D has the end face that is located in the medium facing surface 30 at the position forward of the end face of the main magnetic pole 12 along the direction T of travel of the recording medium. In the medium facing surface 30, part of the end face of the top shield 13D is located at a predetermined distance from the end face of the main magnetic pole 12, the distance being created by the thickness of the second gap layer 14. The end face of the main magnetic pole 12 has a side that is adjacent to the second gap layer 14, and the side defines the track width.

A detailed description will now be given of the shape of the main magnetic pole 12. As shown in FIG. 2, the main magnetic pole 12 includes a track width defining portion 12A and a wide portion 12B. The track width defining portion 12A has an end face located in the medium facing surface 30, and an end opposite to the end face. The wide portion 12B is connected to the end of the track width defining portion 12A. The main magnetic pole 12 has: the top surface 12T that is farther from the top surface of the bottom shield 13A; the bottom end 12L opposite to the top surface 12T of the main magnetic pole 12; and the first and second side parts SP1 and SP2. The first side part SP1 includes a first side surface S1, a third side surface S3, and a fifth side surface S5. The second side part SP2 includes a second side surface S2, a fourth side surface S4, and a sixth side surface S6. When compared in width in the track width direction TW, the top surface 12T of the wide portion 12B is greater than that of the track width defining portion 12A. The top surface 12T of the track width defining portion 12A is almost constant in width in the track width direction TW, regardless of the distance from the medium facing surface 30. The top surface 12T of the wide portion 12B is, for example, such that its width in the track width direction TW is equal to that of the top surface 12T of the track width defining portion 12A when seen in the boundary between the track width defining portion 12A and the wide portion 12B, and the width gradually becomes greater with increasing distance from the medium facing surface 30, and then becomes constant. Here, the length of the track width defining portion 12A in the direction perpendicular to the medium facing surface 30 will be referred to as neck height. The neck height falls within the range of 0 to 0.3 μm, for example. When the neck height is 0, there is no track width defining portion 12A, and the wide portion 12B thus has an end face located in the medium facing surface 30.

As shown in FIG. 4, the end face of the main magnetic pole 12 or the end face of the track width defining portion 12A located in the medium facing surface 30 has a first side A1 adjacent to the second gap layer 14, a second side A2 connected to an end of the first side A1, and a third side A3 connected to the other end of the first side A1. The first side A1 defines the track width. The width of the end face of the main magnetic pole 12 or the end face of the track width defining portion 12A in the track width direction TW decreases with decreasing distance to the bottom end 12L of the main magnetic pole 12. Each of the second side A2 and the third side A3 is at an angle in the range of, for example, 7° to 17°, or preferably in the range of 10° to 15°, with respect to the direction perpendicular to the top surface of the substrate 1. The first side A1 preferably has a length in the range of 0.05 to 0.20 µm, for example.

The end face of the seed layer 28 located in the medium facing surface 30 has two sides that are adjacent to the second gap layer 14. If the seed layer 28 is made of a magnetic metal material, the track width is equal to the total length of the first side A1 and the foregoing two sides of the end face of the seed layer 28. If the seed layer 28 is made of a nonmagnetic metal material, the track width is equal to the length of the first side A1.

In the embodiment, throat height is the distance from the medium facing surface 30 to the point at which the distance between the main magnetic pole 12 and the top shield 13D starts to increase as seen from the medium facing surface 30. In the embodiment, the throat height is equal to the distance from the medium facing surface 30 to an edge of the bottom surface of the nonmagnetic metal layer 58 closest to the medium facing surface 30. The throat height falls within the range of 0.05 to 0.3 µm, for example.

As shown in FIG. 2, the bottom end 12L of the main magnetic pole 12 includes the first portion 12L1 that has the first edge located in the medium facing surface 30 and the second edge opposite to the first edge, and the second portion 12L2 that is located farther from the medium facing surface 30 than is the first portion 12L1 and connected to the first portion 12L1 at the second edge. The distance from the top surface of the substrate 1 to an arbitrary point on at least part of the first portion 12L1 increases with decreasing distance from the arbitrary point to the medium facing surface 30. The second portion 12L2 extends in a direction substantially perpendicular to the medium facing surface 30. At least part of the first portion 12L1 is at an angle in the range of for example, 12° to 45°, with respect to the direction perpendicular to the medium facing surface 30.

As shown in FIG. 1 and FIG. 2, the top surface 12T of the main magnetic pole 12 includes the first portion 12T1 that has the first edge located in the medium facing surface 30 and the second edge opposite to the first edge, and the second portion 12T2 that is located farther from the medium facing surface 30 than is the first portion 12T1 and connected to the first portion 12T1 at the second edge. The distance from the top surface of the substrate 1 to an arbitrary point on the first portion 12T1 decreases with decreasing distance from the arbitrary point to the medium facing surface 30. The second portion 12T2 extends in a direction substantially perpendicular to the medium facing surface 30. The first portion 12T1 is at an angle in the range of, for example, 12° to 45°, with respect to the direction perpendicular to the medium facing surface 30. The first portion 12T1 may have two flat parts that are at respective different angles with respect to the direction perpendicular to the medium facing surface 30.

FIG. 2 shows an example where the distance from the medium facing surface 30 to the boundary between the first portion 12T1 and the second portion 12T2, and the distance from the medium facing surface 30 to the boundary between the first portion 12L1 and the second portion 12L2, are both equal to the neck height or the distance from the medium facing surface 30 to the boundary between the track width defining portion 12A and the wide portion 12B. Nevertheless, the distance from the medium facing surface 30 to the boundary between the first portion 12T1 and the second portion 12T2, and the distance from the medium facing surface 30 to the boundary between the first portion 12L1 and the second portion 12L2, may each be smaller or greater than the neck height.

As shown in FIG. 2, the first and second side surfaces S1 and S2 are opposite to each other and located in a first region R1 that extends from the medium facing surface 30 to a position at a predetermined distance from the medium facing surface 30. The third and fourth side surfaces S3 and S4 are located in a second region R2 other than the first region R1. The foregoing predetermined distance is in the range of 50 to 500 nm, and preferably falls within the range of 100 to 200 nm. The fifth side surface S5 is located in the boundary between the first region R1 and the second region R2, and connects the first side surface S1 to the third side surface S3. The sixth side surface S6 is located in the boundary between the first region R1 and the second region R2, and connects the second side surface S2 to the fourth side surface S4.

The distance between the first side surface S1 and the second side surface S2 in the track width direction TW decreases with decreasing distance to the bottom end 12L of the main magnetic pole 12. In the boundary between the first region R1 and the second region R2, the distance between the third side surface S3 and the fourth side surface S4 in the track width direction TW as seen at the position closest to the bottom end 12L of the main magnetic pole 12 is greater than the distance between the first side surface S1 and the second side surface S2 in the track width direction TW as seen at the position closest to the bottom end 12L of the main magnetic pole 12. Each of the fifth and sixth side surfaces S5 and S6 has a width that increases with decreasing distance to the bottom end 12L of the main magnetic pole 12.

An angle $\theta 1$ that the first side surface S1 forms with respect to the direction perpendicular to the top surface of the substrate 1 and an angle $\theta 2$ that the second side surface S2 forms with respect to the direction perpendicular to the top surface of the substrate 1 are both in the range of, for example, 7° to 17°, and preferably fall within the range of 10° to 15°.

The distance between the third side surface S3 and the fourth side surface S4 in the track width direction TW may be uniform regardless of the distance from the top surface of the substrate 1, or may decrease or increase with decreasing distance to the top surface of the substrate 1.

When the distance between the third side surface S3 and the fourth side surface S4 in the track width direction TW is uniform regardless of the distance from the top surface of the substrate 1, both the third side surface S3 and the fourth side surface S4 form 0° with respect to the direction perpendicular to the top surface of the substrate 1.

When the distance between the third side surface S3 and the fourth side surface S4 in the track width direction TW decreases with decreasing distance to the top surface of the substrate 1, the angle that the third side surface S3 forms with respect to the direction perpendicular to the top surface of the substrate 1 is smaller than the angle $\theta 1$ that the first side surface S1 forms with respect to the direction perpendicular to the top surface of the substrate 1, and the angle that the fourth side surface S4 forms with respect to the direction perpendicular to the top surface of the substrate 1 is smaller than the angle $\theta 2$ that the second side surface S2 forms with respect to the direction perpendicular to the top surface of the substrate 1. Here, for the case where the distance between the third side surface S3 and the fourth side surface S4 in the track width direction TW decreases with decreasing distance to the top surface of the substrate 1, the angles that the side surfaces S3 and S4 form with respect to the direction perpendicular to the top surface of the substrate 1 will be expressed in positive values. For the case where the distance between the third side surface S3 and the fourth side surface S4 in the track width direction TW increases with decreasing distance to the top surface of the substrate 1, the angles that the side surfaces S3 and S4 form with respect to the direction perpendicular to the top surface of the substrate 1 will be expressed in negative values. The angles that the side surfaces S3 and S4 form with respect to the direction perpendicular to the top surface of the substrate 1 are in the range of, for example, −7° to 7°, and preferably fall within the range of −7° to 0°.

FIG. 2 shows an example where the distance from the medium facing surface 30 to the boundary between the first region R1 and the second region R2 is equal to the neck height or the distance from the medium facing surface 30 to the boundary between the track width defining portion 12A and the wide portion 12B. Nevertheless, the distance from the medium facing surface 30 to the boundary between the first region R1 and the second region R2 may be either smaller or greater than the neck height. In the embodiment, even when the neck height is zero, the boundary between the first region R1 and the second region R2 exists at a predetermined distance from the medium facing surface 30.

As shown in FIG. 1 to FIG. 3, the first side part SP1 of the main magnetic pole 12 bends to form a first corner C1 at a first position P1 that is at a predetermined distance SH (see FIG. 3) from the medium facing surface 30. The second side part SP2 of the main magnetic pole 12 bends to form a second corner C2 at a second position P2 that is at the distance SH from the medium facing surface 30. The distance SH preferably falls within the range of 0.1 to 0.5 μm, more preferably within the range of 0.1 to 0.3 μm.

The first sidewall SW1 of the first side shield 13B has a wall face 13B1 that is opposed to the first side surface S1 of the main magnetic pole 12, and a wall face that is opposed to the third side surface S3 of the main magnetic pole 12. The second sidewall SW2 of the second side shield 13C has a wall face 13C1 that is opposed to the second side surface S2 of the main magnetic pole 12, and a wall face that is opposed to the fourth side surface S4 of the main magnetic pole 12. The wall faces 13B1 and 13C1 face each other. A description will be given later about the wall face of the first side shield 13B opposed to the third side surface S3 of the main magnetic pole 12 and the wall face of the second side shield 13C opposed to the fourth side surface S4 of the main magnetic pole 12.

As shown in FIG. 1 to FIG. 3, at the first position P1, the distance SWG1 between the first side part SP1 and the first sidewall SW1 in the track width direction TW starts to gradually increase with increasing distance from the medium facing surface 30. Likewise, at the second position P2, the distance SWG2 between the second side part SP2 and the second sidewall SW2 in the track width direction TW starts to gradually increase with increasing distance from the medium facing surface 30.

The nonmagnetic layer 26 has first and second portions 26B and 26C that are located away from the medium facing surface 30 and interposed between the wide portion 12B of the main magnetic pole 12 and the side shields 13B and 13C. The first portion 26B is located farther from the medium facing surface 30 than is the first position P1 and interposed between the first side part SP1 and the first sidewall SW1. The second portion 26C is located farther from the medium facing surface 30 than is the second position P2 and interposed between the second side part SP2 and the second sidewall SW2. In areas that are located closer to the medium facing surface 30 than are the positions P1 and P2, there are present the first gap layer 27 and the seed layer 28 but no nonmagnetic layer 26 between the first side part SP1 and the first sidewall SW1 and between the second side part SP2 and the second sidewall SW2. In an area that is located farther from the medium facing surface 30 than is the position P1, there are present the first gap layer 27, the seed layer 28 and the first portion 26B between the first side part SP1 and the first sidewall SW1. In an area that is located farther from the medium facing surface 30 than is the position P2, there are present the first gap layer 27, the seed layer 28 and the second portion 26C between the second side part SP2 and the second sidewall SW2. The widths of the first and second portions 26B and 26C in the track width direction TW gradually increase with increasing distance from the medium facing surface 30. As a result, at the positions P1 and P2, respectively, the distances SWG1 and SWG2 start to gradually increase with increasing distance from the medium facing surface 30, as previously described. The two portions 26B and 26C have the function of magnetically isolating the wide portion 12B of the main magnetic pole 12 from the side shields 13B and 13C.

The function and effects of the magnetic head according to the embodiment will now be described. The magnetic head writes data on a recording medium with the write head and reads data written on the recording medium with the read head. In the write head, the coils 11 and 18 produce magnetic fields corresponding to data to be written on the recording medium. A magnetic flux corresponding to the magnetic field produced by the coil 11 passes through the coupling layers 61 and 62 and the main magnetic pole 12. A magnetic flux corresponding to the magnetic field produced by the coil 18 passes through the coupling layers 64 and 63, the top yoke layer 16, and the main magnetic pole 12. Consequently, the main magnetic pole 12 allows the magnetic flux corresponding to the magnetic field produced by the coil 11 and the magnetic flux corresponding to the magnetic field produced by the coil 18 to pass.

The coils 11 and 18 may be connected in series or in parallel. In either case, the coils 11 and 18 are connected such that the magnetic flux corresponding to the magnetic field produced by the coil 11 and the magnetic flux corresponding to the magnetic field produced by the coil 18 flow in the same direction in the main magnetic pole 12.

The main magnetic pole 12 allows the magnetic fluxes corresponding to the magnetic fields produced by the coils 11 and 18 to pass as mentioned above, and produces a write magnetic field for writing data on the recording medium by means of the perpendicular magnetic recording system.

The shield 13 takes in a disturbance magnetic field applied to the magnetic head from the outside thereof. This allows preventing erroneous writing on the recording medium induced by the disturbance magnetic field intensively taken into the main magnetic pole 12. The shield 13 also has the function of taking in a magnetic flux that is produced from the end face of the main magnetic pole 12 and that expands in directions other than the direction perpendicular to the plane of the recording medium, thereby preventing the magnetic flux from reaching the recording medium. The shield 13, the first return yoke layer 21, and the second return yoke layer 29 have the function of returning a magnetic flux that has been produced from the end face of the main magnetic pole 12 and has magnetized the recording medium.

The shield 13 includes the bottom shield 13A, the first side shield 13B, the second side shield 13C, and the top shield 13D. The bottom shield 13A has the end face that is located in the medium facing surface 30 at the position backward of the end face of the main magnetic pole 12 along the direction T of travel of the recording medium. The first and second side shields 13B and 13C have the two end faces that are located in the medium facing surface 30 at the positions on opposite sides of the end face of the main magnetic pole 12 in the track width direction TW. The top shield 13D has the end face that is located in the medium facing surface 30 at the position forward of the end face of the main magnetic pole 12 along the direction T of travel of the recording medium. The embodiment thus makes it possible that, in regions both backward and forward of the end face of the main magnetic pole 12 along the direction T of travel of the recording medium and regions on opposite sides of the end face of the main magnetic pole 12 in the track width direction TW, magnetic flux that is produced from the end face of the main magnetic pole 12 and expands in directions other than the direction perpendicular to the plane of the recording medium can be taken in and thereby prevented from reaching the recording medium. Consequently, the embodiment allows preventing the occurrence of adjacent track erase.

In the embodiment, as shown in FIG. 4, the end face of the main magnetic pole 12 located in the medium facing surface 30 is such that its width in the track width direction decreases with decreasing distance to the top surface of the substrate 1. This configuration of the embodiment allows preventing the occurrence of adjacent track erase resulting from the skew.

In the embodiment, the bottom end 12L of the main magnetic pole 12 includes the first portion 12L1 that has the first edge located in the medium facing surface 30 and the second edge opposite to the first edge, and the second portion 12L2 that is located farther from the medium facing surface 30 than is the first portion 12L1 and connected to the first portion 12L1 at the second edge. The top surface 12T of the main magnetic pole 12 includes the first portion 12T1 that has the first edge located in the medium facing surface 30 and the second edge opposite to the first edge, and the second portion 12T2 that is located farther from the medium facing surface 30 than is the first portion 12T1 and connected to the first portion 12T1 at the second edge. The distance from the top surface of the substrate 1 to an arbitrary point on at least part of the first portion 12L1 increases with decreasing distance from the arbitrary point to the medium facing surface 30, while the distance from the top surface of the substrate 1 to an arbitrary point on the first portion 12T1 decreases with decreasing distance from the arbitrary point to the medium facing surface 30. This configuration of the embodiment allows preventing the occurrence of adjacent track erase resulting from the skew and allows the main magnetic pole 12 to guide a large amount of magnetic flux to the medium facing surface 30, thereby allowing the improvement of write characteristics (overwrite property).

In the embodiment, the main magnetic pole 12 has the first to sixth side surfaces S1 to S6. The first and second side surfaces S1 and S2 are opposite to each other and located in the first region R1 that extends from the medium facing surface 30 to the position at a predetermined distance from the medium facing surface 30. The third and fourth side surfaces S3 and S4 are located in the second region R2 other than the first region R1. The fifth side surface S5 is located in the boundary between the first region R1 and the second region R2, and connects the first side surface S1 to the third side surface S3. The sixth side surface S6 is located in the boundary between the first region R1 and the second region R2, and connects the second side surface S2 to the fourth side surface S4. The distance between the first side surface S1 and the second side surface S2 in the track width direction TW decreases with decreasing distance to the bottom end 12L of the main magnetic pole 12. In the boundary between the first region R1 and the second region R2, the distance between the third side surface S3 and the fourth side surface S4 in the track width direction TW as seen at the position closest to the bottom end 12L of the main magnetic pole 12 is greater than the distance between the first side surface S1 and the second side surface S2 in the track width direction TW as seen at the position closest to the bottom end 12L of the main magnetic pole 12. Both the fifth side surface S5 and the sixth side surface S6 increase in width with decreasing distance to the bottom end 12L of the main magnetic pole 12.

Here, a magnetic head having a main magnetic pole of the following configuration will be considered as a magnetic head of a comparative example to be compared with the embodiment. In the main magnetic pole of the comparative example, the distance between the third side surface S3 and the fourth side surface S4 in the track width direction decreases with decreasing distance to the top surface of the substrate 1, and the angles that the third and fourth side surfaces S3 and S4 form with respect to the direction perpendicular to the top surface of the substrate 1 are equal to the angles $\theta 1$ and $\theta 2$, respectively. The main magnetic pole of the comparative example is not capable of passing a large amount of magnetic flux, especially in the area near the boundary between the track width defining portion 12A and the wide portion 12B. This results in degradation of write characteristics such as the overwrite property.

As compared with the comparative example, the main magnetic pole 12 of the embodiment has a larger cross-sectional area perpendicular to direction of flow of magnetic flux in the area near the boundary between the track width defining portion 12A and the wide portion 12B. The main magnetic pole 12 of the embodiment is therefore capable of passing a larger amount of magnetic flux in the area near the boundary between the track width defining portion 12A and the wide portion 12B, as compared with the comparative example. The embodiment thus allows making the write characteristics such as the overwrite property better than those that can be provided by the comparative example.

As thus described, the main magnetic pole 12 of the embodiment is capable of achieving both the prevention of adjacent track erase and the improvement of write characteristics.

A method of manufacturing the magnetic head according to the embodiment will now be described. In the method of manufacturing the magnetic head according to the embodiment, first, as shown in FIG. 6 and FIG. 7, the insulating layer 2, the bottom read shield layer 3, and the bottom read shield gap film 4 are formed in this order on the substrate 1. Next, the MR element 5 and not-shown leads connected to the MR element 5 are formed on the bottom read shield gap film 4. The MR element 5 and the leads are then covered with the top read shield gap film 6. Next, the top read shield layer 7 and the nonmagnetic layer 8 are formed in this order on the top read shield gap film 6.

Next, the first return yoke layer 21 is formed on the nonmagnetic layer 8 by frame plating, for example. Next, a not-shown insulating layer is formed over the entire top surface of the stack. The insulating layer is then polished by, for example, chemical mechanical polishing (hereinafter referred to as CMP), until the first return yoke layer 21 is exposed. The top surface of the first return yoke layer 21 and that of the insulating layer around the same are thereby made even with each other.

Next, the insulating layer 22 is formed over an area of the top surfaces of the first return yoke layer 21 and the insulating layer surrounding the same over which the coil 11 is to be disposed later. The coil 11 is then formed on the insulating layer 22 by frame plating, for example. Next, the coupling layer 61 is formed on the first return yoke layer 21 by frame plating, for example. Note that the coil 11 may be formed after the coupling layer 61 is formed.

Next, the insulating layer 23 is formed around the coil 11 and the coupling layer 61 and in the space between every adjacent turns of the coil 11. Next, the insulating layer 24 is formed over the entire top surface of the stack. The insulating layer 24 is then polished by, for example, CMP, until the coil 11 and the coupling layer 61 are exposed. The top surfaces of the coil 11, the coupling layer 61 and the insulating layers 23 and 24 are thereby made even with each other.

Next, frame plating, for example, is performed to form the coupling layer 62 on the coupling layer 61 and form the connecting layer 51 on the connecting part 11a of the coil 11. Next, the insulating layer 25 is formed over the entire top surface of the stack. The insulating layer 25 is then polished by, for example, CMP, until the connecting layer 51 and the coupling layer 62 are exposed. The top surfaces of the connecting layer 51, the coupling layer 62 and the insulating layer 25 are thereby made even with each other.

Reference is now made to FIG. 8A to FIG. 25B to describe a series of steps until the formation of the top shield 13D, the top yoke layer 16, the connecting layer 53 and the nonmagnetic layer 46 after the foregoing step. FIG. 8A to FIG. 25B each show a stack of layers in the process of manufacturing the magnetic head. FIG. 8A to FIG. 20A, and FIG. 22A each show the top surface of part of the stack. FIG. 8B to FIG. 20B, FIG. 22B, FIG. 23A, and FIG. 25A each show a cross section of the stack taken at the position where the medium facing surface 30 is to be formed. FIG. 8C, FIG. 22C, FIG. 23B, FIG. 24, and FIG. 25B each show a cross section perpendicular to the medium facing surface 30 and the top surface of the substrate 1. FIG. 15C to FIG. 20C each show a cross section parallel to the position where the medium facing surface 30 is to be formed. FIG. 21 shows a part of the stack in the vicinity of the position where the medium facing surface 30 is to be formed. The parts that are closer to the substrate 1 than is the insulating layer 25 are not shown in FIG. 8A to FIG. 25B. The symbol "ABS" in FIG. 8A to FIG. 25B indicates the position where the medium facing surface 30 is to be formed.

Figure 8A:
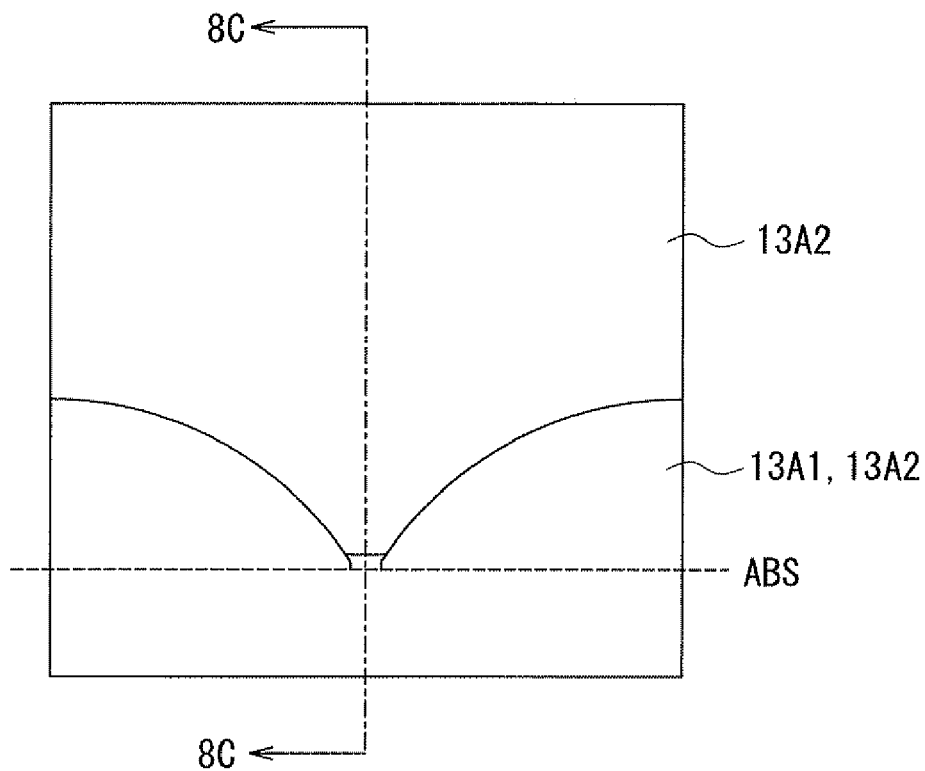
FIG. 8A to FIG. 8C are explanatory diagrams showing a step of a method of manufacturing the magnetic head according to the embodiment of the invention.
Figure 8B:
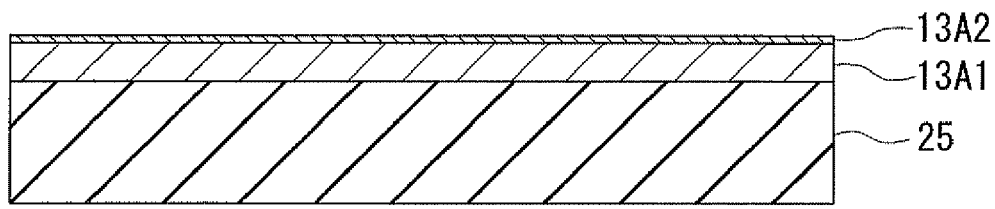
Figure 8C:
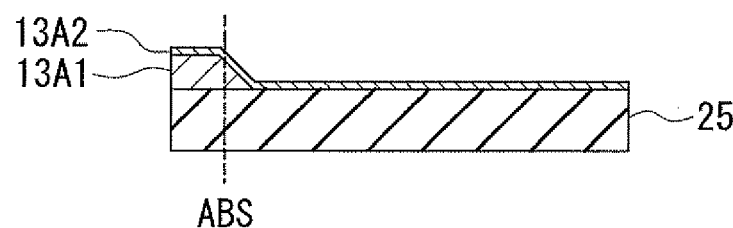

FIG. 8A to FIG. 8C show a step that follows the step of evening the top surfaces of the connecting layer 51, the coupling layer 62 and the insulating layer 25. FIG. 8C shows a cross section of the stack taken at the position indicated by line 8C-8C. In this step, first, a magnetic layer to later become the first layer 13A1 of the bottom shield 13A is formed by frame plating, for example. Next, a part of the magnetic layer is taper-etched by, for example, ion beam etching, so that the top surface of the magnetic layer has a part to be opposed to the first portion 12L1 of the bottom end 12L of the main magnetic pole 12 to be formed later. As a result, the magnetic layer becomes the first layer 13A1. Next, the second layer 13A2 of the bottom shield 13A is formed on and around the first layer 13A1, namely on the insulating layer 25, by sputtering or ion beam deposition, for example. The second layer 13A2 is to later become a seed layer to be used when a magnetic layer to later become the side shields 13B and 13C is formed on the top surface of the bottom shield 13A by plating. A part of the second layer 13A2 other than that lying on the first layer 13A1 is to be removed by etching later. The bottom shield 13A is composed of the first layer 13A1 and the etched second layer 13A2. In the following description, for the sake of convenience, the stack of the first layer 13A1 and the second layer 13A2 will be referred to as the bottom shield 13A even before the second layer 13A2 is etched.

Next, a series of steps shown in FIG. 9A to FIG. 13B are performed to form a mold on the top surface of the bottom shield 13A excluding regions thereof where the side shields 13B and 13C are to be formed later. The mold has a shape determined by photolithography and is to be removed later.

Figure 9A:
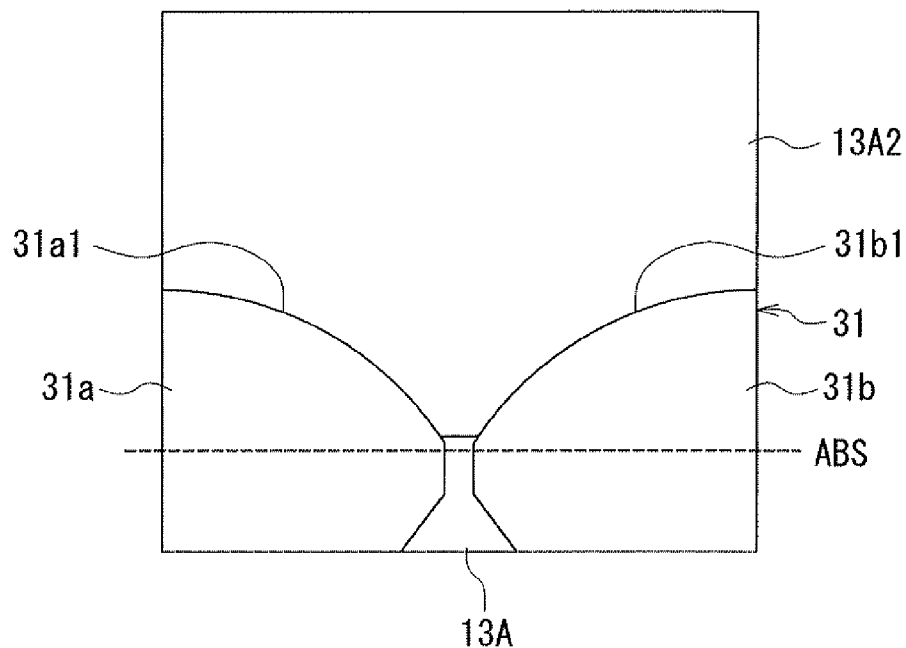
FIG. 9A and FIG. 9B are explanatory diagrams showing a step that follows the step shown in FIG. 8A to FIG. 8C.
Figure 9B:
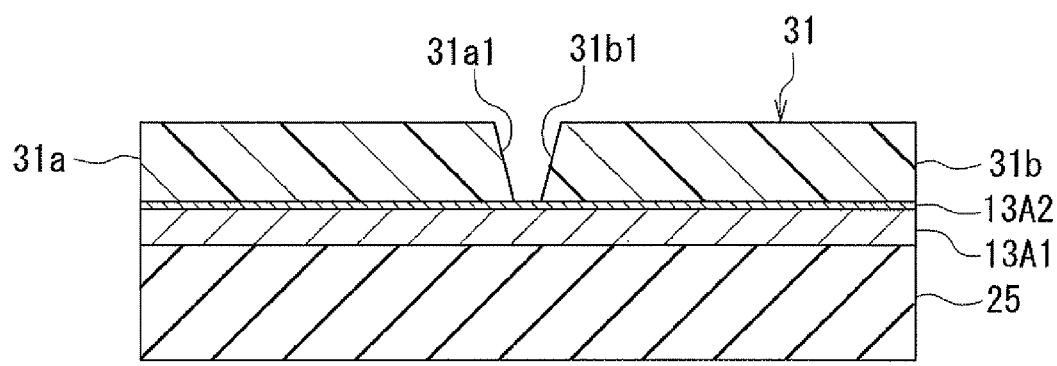

FIG. 9A and FIG. 9B show a step that follows the step shown in FIG. 8A to FIG. 8C. In this step, a photoresist layer made of a positive photoresist is patterned by photolithography to form a first photoresist layer 31 on the regions of the top surface of the bottom shield 13A where the side shields 13B and 13C are to be formed later. The first photoresist layer 31 includes a portion 31a that has a shape corresponding to the shape of the first side shield 13B to be formed later, and a portion 31b that has a shape corresponding to the shape of the second side shield 13C to be formed later. More specifically, in this step, first, a photoresist layer made of a positive photoresist is formed over the entire top surface of the stack. The photoresist layer is formed such that its top surface is higher in level than the top surfaces of the first and second side shields 13B and 13C to be formed later. Next, the photoresist layer is selectively exposed to light by using a photomask. The photomask has a light-transmitting part which allows the light for exposure to pass therethrough, and a light-blocking part which blocks the light for exposure. The light-blocking part of the photomask includes portions that have shapes corresponding to the planar shapes of the first and second side shields 13B and 13C to be formed later. Next, the exposed photoresist layer is developed. As a result of the exposure, the area of the photoresist layer irradiated with the light having passed through the light-transmitting part of the photomask becomes soluble in a developing solution, while the other area remains insoluble in the developing solution. The photoresist layer remaining after the development makes the first resist layer 31.

The portions 31a and 31b of the first resist layer 31 respectively have wall faces 31a1 and 31b1 that respectively correspond to the wall faces 13B1 and 13C1 of the side shields 13B and 13C to be formed later. In this step, the photoresist layer is patterned so that the wall faces 31a1 and 31b1 are both tilted with respect to the direction perpendicular to the top surface of the substrate 1 and that the distance between the wall faces 31a1 and 31b1 decreases with decreasing distance to the top surface of the bottom shield 13A. Such patterning can be accomplished by using a photoresist layer that consists of a lower layer of low sensitivity and an upper layer of high sensitivity. There is formed a space between the wall faces 31a1 and 31b1. The space is to accommodate a part of the mold later.

Figure 10A:
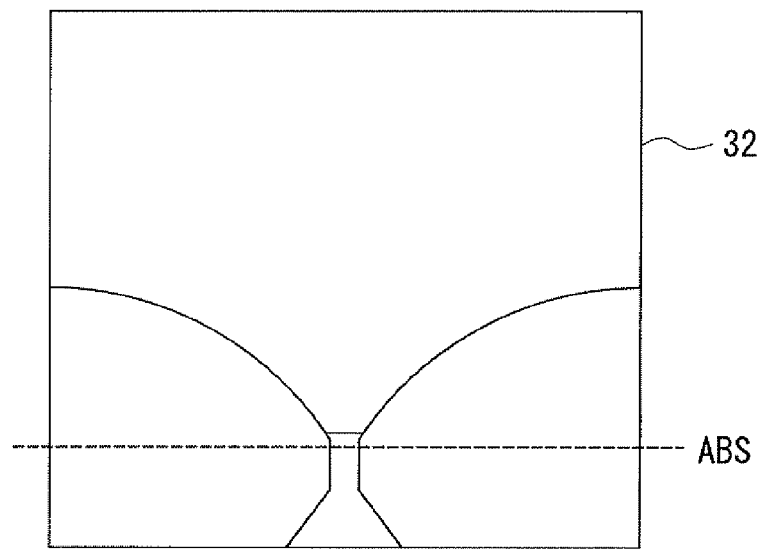
FIG. 10A and FIG. 10B are explanatory diagrams showing a step that follows the step shown in FIG. 9A and FIG. 9B.
Figure 10B:
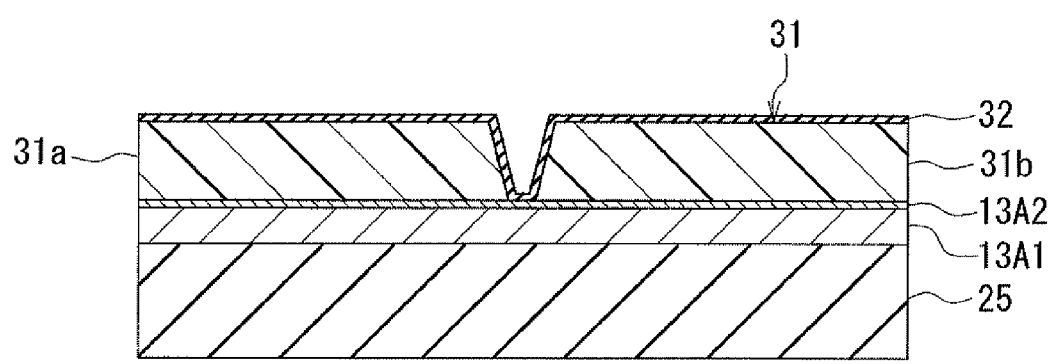

FIG. 10A and FIG. 10B show the next step. In this step, a separating film 32 made of a nonmagnetic material is formed to cover the first resist layer 31. The separating film 32 is provided to prevent the first resist layer 31 made of a positive photoresist from being mixed with a photoresist layer that is to be formed later from a negative photoresist. The separating film 32 has a thickness in the range of 5 to 20 nm, for example. Examples of materials suitable for the separating film 32 include alumina and a synthetic resin. Where alumina is selected as the material of the separating film 32, the separating film 32 is formed by ion beam deposition, for example.

Figure 11A:
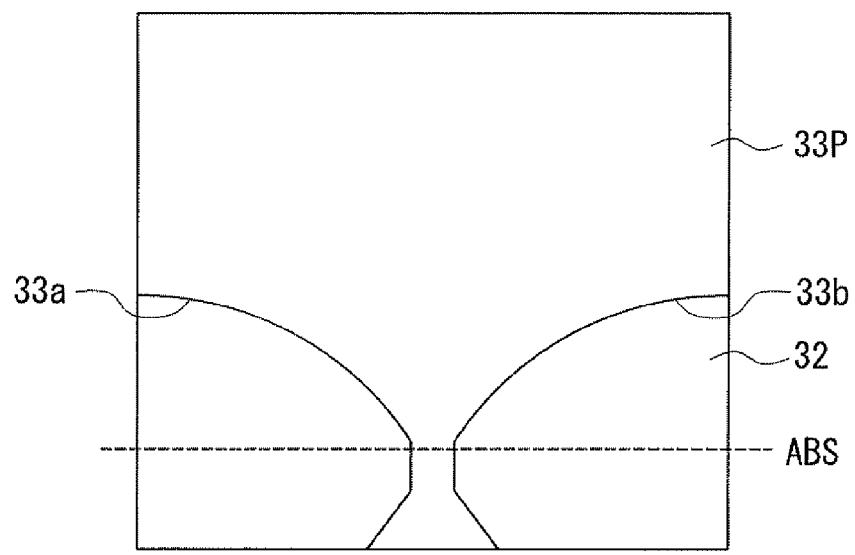
FIG. 11A and FIG. 11B are explanatory diagrams showing a step that follows the step shown in FIG. 10A and FIG. 10B.
Figure 11B:
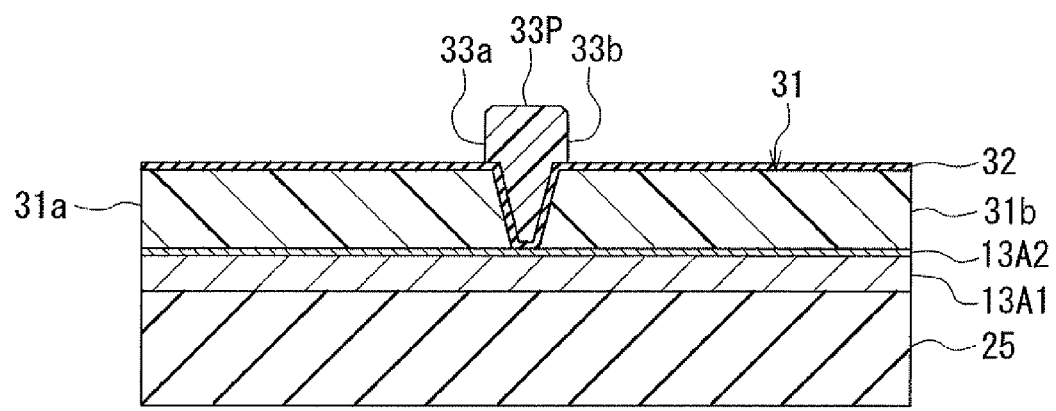

FIG. 11A and FIG. 11B show the next step. In this step, a photoresist layer made of a negative photoresist is patterned by photolithography to form a second resist layer 33P on the separating film 32. The second resist layer 33P is to become the mold 33 later. The second resist layer 33P (mold 33) has an opening 33a that has a shape corresponding to the shape of the first side shield 13B to be formed later, and an opening 33b that has a shape corresponding to the shape of the second side shield 13C to be formed later. More specifically, in this step, first, a photoresist layer made of a negative photoresist is formed over the entire top surface of the stack. The photoresist layer is formed such that its top surface is higher in level than the top surfaces of the portions of the separating film 32 lying on the first resist layer 31. Next, the photoresist layer is selectively exposed to light by using a photomask. The photomask has a light-transmitting part which allows the light for exposure to pass therethrough, and a light-blocking part which blocks the light for exposure, as does the photomask used when forming the first resist layer 31. The light-blocking part of the photomask includes portions that have shapes corresponding to the planar shapes of the first and second side shields 13B and 13C to be formed later. Next, the exposed photoresist layer is developed. As a result of the exposure, the area of the photoresist layer irradiated with the light having passed through the light-transmitting part of the photomask becomes insoluble in the developing solution, while the other area remains soluble in the developing solution. The photoresist layer remaining after the development makes the second resist layer 33P.

Figure 12A:
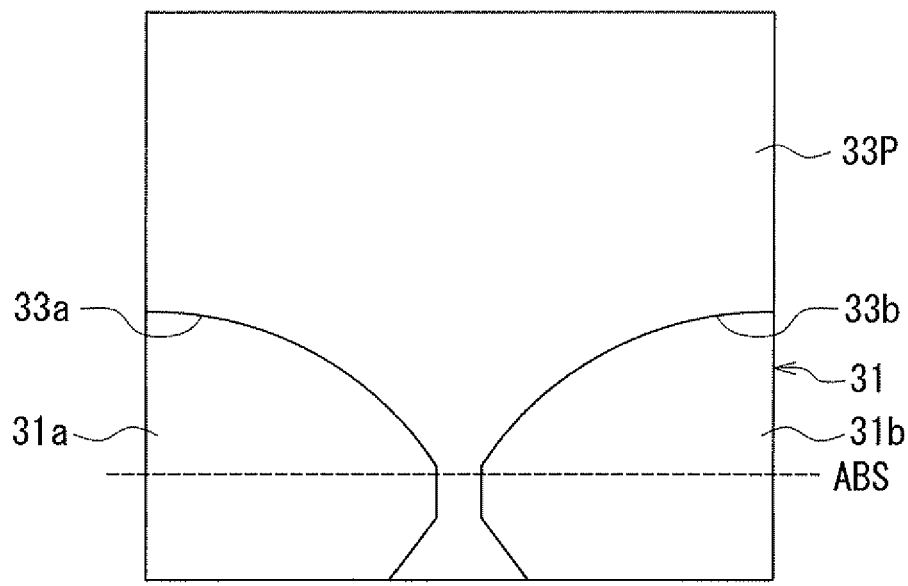
FIG. 12A and FIG. 12B are explanatory diagrams showing a step that follows the step shown in FIG. 11A and FIG. 11B.
Figure 12B:
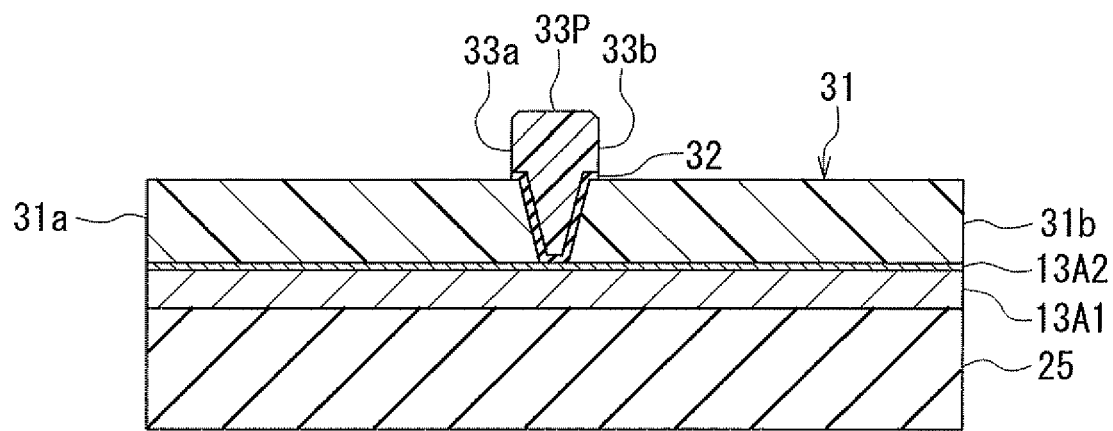

FIG. 12A and FIG. 12B show the next step. In this step, portions of the separating film 32 not covered by the second resist layer 33P are removed by wet etching, for example.

Figure 13A:
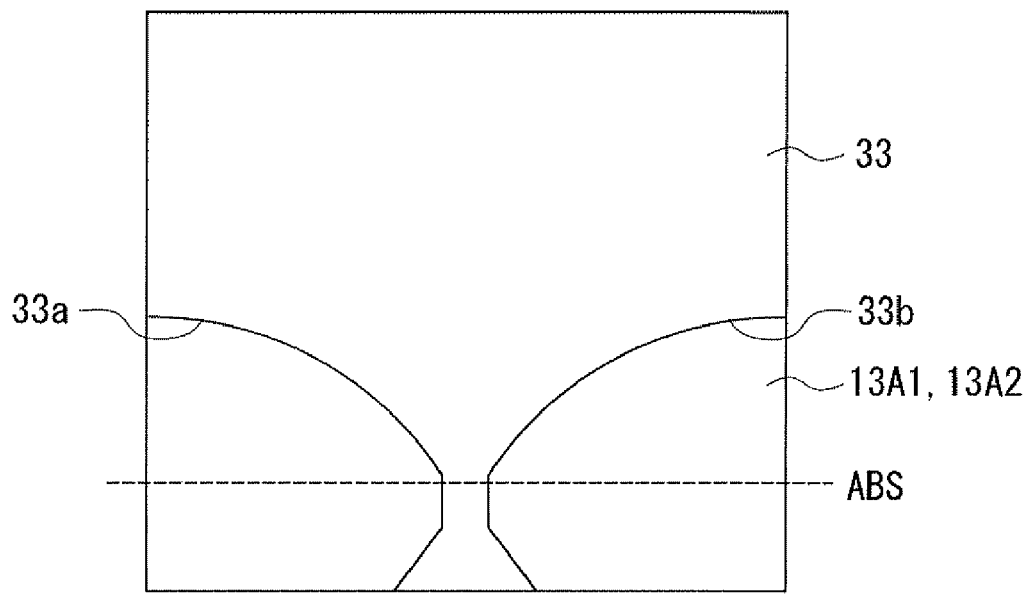
FIG. 13A and FIG. 13B are explanatory diagrams showing a step that follows the step shown in FIG. 12A and FIG. 12B.
Figure 13B:
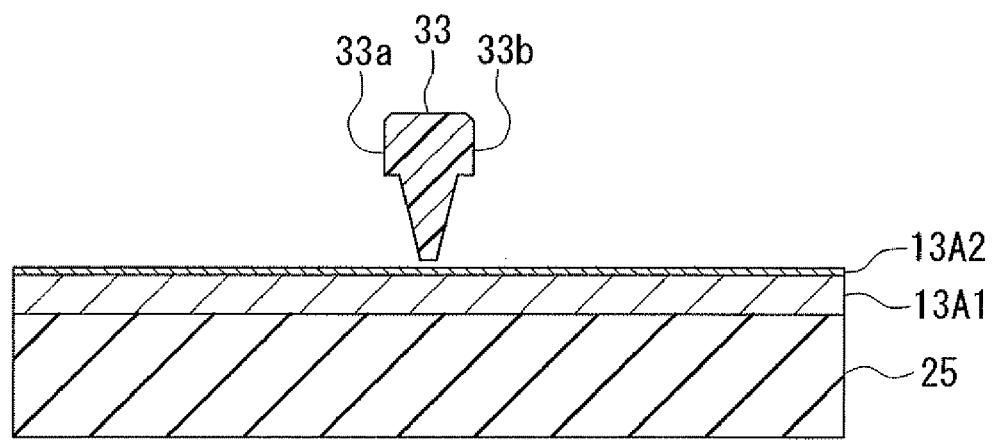

FIG. 13A and FIG. 13B show the next step. In this step, the first and second resist layers 31 and 33P are exposed to light and then the first resist layer 31 is removed from the openings 33a and 33b of the second resist layer 33P. More specifically, the entire top surface of the stack is exposed to light first. Having undergone the exposure, the first resist layer 31 made of a positive photoresist becomes soluble in a developing solution, while the second resist layer 33P made of a negative photoresist remains insoluble in the developing solution. Next, the first resist layer 31 is removed by using an alkaline developing solution, for example. In this step, portions of the separating film 32 extending along the wall faces of the openings 33a and 33b of the second resist layer 33P are also removed when or after the first resist layer 31 is removed. As a result of this step, the second resist layer 33P becomes the mold 33. As shown in FIG. 13B, the portion of the separating film 32 lying under the narrow portion of the mold 33 may be removed in this step. Even in such a case, the portion of the separating film 32 lying under the thick portion of the mold 33 is not removed and therefore the mold 33 will not be separated.

Figure 14A:
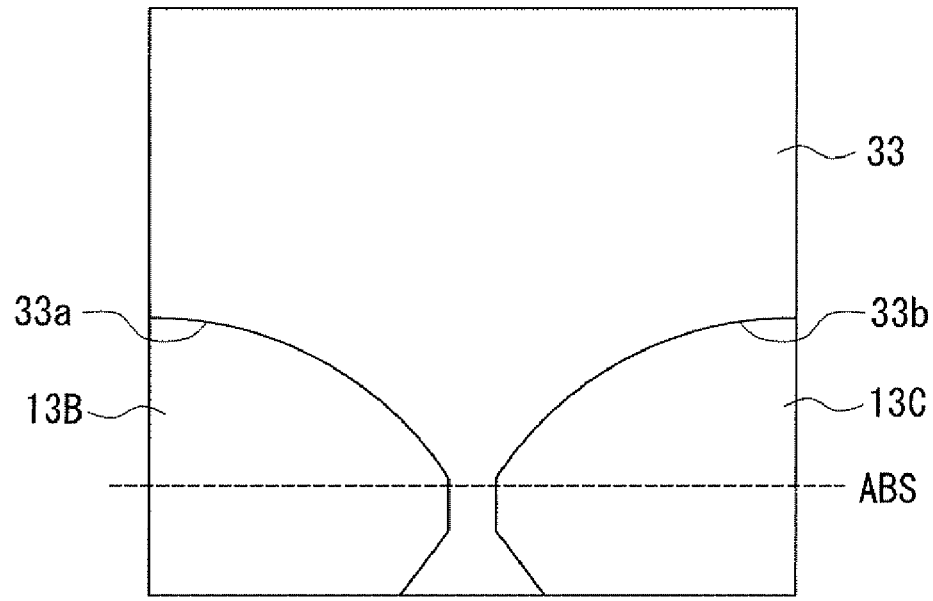
FIG. 14A and FIG. 14B are explanatory diagrams showing a step that follows the step shown in FIG. 13A and FIG. 13B.
Figure 14B:
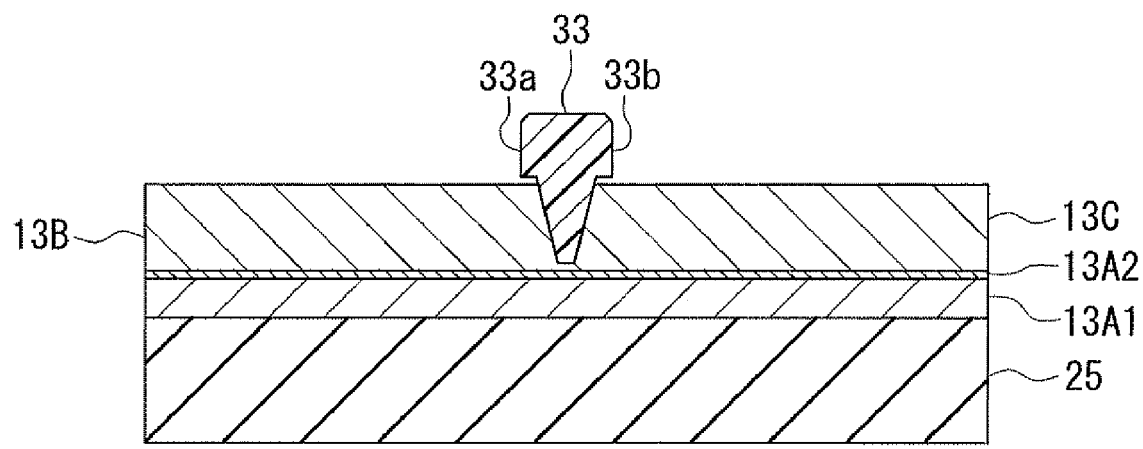

FIG. 14A and FIG. 14B show the next step. In this step, after the removal of the first resist layer 31, the first side shield 13B and the second side shield 13C are formed on the top surface of the bottom shield 13A by performing plating without forming a seed layer. When forming the side shields 13B and 13C, the second layer 13A2 of the bottom shield 13A is used as a seed layer and electrode. The side shields 13B and 13C are formed in the openings 33a and 33b of the mold 33, respectively. If the portion of the separating film 32 lying under the narrow portion of the mold 33 has been removed in the step shown in FIG. 13B, the side shields 13B and 13C may be connected in a position under the narrow portion of the mold 33, as shown in FIG. 14B.

Figure 15A:
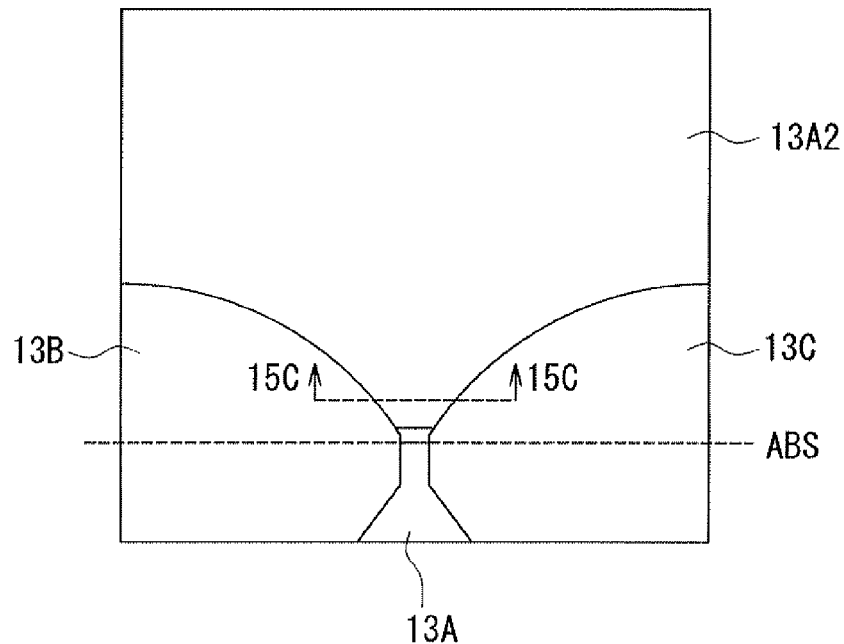
FIG. 15A to FIG. 15C are explanatory diagrams showing a step that follows the step shown in FIG. 14A and FIG. 14B.
Figure 15B:
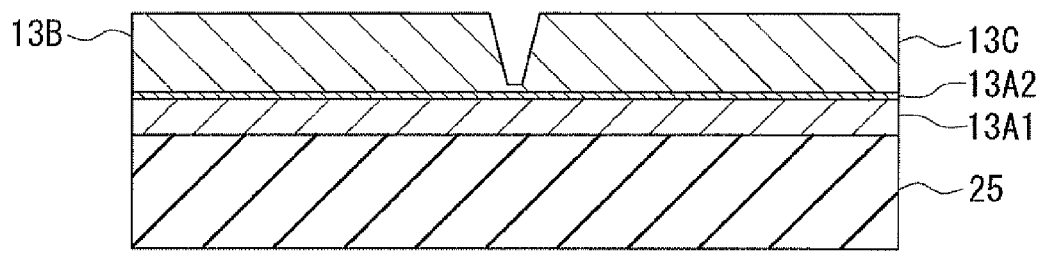
Figure 15C:
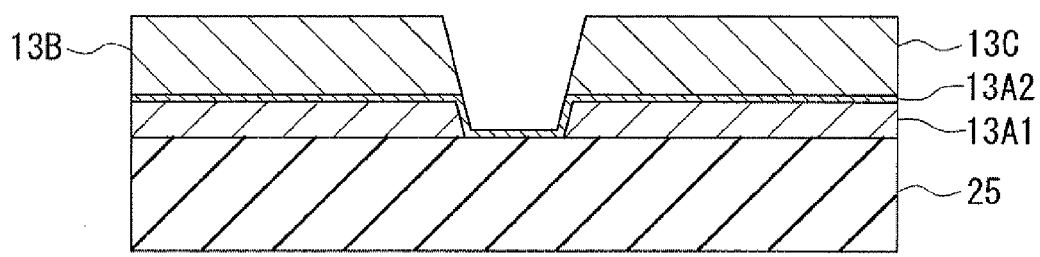

FIG. 15A to FIG. 15C show the next step. FIG. 15C shows a cross section of the stack taken at the position indicated by line 15C-15C in FIG. 15A. In this step, the mold 33 and the separating film 32 are removed.

Figure 16A:
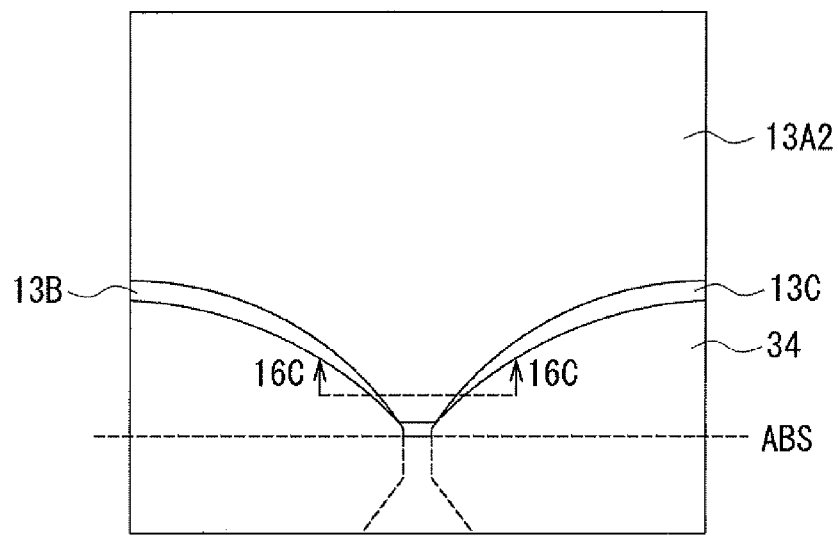
FIG. 16A to FIG. 16C are explanatory diagrams showing a step that follows the step shown in FIG. 15A to FIG. 15C.
Figure 16B:
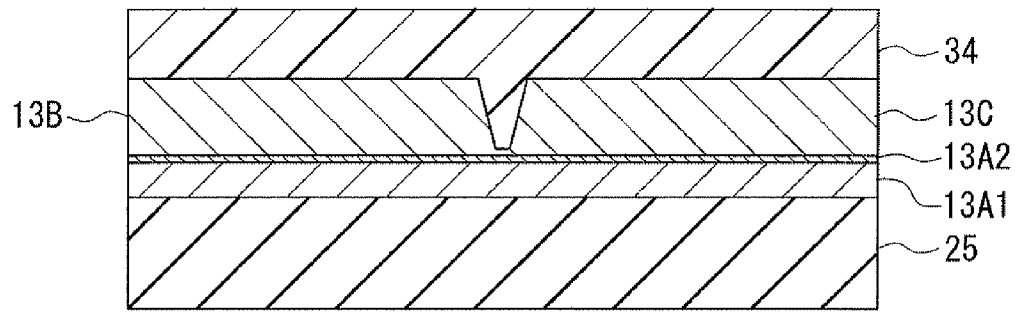
Figure 16C:
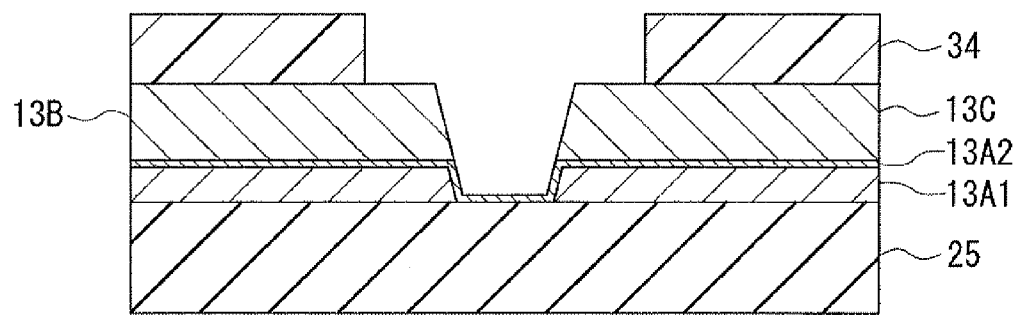

FIG. 16A to FIG. 16C show the next step. FIG. 16C shows a cross section of the stack taken at the position indicated by line 16C-16C in FIG. 16A. In this step, a mask 34 is formed over the bottom shield 13A and the side shields 13B and 13C. The mask 34 is formed by patterning a photoresist layer. As shown in FIG. 16A and FIG. 16C, the mask 34 does not cover a part of each of the top surfaces of the side shields 13B and 13C that is near an edge thereof farther from the position ABS where the medium facing surface 30 is to be formed.

Figure 17A:
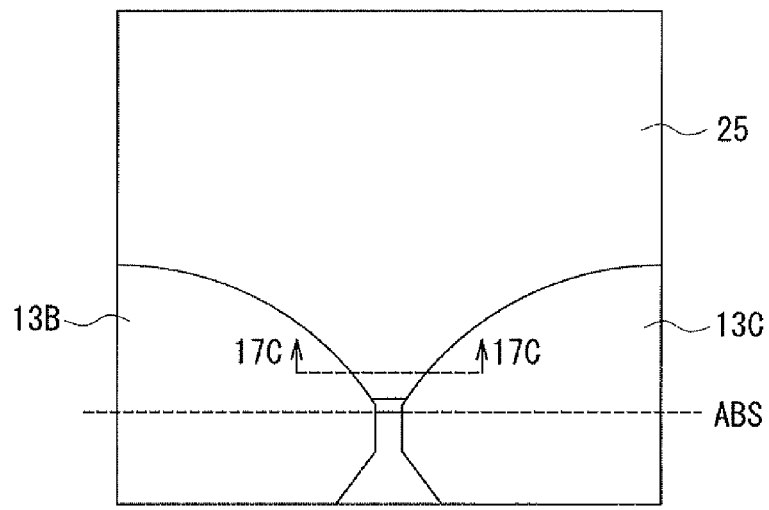
FIG. 17A to FIG. 17C are explanatory diagrams showing a step that follows the step shown in FIG. 16A to FIG. 16C.
Figure 17B:
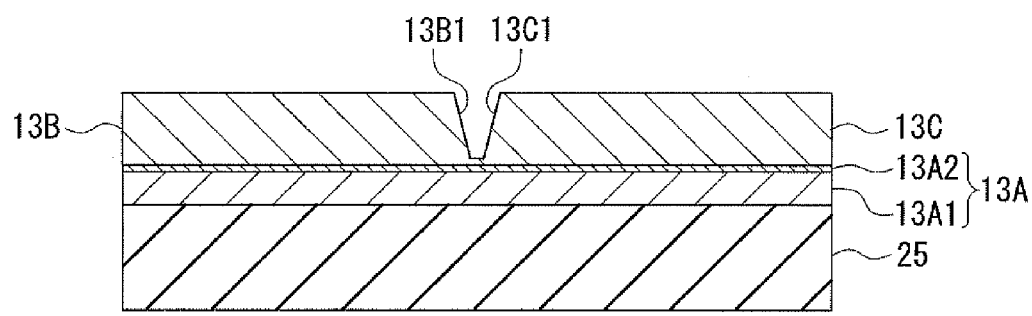
Figure 17C:
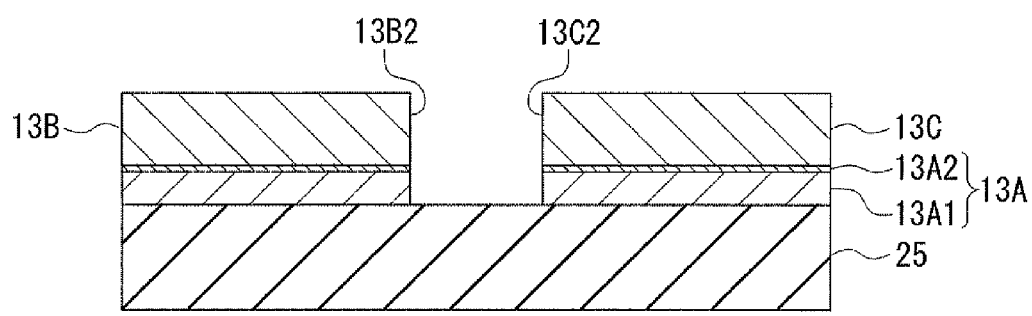

FIG. 17A to FIG. 17C show the next step. FIG. 17C shows a cross section of the stack taken at the position indicated by line 17C-17C in FIG. 17A. In this step, a part of the second layer 13A2 other than that lying on the first layer 13A1 is removed by etching, using the mask 34 and the side shields 13B and 13C as an etching mask. The etching is performed by, for example, ion beam etching such that ion beams travel in directions at an angle of 45° to 75° with respect to the direction perpendicular to the top surface of the substrate 1 and that a direction in which components parallel to the top surface of the substrate 1 travel, and which is one of the traveling directions of the ion beams, is caused to rotate, or oscillates. The bottom shield 13A composed of the first layer 13A1 and the second layer 13A2 formed thereon is completed as a result of this etching. Then, the mask 34 is removed.

In this step, as shown in FIG. 17C, a part of each of the side shields 13B and 13C is etched to form a wall face 13B2 of the first side shield 13B that is to be opposed to the third side surface S3 of the main magnetic pole 12 to be formed later, and a wall face 13C2 of the second side shield 13C that is to be opposed to the fourth side surface S4 of the main magnetic pole 12 to be formed later. FIG. 17B shows the wall face 13B1 of the first side shield 13B to be opposed to the first side surface S1 of the main magnetic pole 12, and the wall face 13C1 of the second side shield 13C to be opposed to the second side surface S2 of the main magnetic pole 12. As shown in FIG. 17B and FIG. 17C, the angle that the wall face 13B2 forms with respect to the direction perpendicular to the top surface of the substrate 1 is smaller than the angle that the wall face 13B1 forms with respect to the direction perpendicular to the top surface of the substrate 1. The angle that the wall face 13C2 forms with respect to the direction perpendicular to the top surface of the substrate 1 is smaller than the angle that the wall face 13C1 forms with respect to the direction perpendicular to the top surface of the substrate 1.

Figure 18A:
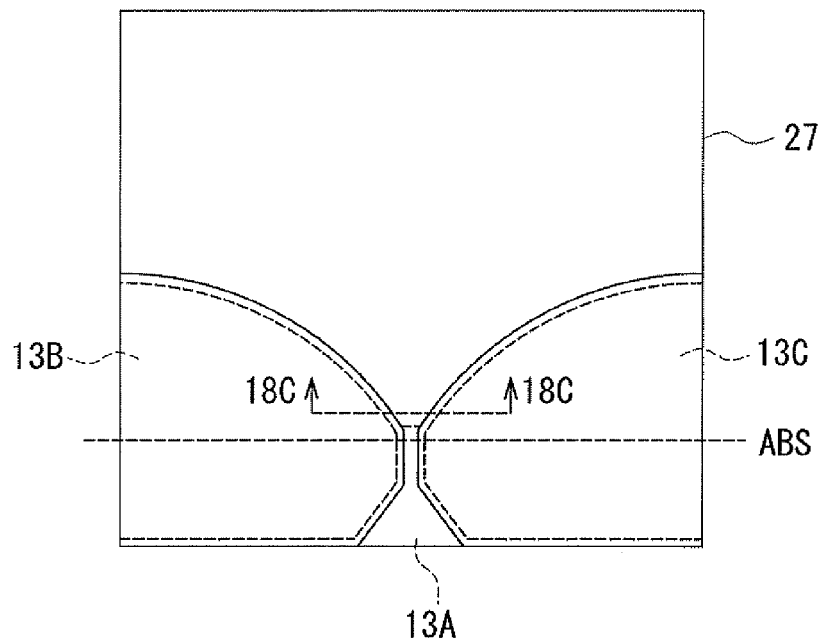
FIG. 18A to FIG. 18C are explanatory diagrams showing a step that follows the step shown in FIG. 17A to FIG. 17C.
Figure 18B:
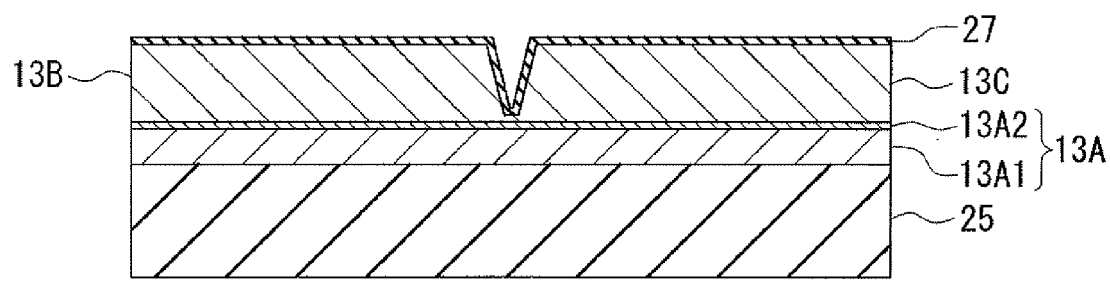
Figure 18C:
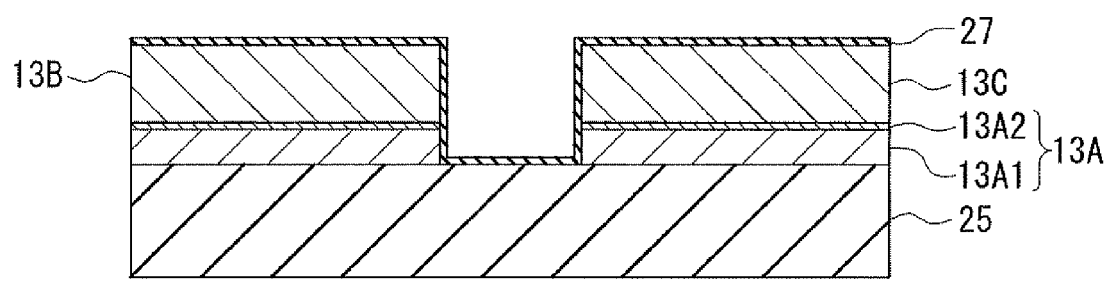

FIG. 18A to FIG. 18C show the next step. FIG. 18C shows a cross section of the stack taken at the position indicated by line 18C-18C in FIG. 18A. In this step, the first gap layer 27 is formed over the entire top surface of the stack. Where alumina is selected as the material of the first gap layer 27, the first gap layer 27 is formed by atomic layer deposition (ALD), for example. Where Ru is selected as the material of the first gap layer 27, the first gap layer 27 is formed by chemical vapor deposition (CVD), for example.

Figure 19A:
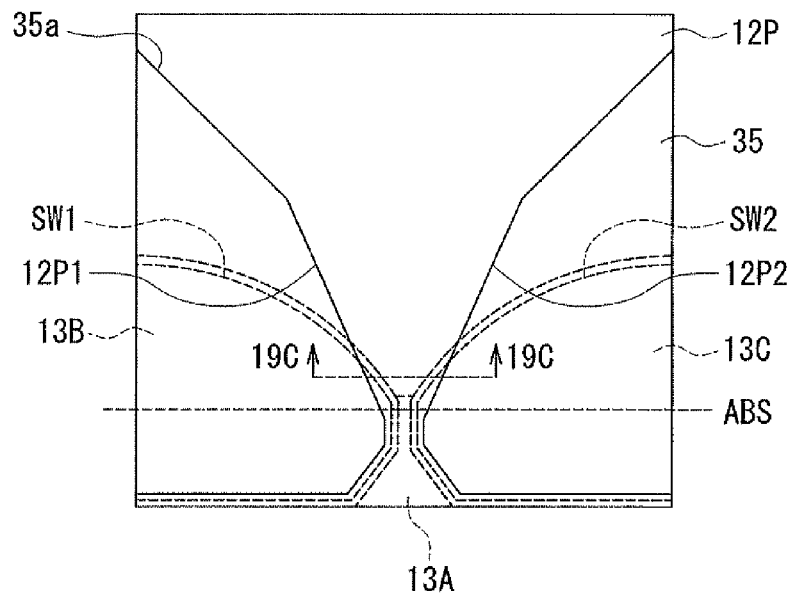
FIG. 19A to FIG. 19C are explanatory diagrams showing a step that follows the step shown in FIG. 18A to FIG. 18C.
Figure 19B:
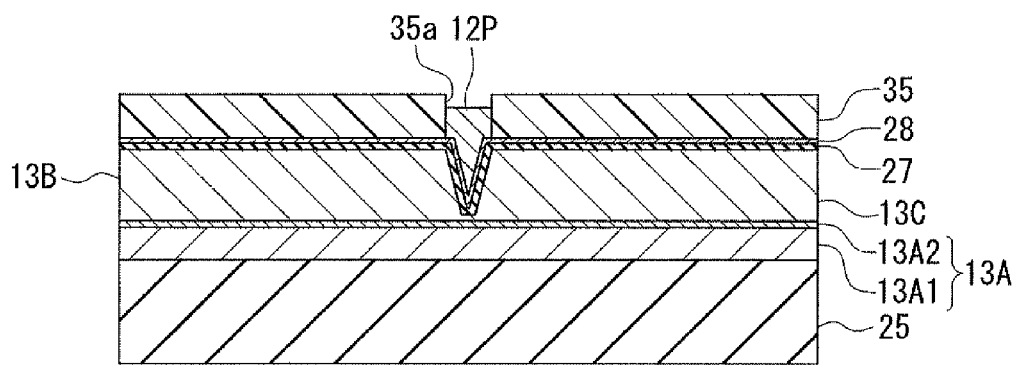
Figure 19C:
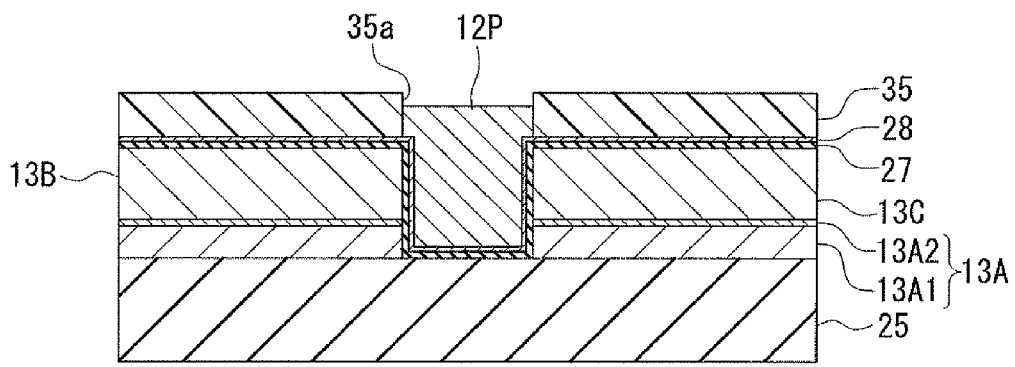

FIG. 19A to FIG. 19C show the next step. FIG. 19C shows a cross section of the stack taken at the position indicated by line 19C-19C in FIG. 19A. In this step, first, the seed layer 28 is formed over the entire top surface of the stack by sputtering or ion beam deposition, for example. Next, the first gap layer 27 and the seed layer 28 are selectively etched to form in the first gap layer 27 and the seed layer 28 the openings for exposing the top surface of the coupling layer 62 and the openings for exposing the top surface of the connecting layer 51. Next, a photoresist layer is formed over the entire top surface of the stack. The photoresist layer is then patterned by photolithography to form a third resist layer 35. The third resist layer 35 is formed such that its top surface is higher in level than the top surfaces of portions of the seed layer 28 lying on the side shields 13B and 13C. The third resist layer 35 has an opening 35a having a shape corresponding to the shape of the main magnetic pole 12 to be formed later, and an opening having a shape corresponding to the shape of the connecting layer 52.

Next, a magnetic layer 12P to later become the main magnetic pole 12 is formed in the opening 35a of the third resist layer 35 by performing plating with the seed layer 28 used as an electrode and seed layer. The connecting layer 52 is also formed on the connecting layer 51 by plating, for example. The magnetic layer 12P and the connecting layer 52 are formed such that their top surfaces are higher in level than the top surfaces of the portions of the seed layer 28 lying on the side shields 13B and 13C. As shown in FIG. 19A, the magnetic layer 12P is formed into such a configuration that their two side parts 12P1 and 12P2 that are opposite in the track width direction intersect the sidewalls SW1 and SW2 of the side shields 13B and 13C, respectively, as seen from above. This serves to form the corners C1 and C2 in the side parts SP1 and SP2 of the main magnetic pole 12 in a later step.

Figure 20A:
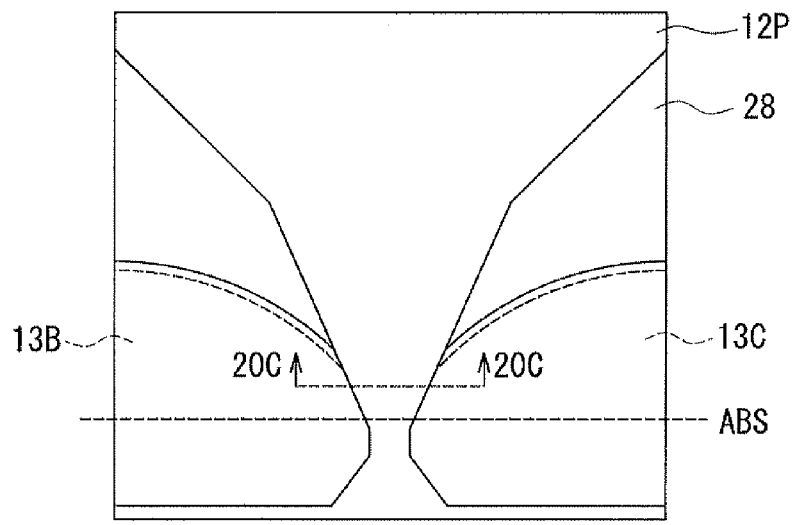
FIG. 20A to FIG. 20C are explanatory diagrams showing a step that follows the step shown in FIG. 19A to FIG. 19C.
Figure 20B:
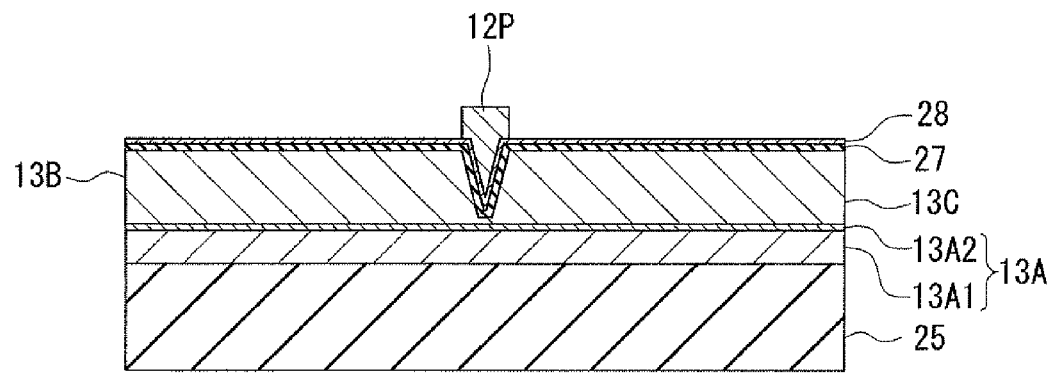
Figure 20C:
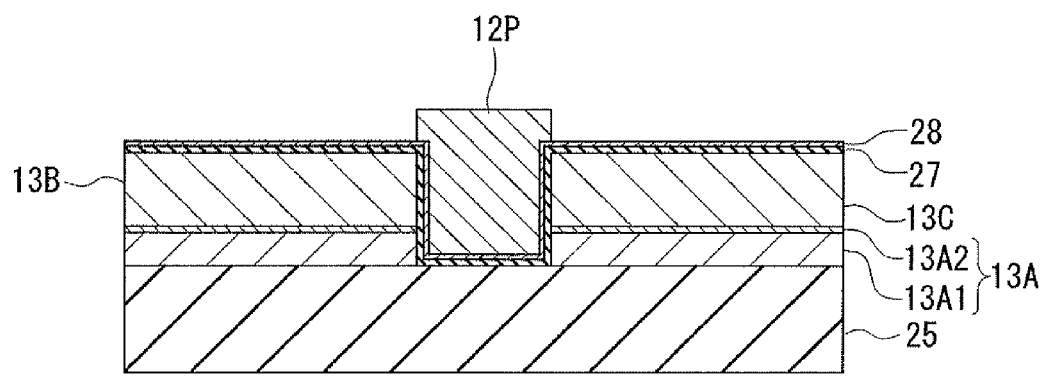
Figure 21:
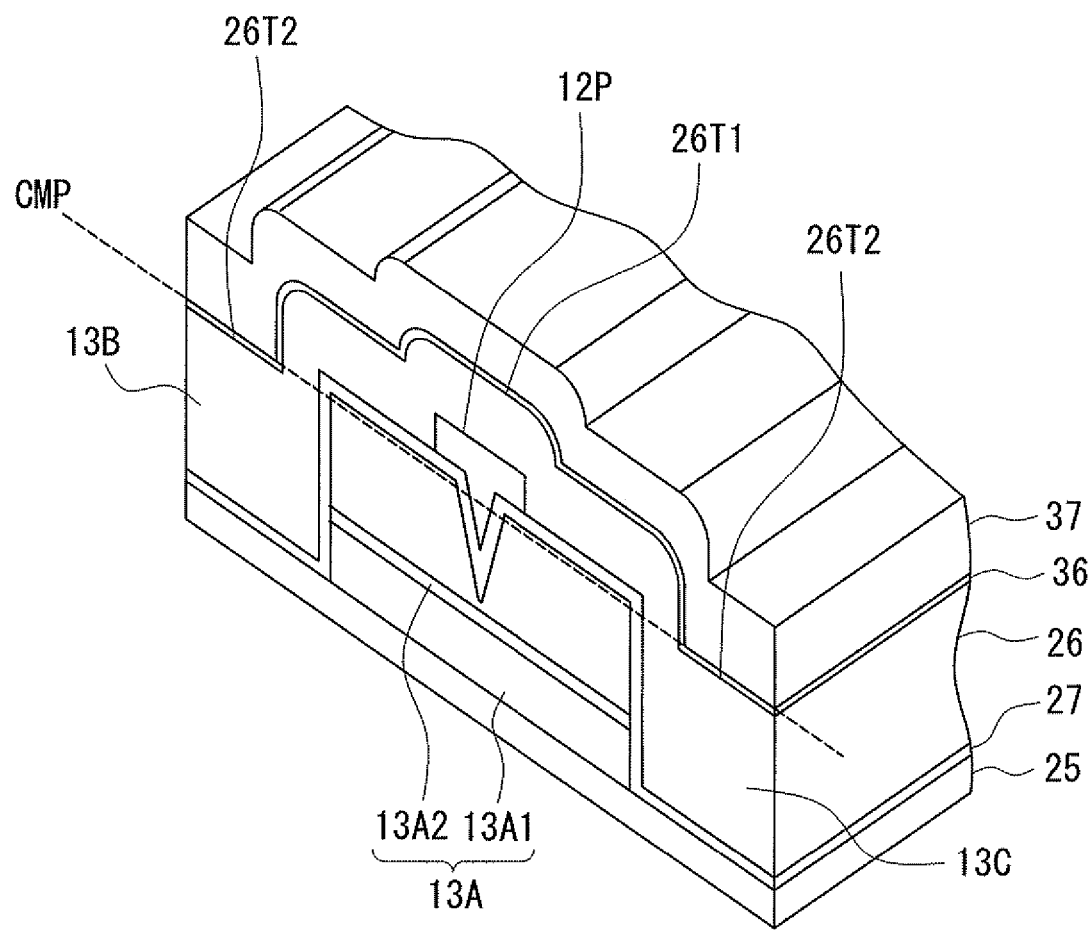
FIG. 21 is a perspective view showing a step that follows the step shown in FIG. 20A to FIG. 20C.

FIG. 20A to FIG. 20C show the next step. FIG. 20C shows a cross section of the stack taken at the position indicated by line 20C-20C in FIG. 20A. In this step, the third resist layer 35 is removed.

FIG. 21 shows the next step. The seed layer 28 is not shown in FIG. 21. In this step, first, the nonmagnetic layer 26 unpolished, made of a nonmagnetic material, is formed to cover the side shields 13B and 13C, the first gap layer 27, and the magnetic layer 12P. The nonmagnetic layer 26 unpolished has a thickness in the range of 0.3 to 0.5 μm, for example. The whole of the nonmagnetic layer 26 unpolished may be formed by atomic layer deposition, for example. Alternatively, the nonmagnetic layer 26 unpolished may be composed of first and second layers. In this case, the first layer may be formed first by atomic layer deposition and then the second layer may be formed by sputtering. The nonmagnetic layer 26 unpolished has a top surface including a projecting portion 26T1 that lies above the side shields 13B and 13C and the magnetic layer 12P, and peripheral portions 26T2 that lie on the peripheries of the side shields 13B and 13C and are lower in level than the projecting portion 26T1.

Next, a polishing stopper layer 36 made of a nonmagnetic metal material is formed by, for example, sputtering, on the nonmagnetic layer 26 unpolished. The level of the top surfaces of portions of the polishing stopper layer 36 lying over the peripheral portions 26T2 of the top surface of the nonmagnetic layer 26 defines the level of the second portion 12T2 of the top surface 12T of the main magnetic pole 12 to be formed later. As one example, the polishing stopper layer 36 may be made of Ru. Next, a layer to be polished 37, which is to undergo polishing later, is formed by sputtering, for example. The layer to be polished 37 may be made of alumina, for example.

Figure 22A:
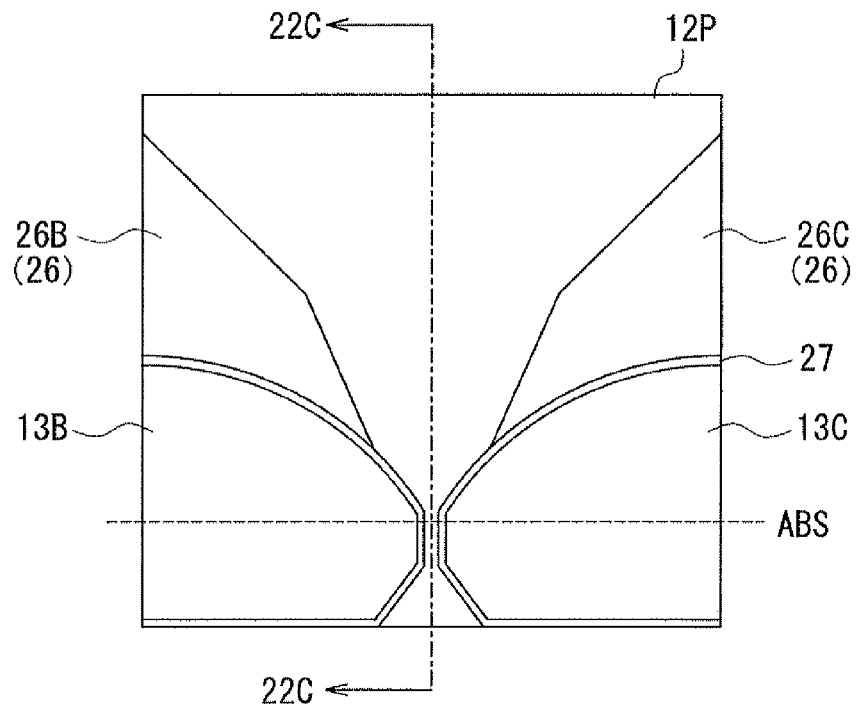
FIG. 22A to FIG. 22C are explanatory diagrams showing a step that follows the step shown in FIG. 21.
Figure 22B:
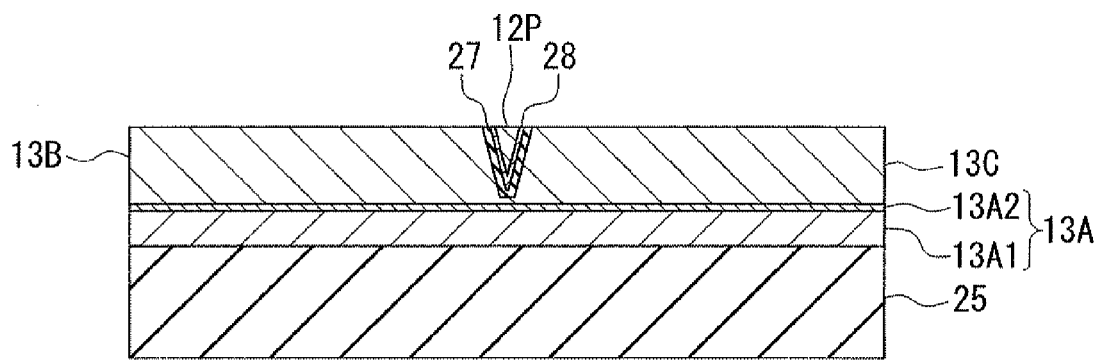
Figure 22C:
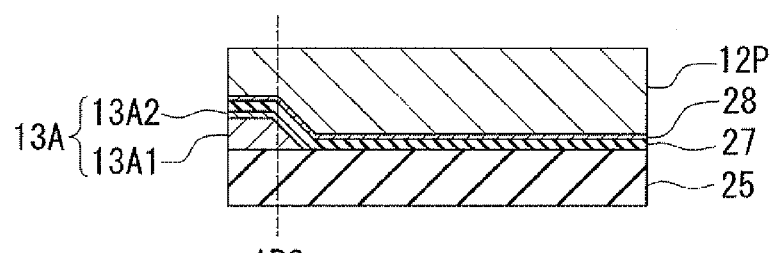

FIG. 22A to FIG. 22C show the next step. FIG. 22C shows a cross section of the stack taken at the position indicated by line 22C-22C in FIG. 22A. The seed layer 28 is not shown in FIG. 22A. In this step, the layer to be polished 37, the polishing stopper layer 36, and the nonmagnetic layer 26 are polished by, for example, CMP, until the portions of the polishing stopper layer 36 lying over the peripheral portions 26T2 of the top surface of the nonmagnetic layer 26 are exposed. In this polishing step, the portions of the polishing stopper layer 36 lying over the peripheral portions 26T2 of the top surface of the nonmagnetic layer 26 function as a polishing stopper for stopping the polishing. The symbol "CMP" in FIG. 21 indicates the level at which the polishing is stopped. This polishing step makes the top surfaces of the magnetic layer 12P, the side shields 13B and 13C, the connecting layer 52, the nonmagnetic layer 26 and the polishing stopper layer 36 even with each other. As shown in FIG. 22A, the nonmagnetic layer 26 after the polishing has the two portions 26B and 26C.

Figure 23A:
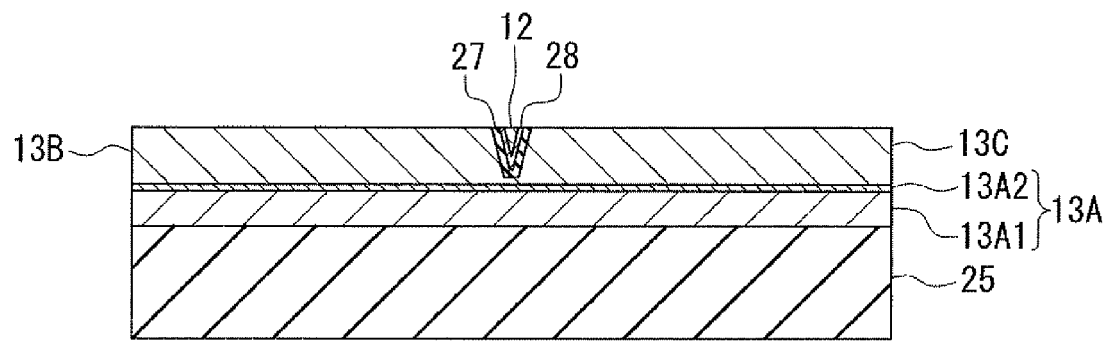
FIG. 23A and FIG. 23B are explanatory diagrams showing a step that follows the step shown in FIG. 22A to FIG. 22C.
Figure 23B:
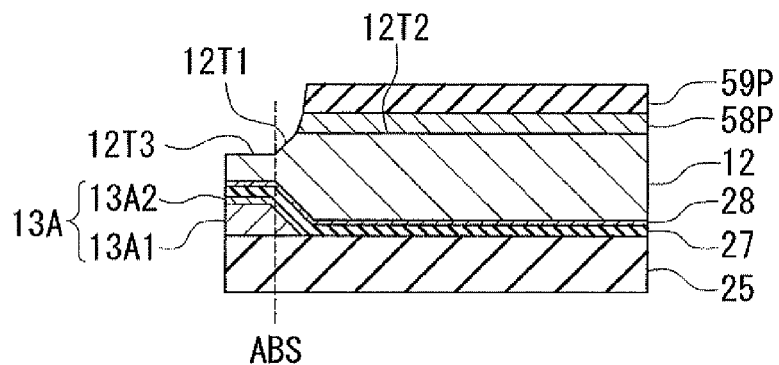

FIG. 23A and FIG. 23B show the next step. In this step, first, a stack of mask layers 58P and 59P is formed over the magnetic layer 12P and the side shields 13B and 13C. The mask layer 58P is to become the nonmagnetic metal layer 58 later, and the mask layer 59P is to become the insulating layer 59 later. The mask layers 58P and 59P may be formed by, for example, forming a layered film by sputtering and then patterning the layered film by etching. The mask layers 58P and 59P cover a part of the top surface of the magnetic layer 12P that is to later become the second portion 12T2 of the top surface 12T of the main magnetic pole 12. An edge of the mask layer 58P that is closer to the position ABS where to form the medium facing surface 30 defines the position of the boundary between the first portion 12T1 and the second portion 12T2 of the top surface 12T of the main magnetic pole 12. Next, the magnetic layer 12P, the side shields 13B and 13C, the nonmagnetic layer 26, and the polishing stopper layer 36 are partially etched by, for example, ion beam etching, using the mask layers 58P and 59P. This makes the magnetic layer 12P into the main magnetic pole 12.

Where the partial etching of the magnetic layer 12P, the side shields 13B and 13C, the nonmagnetic layer 26 and the polishing stopper layer 36 is to be effected by ion beam etching, the ion beam etching is performed such that ion beams travel in a direction at an angle of 45° to 75° with respect to the direction perpendicular to the top surface of the substrate 1 and that the direction of travel of the ion beams is caused to rotate as viewed in the direction perpendicular to the top surface of the substrate 1. As a result of such ion beam etching, the first and second portions 12T1 and 12T2 and a third portion 12T3 are formed in the top surface 12T of the magnetic layer 12P. The second portion 12T2 is covered with the mask layers 58P and 59P, and extends in a direction substantially perpendicular to the medium facing surface 30 to be formed later. Neither of the first and third portions 12T1 and 12T3 are covered with the mask layers 58P and 59P. The third portion 12T3 is located closer to the substrate 1 than is the second portion 12T2, and extends in a direction substantially perpendicular to the medium facing surface 30 to be formed later. The first portion 12T1 connects the second and third portions 12T2 and 12T3. The first portion 12T1 forms a tilt angle in the range of, for example, 12° to 45°, with respect to the direction perpendicular to the medium facing surface 30 to be formed later.

Figure 24:
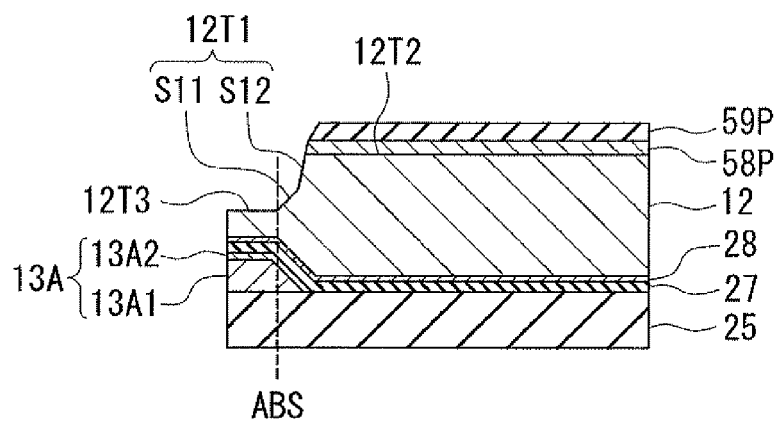
FIG. 24 is a cross-sectional view showing a modification example of the step shown in FIG. 23A and FIG. 23B.

FIG. 24 shows a modification example of the step shown in FIG. 23A and FIG. 23B. In this modification example, the first portion 12T1 has a first flat part S11 and a second flat part S12 that are at respective different angles with respect to the direction perpendicular to the medium facing surface 30 to be formed later. The first flat part S11 is connected to the third portion 12T3, and the second flat part S12 is connected to the second portion 12T2. The first and second flat parts S11 and S12 form first and second tilt angles, respectively, with respect to the direction perpendicular to the medium facing surface 30, the second tilt angle being greater than the first tilt angle. The first tilt angle is in the range of 15° to 40°, for example. The second tilt angle is in the range of 40° to 90°, for example.

Figure 25A:
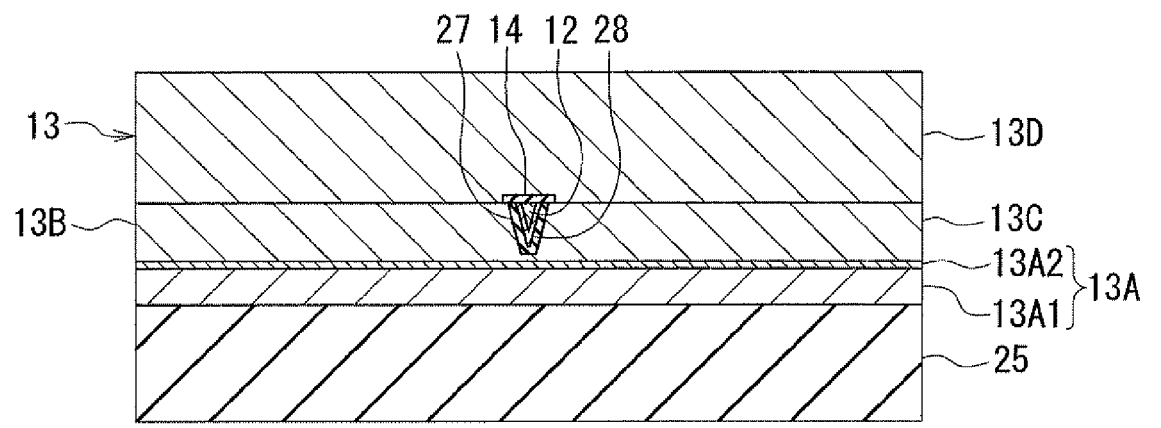
FIG. 25A and FIG. 25B are explanatory diagrams showing a step that follows the step shown in FIG. 23A and FIG. 23B.
Figure 25B:
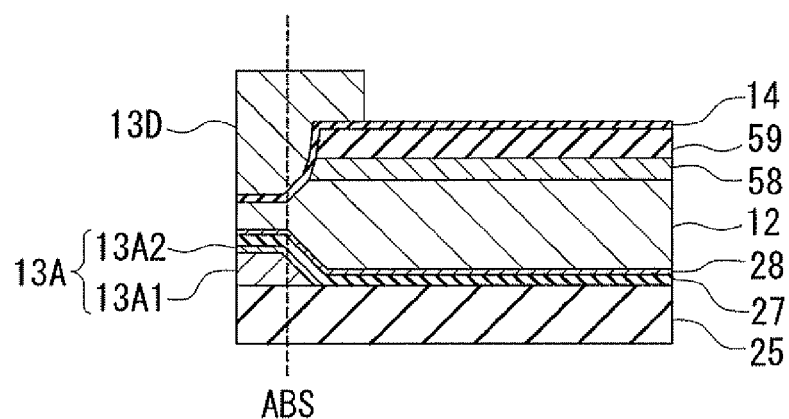

FIG. 25A and FIG. 25B show the next step. In this step, first, the second gap layer 14 is formed over the entire top surface of the stack by sputtering or chemical vapor deposition, for example. Next, the second gap layer 14 and the mask layers 58P and 59P are selectively etched by, for example, ion beam etching, so that a part of the top surface 12T of the main magnetic pole 12, a part of each of the top surfaces of the side shields 13B and 13C, and the top surface of the connecting layer 52 are exposed. This makes the mask layers 58P and 59P into the nonmagnetic metal layer 58 and the insulating layer 59, respectively. Next, the top shield 13D is formed over the side shields 13B and 13C and the second gap layer 14; the top yoke layer 16 is formed on the main magnetic pole 12; and the connecting layer 53 is formed on the connecting layer 52, by frame plating, for example.

Next, the nonmagnetic layer 46 is formed over the entire top surface of the stack. The nonmagnetic layer 46 is then polished by, for example, CMP, until the top shield 13D, the top yoke layer 16 and the connecting layer 53 are exposed. The top surfaces of the top shield 13D, the top yoke layer 16, the connecting layer 53 and the nonmagnetic layer 46 are thereby made even with each other.

Next, as shown in FIG. 6, the coupling layer 65 is formed on the top shield 13D; the coupling layer 63 is formed on the top yoke layer 16; and the connecting layer 54 is formed on the connecting layer 53, by frame plating, for example. Next, the nonmagnetic layer 47 is formed over the entire top surface of the stack. The nonmagnetic layer 47 is then polished by, for example, CMP, until the connecting layer 54 and the coupling layers 63 and 65 are exposed.

Next, the insulating layer 17 is formed on a region of the top surface of the nonmagnetic layer 47 over which the coil 18 is to be disposed later. Next, the coil 18 is formed on the insulating layer 17 by frame plating, for example. Next, the coupling layer 64 is formed on the coupling layer 63, and the coupling layer 66 is formed on the coupling layer 65, by frame plating, for example. Note that the coil 18 may be formed after the coupling layers 64 and 66 are formed.

Next, the insulating layer 19 is formed around the coil 18 and the coupling layer 64 and in the space between every adjacent turns of the coil 18. Next, the insulating layer 41 is formed over the entire top surface of the stack. The insulating layer 41 is then polished by, for example, CMP, until the coil 18 and the coupling layers 64 and 66 are exposed. The top surfaces of the coil 18, the coupling layers 64 and 66, and the insulating layers 19 and 41 are thereby made even with each other.

Next, the insulating layer 20 is formed over the entire top surface of the stack by sputtering, for example. The insulating layer 20 is then selectively etched to form therein an opening for exposing the top surface of the coupling layer 64 and an opening for exposing the top surface of the coupling layer 66. Next, the second return yoke layer 29 is formed by frame plating, for example.

Next, the protection layer 42 is formed to cover the entire top surface of the stack. Wiring, terminals and other components are then formed on the protection layer 42, the substrate is cut into sliders, and processing including polishing of the medium facing surface 30 and fabrication of flying rails is performed, whereby the magnetic head is completed.

As has been described, the method of manufacturing the magnetic head according to the embodiment includes the steps of forming the bottom shield 13A; forming the mold 33 on the top surface of the bottom shield 13A excluding regions thereof where the side shields 13B and 13C are to be formed later, the mold 33 having a shape determined by photolithography and being intended to be removed later; and forming the side shields 13B and 13C on the top surface of the bottom shield 13A after the formation of the mold 33, by performing plating without forming a seed layer.

The method of manufacturing the magnetic head further includes the steps of: removing the mold 33 after the formation of the side shields 13B and 13C; forming the first gap layer 27 after the removal of the mold 33; forming the main magnetic pole 12 after the formation of the first gap layer 27; forming the second gap layer 14 after the formation of the main magnetic pole 12; and forming the top shield 13D after the formation of the second gap layer 14.

The step of forming the mold 33 includes the steps of: forming the first resist layer 31 on the regions of the top surface of the bottom shield 13A where the side shields 13B and 13C are to be formed later, by patterning a photoresist layer made of a positive photoresist by photolithography; forming the separating film 32 to cover the first resist layer 31; forming the second resist layer 33P on the separating film 32 by patterning a photoresist layer made of a negative photoresist by photolithography, the second resist layer 33P being intended to become the mold 33 later; and removing the first resist layer 31 and the separating film 32 so that the second resist layer 33P remains on the top surface of the bottom shield 13A to become the mold 33.

According to the embodiment, the mold 33, which has a shape determined by photolithography and is to be removed later, is formed on the top surface of the bottom shield 13A excluding the regions thereof where the side shields 13B and 13C are to be formed later. The side shields 13B and 13C are then formed on the top surface of the bottom shield 13A by performing plating without forming a seed layer. According to the embodiment, since the side shields 13B and 13C are formed on the non-etched top surface of the bottom shield 13A, it is possible to prevent the generation of a magnetic defect in the side shields 13B and 13C. Furthermore, according to the embodiment, the mold 33 whose shape is determined by photolithography is used to determine the shapes of the side shields 13B and 13C. This allows the shapes of the side shields 13B and 13C to be determined easily through a smaller number of process steps and in a shorter time, compared with a case where the shapes of the side shields 13B and 13C are determined by etching.

Figure 26A:
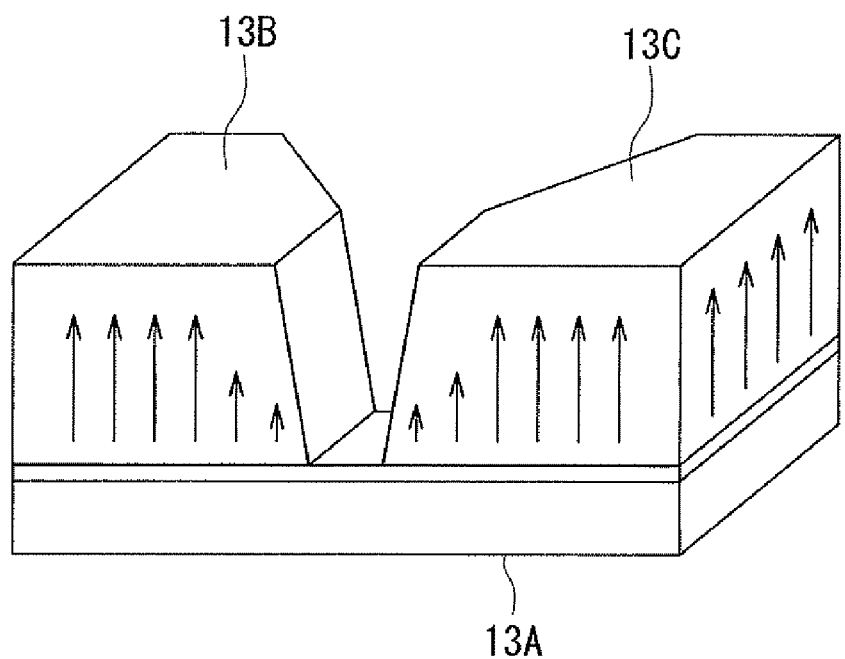
FIG. 26A and FIG. 26B are perspective views showing the direction of growth of plating films that are to become the two side shields in the method of manufacturing the magnetic head according to the embodiment of the invention.
Figure 26B:
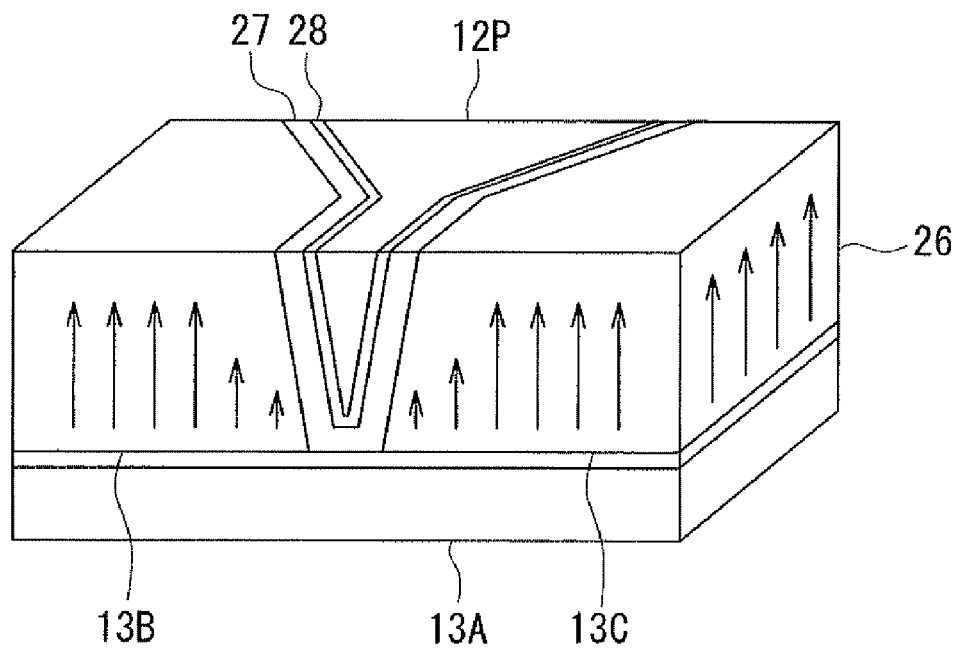

FIG. 26A and FIG. 26B are perspective views illustrating the direction of growth of plating films that are to become the side shields 13B and 13C. FIG. 26A shows the state after the side shields 13B and 13C are formed. FIG. 26A does not show the mold 33. FIG. 26B shows the state after the top surface of the magnetic layer 12P is polished. In FIG. 26A and FIG. 26B, the direction of growth of the plating films is shown by arrows. As shown in FIG. 26A, the plating films to become the side shields 13B and 13C grow from the top surface of the bottom shield 13A in the direction perpendicular to the top surface of the bottom shield 13A. In the embodiment, the side shields 13B and 13C are thus formed of the plating films grown in a uniform direction. Consequently, the embodiment allows preventing the generation of a magnetic defect in the side shields 13B and 13C, the details of which will be described later.

The effects of the method of manufacturing the magnetic head according to the embodiment will now be described in more detail in comparison with a method of manufacturing a magnetic head of a comparative example. First, reference is made to FIG. 27 to FIG. 31B to describe the method of manufacturing the magnetic head of the comparative example. FIG. 27 to FIG. 31B each show a stack of layers in the process of manufacturing the magnetic head of the comparative example. FIG. 27, FIG. 28, and FIG. 29A to FIG. 31A each show a cross section of the stack taken at the position where the medium facing surface 30 is to be formed. FIG. 29B to FIG. 31B each show a part of the stack in the vicinity of the position where the medium facing surface 30 is to be formed. The parts that are closer to the substrate 1 than is the bottom shield 13A are not shown in FIG. 27 to FIG. 31B.

Figure 27:
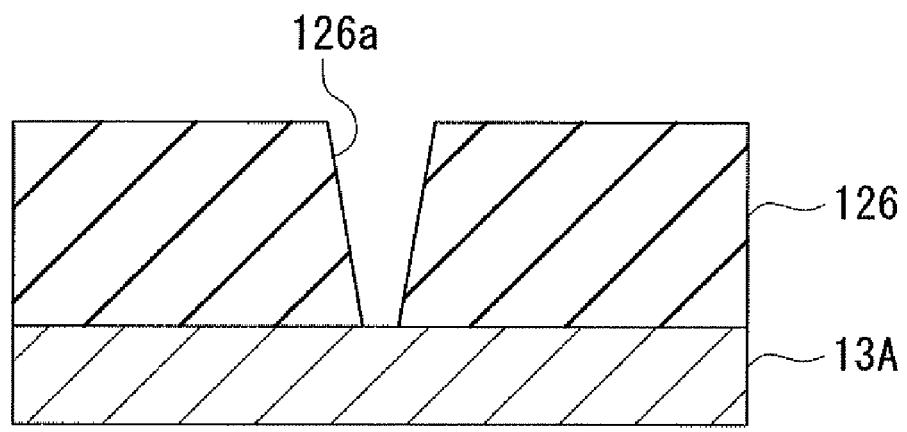
FIG. 27 is a cross-sectional view showing a step of a method of manufacturing a magnetic head of a comparative example.

FIG. 27 shows a step that follows the formation of the bottom shield 13A in the comparative example. In this step, first, an accommodation layer 126 is formed over the entire top surface of the stack by sputtering, for example. The accommodation layer 126 can be made of the same material as that of the nonmagnetic layer 26 of the embodiment, for example. Next, the accommodation layer 126 is selectively etched to form therein a groove 126a for accommodating a part of the main magnetic pole 12.

Figure 28:
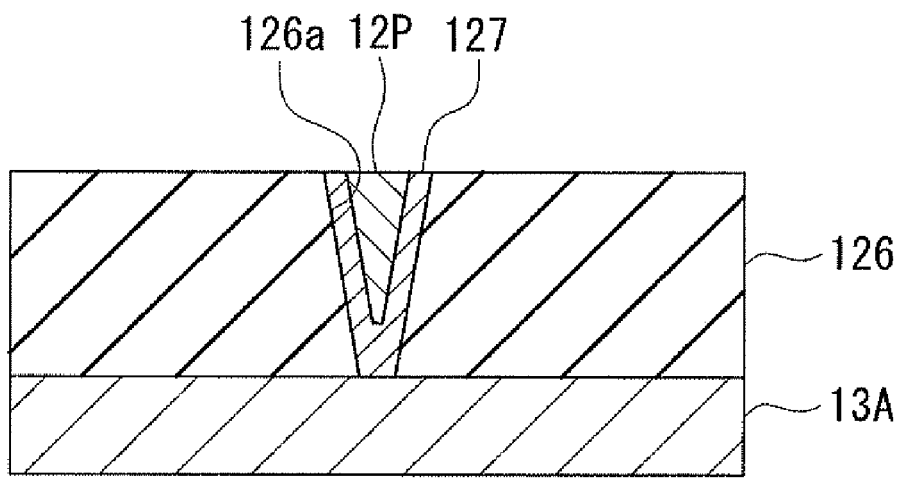
FIG. 28 is a cross-sectional view showing a step that follows the step shown in FIG. 27.

FIG. 28 shows the next step. In this step, first, a first gap layer 127 made of a nonmagnetic material is formed over the entire top surface of the stack. The first gap layer 127 can be made of the same material as that of the first gap layer 27 of the embodiment, for example. The first gap layer 127 is formed also in the groove 126a. At this point in time, although not shown, the first gap layer 127 includes a portion lying over the accommodation layer 126. Next, a magnetic layer 12P to later become the main magnetic pole 12 is formed by plating, for example. The magnetic layer 12P is formed to fill the groove 126a and to have a top surface that is higher in level than the top surface of the portion of the first gap layer 127 lying over the accommodation layer 126. Next, the magnetic layer 12P and the first gap layer 127 are polished by, for example, CMP, until the accommodation layer 126 is exposed. The top surfaces of the magnetic layer 12P and the accommodation layer 126 are thereby made even with each other.

Figure 29A:
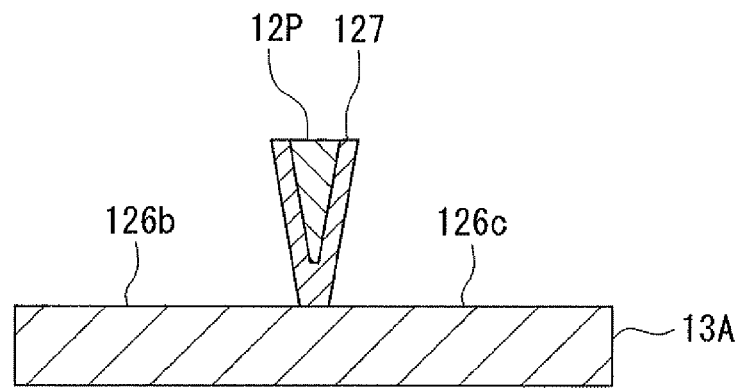
FIG. 29A and FIG. 29B are explanatory diagrams showing a step that follows the step shown in FIG. 28.
Figure 29B:
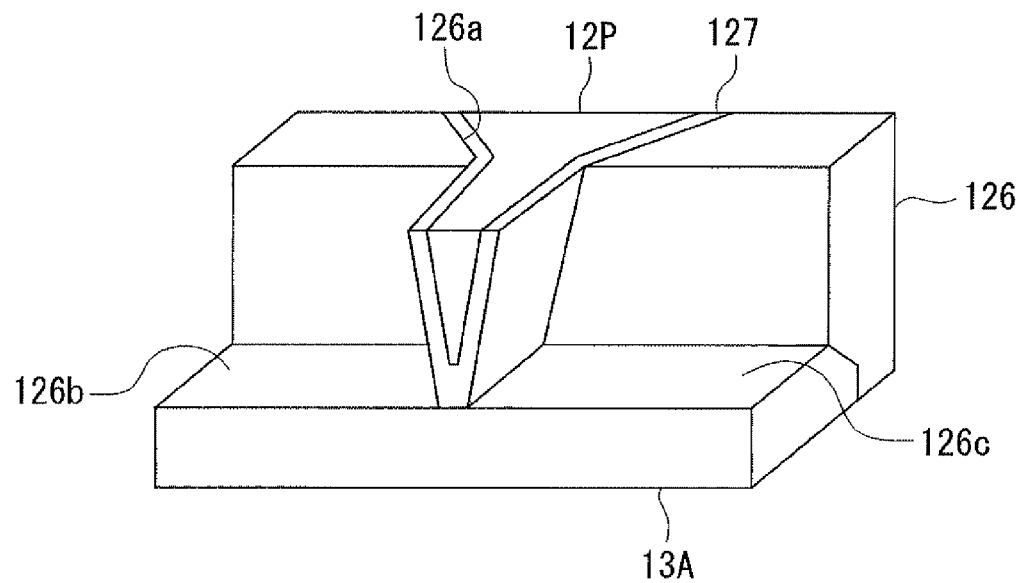

FIG. 29A and FIG. 29B show the next step. In this step, the accommodation layer 126 is selectively etched to form therein a groove 126b for accommodating the first side shield 13B and a groove 126c for accommodating the second side shield 13C. The grooves 126b and 126c penetrate through the accommodation layer 126.

Figure 30A:
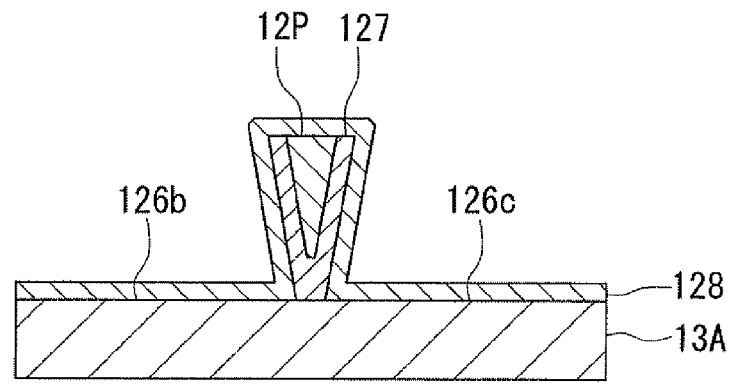
FIG. 30A and FIG. 30B are explanatory diagrams showing a step that follows the step shown in FIG. 29A and FIG. 29B.
Figure 30B:
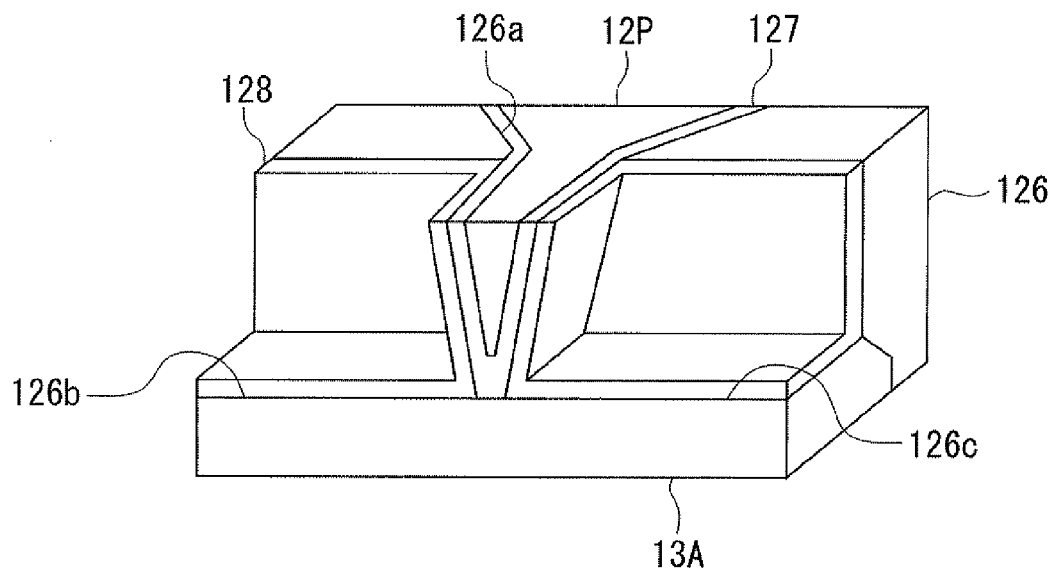

FIG. 30A and FIG. 30B show the next step. In this step, a seed layer 128 is formed over the entire top surface of the stack. The seed layer 128 can be made of the same material as that of the seed layer 28 of the embodiment, for example. The seed layer 128 is formed also in the grooves 126b and 126c. To be more specific, in the grooves 126b and 126c, the seed layer 128 is formed to extend along the top surface of the bottom shield 13A, the wall faces of the accommodation layer 126, and the surface of the first gap layer 127.

Figure 31A:
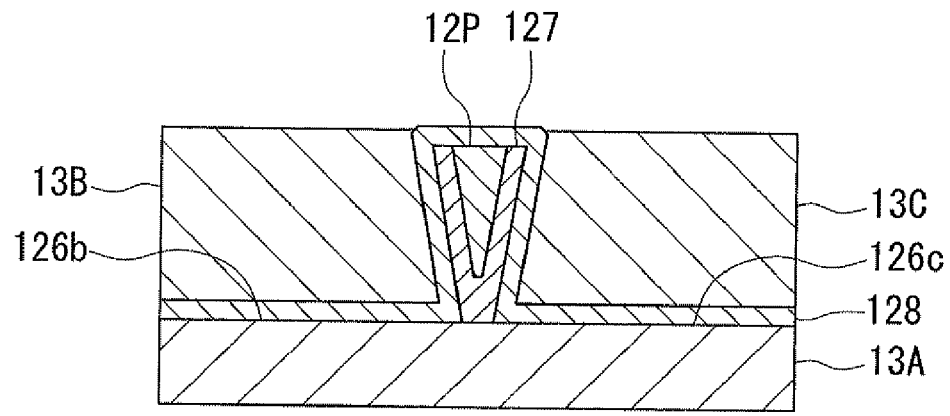
FIG. 31A and FIG. 31B are explanatory diagrams showing a step that follows the step shown in FIG. 30A and FIG. 30B.
Figure 31B:
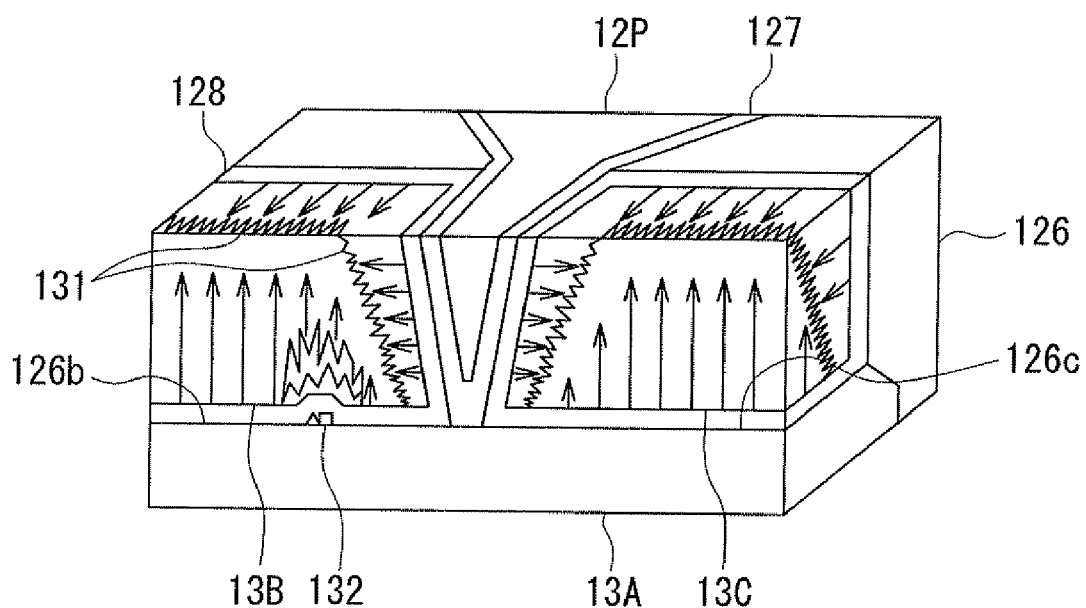

FIG. 31A and FIG. 31B show the next step. In this step, plating is performed to form the first side shield 13B to be accommodated in the groove 126b and form the second side shield 13C to be accommodated in the groove 126c. In FIG. 31B, the directions of growth of the plating films to become the side shields 13B and 13C are shown by arrows. Next, as shown in FIG. 31B, the seed layer 128 and the side shields 13B and 13C are polished by, for example, CMP, until the top surface of the magnetic layer 12P is exposed. Then, the steps shown in FIG. 23A and FIG. 23B, and the steps subsequent thereto of the method of manufacturing the magnetic head of the embodiment are followed.

In the comparative example, after the seed layer 128 is formed in the grooves 126b and 126e of the accommodation layer 126 formed by etching, the side shields 13B and 13C are formed in the grooves 126b and 126c by plating. Here, the plating films grow from the surface of the seed layer 128. As shown in FIG. 31B, each of the plating films includes a portion grown upward from the portion of the seed layer 128 extending along the bottom of the groove 126b or 126c, and a portion grown horizontally from the portions of the seed layer 128 extending along the wall faces of the same groove. These two portions meet each other to form a seam 131 therebetween. The seam 131 is a large grain boundary. Impurities are apt to segregate on the seam 131. The seam 131 is therefore prone to be inferior in magnetic properties to other areas of each of the plating films, and thus can result in a magnetic defect. In the area near the position of the magnetic defect in each of the plating films or side shields 13B and 13C, magnetic flux is unstable and the direction of magnetization tends to be pinned. As a result, a large magnetic field can be generated locally in the side shields 13B and 13C, which can result in the occurrence of adjacent track erase.

Additionally, in the comparative example, as shown in FIG. 31B, an etching residue 132 resulting from a reaction product produced during etching or resulting from a material etched may remain on the bottom of each of the grooves 126b and 126c formed by etching. If the seed layer 128 is formed on the etching residue 132, the seed layer 128 will have a projection at the position of the etching residue 132. In the area of each of the plating films or side shields 13B and 13C near the projection of the seed layer 128, magnetic flux is unstable and the direction of magnetization tends to be pinned, as with the magnetic defect caused by the seam 131. Therefore, it may be said that the area of each of the plating films near the projection of the seed layer 128 can also result in a magnetic defect. This magnetic defect can locally generate a large magnetic field in the side shields 13B and 13C, which can result in the occurrence of adjacent track erase.

In contrast, according to the embodiment, the mold 33, which has a shape determined by photolithography and is to be removed later, is formed on the top surface of the bottom shield 13A excluding the regions thereof where the side shields 13B and 13C are to be formed later. The side shields 13B and 13C are thereafter formed on the top surface of the bottom shield 13A by performing plating without forming a seed layer, as described previously. In the embodiment, the plating films to become the side shields 13B and 13C therefore grow from the top surface of the bottom shield 13A in the direction perpendicular to the top surface of the bottom shield 13A. The embodiment thus allows the side shields 13B and 13C to be formed of the plating films that grow in a uniform direction. Accordingly, unlike the comparative example, the embodiment does not generate the seam 131 in each of the plating films. In the embodiment, the side shields 13B and 13C are formed on the non-etched top surface of the bottom shield 13A. Unlike the comparative example, the embodiment is therefore free from the etching residue 132. According to the embodiment, it is therefore possible to prevent the generation of a magnetic defect in the side shields 13B and 13C. Consequently, according to the embodiment, it is possible to prevent the occurrence of adjacent track erase resulting from a magnetic defect in the side shields 13B and 13C.

In the embodiment, the mold 33 whose shape is determined by photolithography is used to determine the shapes of the side shields 13B and 13C. This allows the shapes of the side shields 13B and 13C to be determined easily through a smaller number of process steps and in a shorter time, compared with a case where the shapes of the side shields 13B and 13C are determined by etching.

In the comparative example, the groove 126a is formed in the accommodation layer 126 by etching, and the magnetic layer 12P to later become the main magnetic pole 12 is formed in the groove 126a. Accordingly, the thickness of the main magnetic pole 12 (magnetic layer 12P) depends on the depth of the groove 126a, more specifically, the depth of the groove 126a that can be formed in the accommodation layer 126 by etching. In contrast, in the embodiment, the first gap layer 27 and the seed layer 28 are formed between the mutually-facing wall faces 13B1 and 13C1 of the side shields 13B and 13C formed by plating. The magnetic layer 12P to later become the main magnetic pole 12 is formed thereafter.

According to the embodiment, the thickness of the main magnetic pole 12 (magnetic layer 12P) therefore does not depend on the depth of a groove that can be formed by etching. The embodiment thus allows forming the main magnetic pole 12 into a greater thickness than that of the comparative example. This makes it possible to guide a large amount of magnetic flux to the medium facing surface 30 through the main magnetic pole 12, and consequently allows the improvement of write characteristics (overwrite property).

In the embodiment, as shown in FIG. 22A to FIG. 22C, the nonmagnetic layer 26 has the two portions 26B and 26C that are defined between the respective side shields 13B, 13C and the wide portion 12B of the main magnetic pole 12 after the step of polishing the layer to be polished 37, the polishing stopper layer 36 and the nonmagnetic layer 26. The two portions 26B and 26C have the function of magnetically isolating the wide portion 12B of the main magnetic pole 12 from the side shields 13B and 13C. This prevents leakage of magnetic flux from the wide portion 12B of the main magnetic pole 12 to the side shields 13B and 13C. The embodiment thus allows the main magnetic pole 12 to guide a large amount of magnetic flux to the medium facing surface 30, and consequently allows the improvement of write characteristics (overwrite property).

In the embodiment, in particular, the first side part SP1 of the main magnetic pole 12 bends to form the first corner C1 at the first position P1, and the second side part SP2 of the main magnetic pole 12 bends to form the second corner C2 at the second position P2. At the first position P1, the distance SWG1 between the first side part SP1 and the first sidewall SW1 in the track width direction TW starts to gradually increase with increasing distance from the medium facing surface 30. At the second position P2, the distance SWG2 between the second side part SP2 and the second sidewall SW2 in the track width direction TW starts to gradually increase with increasing distance from the medium facing surface 30. The portion 26B is located farther from the medium facing surface 30 than is the first position P1 and interposed between the first side part SP1 and the first sidewall SW1. The portion 26C is located farther from the medium facing surface 30 than is the second position P2 and interposed between the second side part SP2 and the second sidewall SW2. With such a configuration, according to the embodiment, it is possible that the side parts SP1 and SP2 of the main magnetic pole 12 are opposed to the sidewalls SW1 and SW2 of the side shields 13B and 13C, respectively, only across a small area with a small distance created therebetween by the thickness of the first gap layer 27 and the seed layer 28. This makes it possible to effectively prevent leakage of magnetic flux from the wide portion 12B of the main magnetic pole 12 to the side shields 13B and 13C, and consequently allows the improvement of write characteristics (overwrite property).

The foregoing configuration can be achieved by the method of manufacturing a magnetic head according to the embodiment in which the main magnetic pole 12 is formed after the side shields 13B and 13C are formed. According to the embodiment, it is therefore possible to provide a magnetic head with the shield 13 provided around the main magnetic pole 12, the magnetic head being capable of preventing the generation of a magnetic defect in the two side shields 13B and 13C of the shield 13, allowing the shapes of the main magnetic pole 12 and the two side shields 13B and 13C to be determined easily, and being capable of preventing leakage of magnetic flux from the main magnetic pole 12 to the side shields 13B and 13C.

In the embodiment, after the first resist layer 31 is formed by using a positive photoresist and the separating film 32 is formed, the mold 33 is formed by using a negative photoresist. A space to later accommodate a part of the mold 33 is defined in the first resist layer 31 between the wall faces 31a1 and 31b1. The shape of the part of the mold 33 to be accommodated in this space corresponds to the shape of the track width defining portion 12A of the main magnetic pole 12. In general, a positive photoresist realizes patterning with higher resolution than a negative photoresist. Accordingly, using a positive photoresist to form the first resist layer 31 as in the embodiment allows precise definition of the shape of the part of the mold 33 to be accommodated in the foregoing space. This consequently allows precise definition of the shape of the track width defining portion 12A of the main magnetic pole 12.

The main magnetic pole 12 of the embodiment has the first to sixth side surfaces S1 to S6 defined as in the foregoing. This allows achieving both the prevention of adjacent track erase and the improvement of write characteristics. The magnetic head according to the embodiment can be formed by the method of manufacturing a magnetic head according to the embodiment. In the method, after the formation of the mold 33, the first and second side shields 13B and 13C are formed on the top surface of the bottom shield 13A by performing plating without forming a seed layer. Then, the first gap layer 27 and the main magnetic pole 12 are formed. Accordingly, the embodiment provides a magnetic head that includes the main magnetic pole 12 capable of achieving both the prevention of adjacent track erase and the improvement of write characteristics, and the shield 13 provided around the main magnetic pole 12. The magnetic head is capable of preventing the generation of a magnetic defect in the two side shields 13B and 13C of the shield 13, and allows the shapes of the main magnetic pole 12 and the two side shields 13B and 13C to be determined easily.

The magnetic head according to the embodiment can be manufactured especially by the manufacturing method according to the embodiment as follows. In the manufacturing method according to the embodiment, the step of forming the bottom shield 13A includes the step of forming the first layer 13A1 and the step of forming the second layer 13A2 on and around the first layer 13A1. In the step of forming the first and second side shields 13B and 13C, the first and second side shields 13B and 13C are formed by performing plating with the second layer 13A2 used as a seed layer. The embodiment further includes an etching step of removing a part of the second layer 13A2 other than that lying on the first layer 13A1 by etching, the etching step being performed between the step of removing the mold 33 and the step of forming the first gap layer 27. In the etching step, a part of each of the first and second side shields 13B and 13C is etched to form the wall face 13B2 of the first side shield 13B that is to be opposed to the third side surface S3 of the main magnetic pole 12 and the wall face 13C2 of the second side shield 13C that is to be opposed to the fourth side surface S4 of the main magnetic pole 12. According to this manufacturing method, it is possible to provide a magnetic head that includes the main magnetic pole 12 capable of achieving both the prevention of adjacent track erase and the improvement of write characteristics, and the shield 13 provided around the main magnetic pole 12. The magnetic head is capable of preventing the generation of a magnetic defect in the two side shields 13B and 13C of the shield 13, and allows the shapes of the main magnetic pole 12 and the two side shields 13B and 13C to be determined easily.

It should be noted that if a part of the second layer 13A2 other than that lying on the first layer 13A1 is not removed, there arises a problem. Specifically, magnetic flux will leak into the second layer 13A2 which extends over a wide area. This can cause unintended variations in magnetic field in the bottom shield 13A, thereby leading to the occurrence of adjacent track erase. In order to avoid this problem, the second layer 13A2 excluding the part lying on the first layer 13A1 should be removed.

The present invention is not limited to the foregoing embodiment, and various modifications may be made thereto. For example, the mold 33 can be formed by methods other than the method of the embodiment which uses a positive photoresist and a negative photoresist. The mold 33 may be formed by, for example, patterning a photoresist layer made of a positive or negative photoresist by photolithography. Alternatively, after the separating film 32 shown in FIG. 10A and FIG. 10B is formed, a photoresist layer may be patterned by photolithography to form a frame having an opening for accommodating the mold 33. Then, the mold 33 may be formed in the opening of the frame. In this case, various materials such as alumina can be used for the mold 33. In the present invention, the mold 33 is thus not necessarily made of a photoresist, as long as the shape of the mold 33 is determined by photolithography and the mold 33 is removed later.

In the embodiment, the bottom end 12L of the main magnetic pole 12 includes the first portion 12L1 and the second portion 12L2, and the top surface 12T of the main magnetic pole 12 includes the first portion 12T1 and the second portion 12T2. Nevertheless, the main magnetic pole 12 may be configured to have a bottom end 12L and a top surface 12T that each entirely extend in a direction substantially perpendicular to the medium facing surface 30.

While the foregoing embodiment has been described with reference to a magnetic head having such a structure that the read head is formed on the base body and the write head is stacked on the read head, the read head and the write head may be stacked in the reverse order.

It is apparent that the present invention can be carried out in various forms and modifications in the light of the foregoing descriptions. Accordingly, within the scope of the following claims and equivalents thereof, the present invention can be carried out in forms other than the foregoing most preferred embodiment.

What is claimed is:

1. A method of manufacturing a magnetic head for perpendicular magnetic recording, the magnetic head comprising:
    a medium facing surface that faces a recording medium;
    a coil that produces a magnetic field corresponding to data to be written on the recording medium;
    a main magnetic pole that has an end face located in the medium facing surface, allows a magnetic flux corresponding to the magnetic field produced by the coil to pass, and produces a write magnetic field for writing the data on the recording medium by means of a perpendicular magnetic recording system;
    a shield made of a magnetic material and having an end face that is located in the medium facing surface to wrap around the end face of the main magnetic pole; and
    a gap part made of a nonmagnetic material and provided between the main magnetic pole and the shield, wherein:
    the shield includes a bottom shield, first and second side shields, and a top shield;
    the bottom shield has an end face and a top surface, the end face being located in the medium facing surface at a position backward of the end face of the main magnetic pole along a direction of travel of the recording medium;
    the first and second side shields have two end faces that are located in the medium facing surface at positions on opposite sides of the end face of the main magnetic pole in a track width direction;
    the top shield has an end face that is located in the medium facing surface at a position forward of the end face of the main magnetic pole along the direction of travel of the recording medium; and
    the gap part includes a first gap layer disposed between the main magnetic pole and the bottom shield and between the main magnetic pole and the first and second side shields, and a second gap layer disposed between the main magnetic pole and the top shield,
    the method comprising the steps of:
    forming the bottom shield;
    forming a mold on the top surface of the bottom shield excluding regions thereof where the first and second side shields are to be formed later, the mold having a shape determined by photolithography and being intended to be removed later;
    forming the first and second side shields on the top surface of the bottom shield after the formation of the mold, by performing plating without forming a seed layer;
    removing the mold after the formation of the first and second side shields;
    forming the first gap layer after the removal of the mold;
    forming the main magnetic pole after the formation of the first gap layer;
    forming the second gap layer after the formation of the main magnetic pole;
    forming the top shield after the formation of the second gap layer; and
    forming the coil.

2. The method of manufacturing the magnetic head for perpendicular magnetic recording according to claim 1, wherein:
    the main magnetic pole has a top surface that is farther from the top surface of the bottom shield, a bottom end opposite to the top surface of the main magnetic pole, and first to sixth side surfaces;
    a width of the end face of the main magnetic pole in the track width direction decreases with decreasing distance to the bottom end of the main magnetic pole;
    the first and second side surfaces are opposite to each other and located in a first region that extends from the medium facing surface to a position at a distance of 50 to 500 nm from the medium facing surface;
    the third and fourth side surfaces are located in a second region that is other than the first region;
    the fifth side surface is located in a boundary between the first and second regions, and connects the first side surface to the third side surface;
    the sixth side surface is located in the boundary between the first and second regions, and connects the second side surface to the fourth side surface;
    a distance between the first side surface and the second side surface in the track width direction decreases with decreasing distance to the bottom end of the main magnetic pole;
    in the boundary between the first region and the second region, a distance between the third side surface and the fourth side surface in the track width direction as seen at a position closest to the bottom end of the main magnetic pole is greater than the distance between the first side surface and the second side surface in the track width direction as seen at the position closest to the bottom end of the main magnetic pole;

each of the fifth and sixth side surfaces has a width that increases with decreasing distance to the bottom end of the main magnetic pole;

the first side shield has two wall faces that are opposed to the first and third side surfaces of the main magnetic pole, respectively; and the second side shield has two wall faces that are opposed to the second and fourth side surfaces of the main magnetic pole, respectively.

3. The method of manufacturing the magnetic head for perpendicular magnetic recording according to claim 2, wherein:

the step of forming the bottom shield includes the step of forming a first layer and the step of forming a second layer on and around the first layer; and in the step of forming the first and second side shields, the first and second side shields are formed by performing plating with the second layer used as a seed layer;

the method further comprising an etching step of removing a part of the second layer other than that lying on the first layer by etching, the etching step being performed between the step of removing the mold and the step of forming the first gap layer, wherein in the etching step, a part of each of the first and second side shields is etched to form one of the wall faces of the first side shield that is to be opposed to the third side surface of the main magnetic pole and one of the wall faces of the second side shield that is to be opposed to the fourth side surface of the main magnetic pole.

4. The method of manufacturing the magnetic head for perpendicular magnetic recording according to claim 1, wherein the step of forming the mold includes the steps of:

forming a first resist layer on the regions of the top surface of the bottom shield where the first and second side shields are to be formed later, by patterning a photoresist layer made of a positive photoresist by photolithography;

forming a separating film to cover the first resist layer;

forming a second resist layer on the separating film by patterning a photoresist layer made of a negative photoresist by photolithography, the second resist layer being intended to become the mold later; and removing the first resist layer and the separating film so that the second resist layer remains on the top surface of the bottom shield to become the mold.

5. The method of manufacturing the magnetic head for perpendicular magnetic recording according to claim 1, wherein the step of forming the main magnetic pole includes the steps of:

forming a magnetic layer that is to become the main magnetic pole later;

forming a nonmagnetic layer made of a nonmagnetic material such that the nonmagnetic layer covers the first and second side shields, the first gap layer, and the magnetic layer; and polishing the nonmagnetic layer until the first and second side shields and the magnetic layer are exposed.

6. The method of manufacturing the magnetic head for perpendicular magnetic recording according to claim 5, wherein:

the nonmagnetic layer unpolished has a top surface including a projecting portion that lies above the first and second side shields and the magnetic layer, and a peripheral portion that lies on a periphery of each of the first and second side shields and is lower in level than the projecting portion;

the step of forming the main magnetic pole further includes the steps of:

forming a polishing stopper layer on the nonmagnetic layer unpolished; and forming, on the polishing stopper layer, a layer to be polished that is to undergo polishing later; and the step of polishing the nonmagnetic layer polishes the layer to be polished, the polishing stopper layer, and the nonmagnetic layer until a part of the polishing stopper layer that lies above the peripheral portion of the top surface of the nonmagnetic layer is exposed.

7. The method of manufacturing the magnetic head for perpendicular magnetic recording according to claim 5, wherein the nonmagnetic layer after the polishing has first and second portions that are located away from the medium facing surface and interposed between the main magnetic pole and the first and second side shields.

8. The method of manufacturing the magnetic head for perpendicular magnetic recording according to claim 7, wherein:

the main magnetic pole has a top surface that is farther from the top surface of the bottom shield, a bottom end opposite to the top surface of the main magnetic pole, and first and second side parts;

the first side shield has a first sidewall that is opposed to the first side part of the main magnetic pole;

the second side shield has a second sidewall that is opposed to the second side part of the main magnetic pole;

the first side part bends to form a first corner at a first position that is at a predetermined distance from the medium facing surface;

the second side part bends to form a second corner at a second position that is at the predetermined distance from the medium facing surface;

at the first position, a distance between the first side part and the first sidewall in the track width direction starts to gradually increase with increasing distance from the medium facing surface;

at the second position, a distance between the second side part and the second sidewall in the track width direction starts to gradually increase with increasing distance from the medium facing surface; and the first portion of the nonmagnetic layer is located farther from the medium facing surface than is the first position and interposed between the first side part and the first sidewall, while the second portion of the nonmagnetic layer is located farther from the medium facing surface than is the second position and interposed between the second side part and the second sidewall.

9. The method of manufacturing the magnetic head for perpendicular magnetic recording according to claim 1, wherein:

the main magnetic pole has a top surface including a first portion and a second portion, the first portion having a first edge located in the medium facing surface and a second edge opposite to the first edge, the second portion being located farther from the medium facing surface than is the first portion and being connected to the first portion at the second edge, and a distance from the top surface of the bottom shield to an arbitrary point on the first portion decreases with decreasing distance from the arbitrary point to the medium facing surface; and the step of forming the main magnetic pole includes the steps of:

forming a magnetic layer that is to become the main magnetic pole later; and etching a part of the magnetic layer so that the first portion of the top surface of the main magnetic pole is formed.

10. A magnetic head for perpendicular magnetic recording comprising:
- a medium facing surface that faces a recording medium;
- a coil that produces a magnetic field corresponding to data to be written on the recording medium;
- a main magnetic pole that has an end face located in the medium facing surface, allows a magnetic flux corresponding to the magnetic field produced by the coil to pass, and produces a write magnetic field for writing the data on the recording medium by means of a perpendicular magnetic recording system;
- a shield made of a magnetic material and having an end face that is located in the medium facing surface to wrap around the end face of the main magnetic pole; and
- a gap part made of a nonmagnetic material and provided between the main magnetic pole and the shield, wherein:
- the shield includes a bottom shield, first and second side shields, and a top shield;
- the bottom shield has an end face and a top surface, the end face being located in the medium facing surface at a position backward of the end face of the main magnetic pole along a direction of travel of the recording medium;
- the first and second side shields have two end faces that are located in the medium facing surface at positions on opposite sides of the end face of the main magnetic pole in a track width direction;
- the top shield has an end face that is located in the medium facing surface at a position forward of the end face of the main magnetic pole along the direction of travel of the recording medium;
- the gap part includes a first gap layer disposed between the main magnetic pole and the bottom shield and between the main magnetic pole and the first and second side shields, and a second gap layer disposed between the main magnetic pole and the top shield;
- the main magnetic pole has a top surface that is farther from the top surface of the bottom shield, a bottom end that is opposite to the top surface of the main magnetic pole, and first to sixth side surfaces;
- a width of the end face of the main magnetic pole in the track width direction decreases with decreasing distance to the bottom end of the main magnetic pole;
- the first and second side surfaces are opposite to each other and located in a first region that extends from the medium facing surface to a position at a distance of 50 to 500 nm from the medium facing surface;
- the third and fourth side surfaces are located in a second region that is other than the first region;
- the fifth side surface is located in a boundary between the first and second regions, and connects the first side surface to the third side surface;
- the sixth side surface is located in the boundary between the first and second regions, and connects the second side surface to the fourth side surface;
- a distance between the first side surface and the second side surface in the track width direction decreases with decreasing distance to the bottom end of the main magnetic pole;
- in the boundary between the first region and the second region, a distance between the third side surface and the fourth side surface in the track width direction as seen at a position closest to the bottom end of the main magnetic pole is greater than the distance between the first side surface and the second side surface in the track width direction as seen at the position closest to the bottom end of the main magnetic pole;
- each of the fifth and sixth side surfaces has a width that increases with decreasing distance to the bottom end of the main magnetic pole;
- the first side shield has two wall faces that are opposed to the first and third side surfaces of the main magnetic pole, respectively; and
- the second side shield has two wall faces that are opposed to the second and fourth side surfaces of the main magnetic pole, respectively.

11. The magnetic head for perpendicular magnetic recording according to claim 10, wherein the top surface of the main magnetic pole includes a first portion and a second portion, the first portion having a first edge located in the medium facing surface and a second edge opposite to the first edge, the second portion being located farther from the medium facing surface than is the first portion and being connected to the first portion at the second edge, and a distance from the top surface of the bottom shield to an arbitrary point on the first portion decreases with decreasing distance from the arbitrary point to the medium facing surface.

12. A magnetic head for perpendicular magnetic recording comprising:
- a medium facing surface that faces a recording medium;
- a coil that produces a magnetic field corresponding to data to be written on the recording medium;
- a main magnetic pole that has an end face located in the medium facing surface, allows a magnetic flux corresponding to the magnetic field produced by the coil to pass, and produces a write magnetic field for writing the data on the recording medium by means of a perpendicular magnetic recording system;
- a shield made of a magnetic material and having an end face that is located in the medium facing surface to wrap around the end face of the main magnetic pole; and
- a gap part made of a nonmagnetic material and provided between the main magnetic pole and the shield, wherein:
- the shield includes a bottom shield, first and second side shields, and a top shield;
- the bottom shield has an end face and a top surface, the end face being located in the medium facing surface at a position backward of the end face of the main magnetic pole along a direction of travel of the recording medium;
- the first and second side shields have two end faces that are located in the medium facing surface at positions on opposite sides of the end face of the main magnetic pole in a track width direction;
- the top shield has an end face that is located in the medium facing surface at a position forward of the end face of the main magnetic pole along the direction of travel of the recording medium;
- the gap part includes a first gap layer disposed between the main magnetic pole and the bottom shield and between the main magnetic pole and the first and second side shields, and a second gap layer disposed between the main magnetic pole and the top shield;
- the main magnetic pole has a top surface that is farther from the top surface of the bottom shield, a bottom end opposite to the top surface of the main magnetic pole, and first and second side parts;
- the first side shield has a first sidewall that is opposed to the first side part of the main magnetic pole;
- the second side shield has a second sidewall that is opposed to the second side part of the main magnetic pole;

the first side part bends to form a first corner at a first position that is at a predetermined distance from the medium facing surface;

the second side part bends to form a second corner at a second position that is at the predetermined distance from the medium facing surface;

at the first position, a distance between the first side part and the first sidewall in the track width direction starts to gradually increase with increasing distance from the medium facing surface; and at the second position, a distance between the second side part and the second sidewall in the track width direction starts to gradually increase with increasing distance from the medium facing surface.

13. The magnetic head for perpendicular magnetic recording according to claim 12, further comprising a nonmagnetic layer made of a nonmagnetic material, the nonmagnetic layer having a first portion that is located farther from the medium facing surface than is the first position and interposed between the first side part and the first sidewall, and a second portion that is located farther from the medium facing surface than is the second position and interposed between the second side part and the second sidewall.

* * * * *